United States Patent
Takahashi et al.

(10) Patent No.: US 10,958,117 B2
(45) Date of Patent: *Mar. 23, 2021

(54) ROTARY ELECTRICAL MACHINE

(71) Applicant: DENSO CORPORATION, Kariya (JP)

(72) Inventors: Yuki Takahashi, Kariya (JP); Tomokazu Hisada, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

This patent is subject to a terminal disclaimer.

(21) Appl. No.: 16/306,767

(22) PCT Filed: Jun. 1, 2017

(86) PCT No.: PCT/JP2017/020444
§ 371 (c)(1),
(2) Date: Dec. 3, 2018

(87) PCT Pub. No.: WO2017/209245
PCT Pub. Date: Dec. 7, 2017

(65) Prior Publication Data
US 2019/0131833 A1 May 2, 2019

(30) Foreign Application Priority Data

Jun. 3, 2016 (JP) .............................. JP2016-112286
Apr. 28, 2017 (JP) .............................. JP2017-089380

(51) Int. Cl.
*H02K 1/24* (2006.01)
*H02K 21/14* (2006.01)
(Continued)

(52) U.S. Cl.
CPC ............... *H02K 1/24* (2013.01); *H02K 19/22* (2013.01); *H02K 21/04* (2013.01); *H02K 21/044* (2013.01); *H02K 21/14* (2013.01); *H02K 2213/03* (2013.01)

(58) Field of Classification Search
CPC ............. H02K 1/24; H02K 1/22; H02K 1/226; H02K 19/22; H02K 21/04; H02K 21/044; H02K 21/14; H02K 15/02; H02K 15/022
See application file for complete search history.

(56) References Cited

U.S. PATENT DOCUMENTS 6,885,129 B1 * 4/2005 Oohashi ................. H02K 1/243
310/179
10,686,354 B2 * 6/2020 Takahashi ............ H02K 15/022
(Continued)

FOREIGN PATENT DOCUMENTS

JP     H04-255451 A    9/1992
JP     H10-304633 A    11/1998
(Continued)

OTHER PUBLICATIONS

Aug. 15, 2017 International Search Report issued in International Patent Application No. PCT/JP2017/020444.

*Primary Examiner* — Tran N Nguyen
(74) *Attorney, Agent, or Firm* — Oliff PLC

(57) ABSTRACT

A vehicle alternating-current power generator includes a stator formed by winding an armature winding on a stator core and a rotor arranged on the radial inside of the stator. The rotor includes a field core having a boss part and a plurality of claw-shaped magnetic pole parts, a field winding that is wound on the outer peripheral side of the boss part, and a permanent magnet that is arranged between the circumferentially adjacent claw-shaped magnetic pole parts. A d-axis magnetic circuit formed by magnetomotive force of the field winding and at least part of first and second magnet magnetic circuits formed by magnetic force of the permanent magnet are shared. When an electrical load is connected to the rotor, the relationship between a permeance Prt of the (Continued)

d-axis magnetic circuit and a permeance Pst of a q-axis magnetic circuit is set to satisfy Pst>Prt.

7 Claims, 27 Drawing Sheets

(51) Int. Cl.
*H02K 21/04* (2006.01)
*H02K 19/22* (2006.01)

(56) References Cited

U.S. PATENT DOCUMENTS

| | | |
|---|---|---|
| 2006/0038406 A1 | 2/2006 | Hino et al. |
| 2009/0218907 A1* | 9/2009 | Kusase ............... H02K 21/044 310/263 |
| 2011/0084634 A1 | 4/2011 | Kusase |

FOREIGN PATENT DOCUMENTS

| | | |
|---|---|---|
| JP | H11-164499 A | 6/1999 |
| JP | 2017-221098 A | 12/2017 |

* cited by examiner

FIRST COMPARATIVE EXAMPLE $P = L/N^2$
$N$: NUMBER OF WINDINGS
$L$: INDUCTANCE

FIRST EMBODIMENT

Ls : INDUCTANCE [H] BY LCR METER

CONDITIONS
$Ab=Ad=At$
$At=Ab-Hdg/2 \times Wrr$
$Ab \times B50 = 2 \times Am \times Br$
$Db/Dr=0.515$ CONDITIONS
$Ab=Ad=At$
$At=Ab-Hdg/2 \times Wrr$
$Ab \times B50 = 2 \times Am \times Br$

LUNDELL TYPE

IPM TYPE

ROTARY ELECTRICAL MACHINE

TECHNICAL FIELD

The present disclosure relates to a rotary electrical machine that is installed in an automobile, truck, or others, for example, and is used as an electric motor or a power generator.

BACKGROUND ART

A vehicle alternating-current power generator includes a Lundell rotor with a field winding and a plurality of claw-shaped magnetic pole parts in which magnetic poles different in polarity are alternately excited by the field winding in a circumferential direction. Such a vehicle alternating-current power generator is known as a conventional rotary electrical machine. PTL 1 discloses a power generator including a magnet-equipped Lundell rotor in which permanent magnets are interposed between the claw-shaped magnetic pole parts to obtain higher output density. This type of power generator is designed with consideration given to the size of the permanent magnets and the optimization of a boss part, a disc part, and claw-shaped magnetic pole parts of the Lundell rotor core. Accordingly, the power generator achieves both the improvement of power generation performance and the reduction of back-electromotive force.

PTL 1 describes the mathematical expression derived by determining the relationship between the magnetic flux of a permanent magnet that generates an inflexion point of output characteristics in a power generator and various constants L, W, and θ of claw-shaped magnetic pole pieces. In addition, PTL 1 describes that setting the various constants L, W, and θ would make it possible to decide consistently the residual magnetic flux density Br of the permanent magnets. Accordingly, in the power generator described in PTL 1, the magnetic poles can be set to allow the avoidance of battery overcharge and the achievement of high efficiency and high output at the same time in a universal way even with differences in specifications.

There are is known magnet-embedded rotors (IPM rotor) in which permanent magnets are embedded in the outer peripheral portion of a rotor core such that NS poles alternate in the circumferential direction. The IPM rotor has become rapidly widespread due to its high torque, and installed in vehicle power generators, electric motors, and other components.

In recent years, vehicles have been formed in a slant-nose shape and their engine compartments have been reduced in size for reduction of running resistance. Along with this, the installation spaces for vehicle power generators and starters have been minimized. In this case, particular importance is placed on the capability of a starter, high-efficiency power running for assisting a vehicle in high-efficiency operation, and the performance of regenerative operation. Therefore, there has been relatively decreased demand for improvement in only sheer power generation performance, whereas attention has been focused on the power generation, torque, and regerative ability of power generators for the case where field current becomes large in a short period of time.

CITATION LIST

Patent Literature

[PTL 1] JP 4-255451 A

SUMMARY OF THE INVENTION

Technical Problem

The power generator with the IPM rotor described above has a problem of high back-electromotive force. Accordingly, products with limited back-electromotive force such as vehicle alternating-current power generators include the Lundell rotor with claw-shaped magnetic pole parts described above. However, the power generators with the Lundell rotor have a problem of low power output. The power generators can be enhanced in power generation performance by using magnets designed within the range prescribed by the mathematical expression described in PTL 1. However, there is a need for further improvement in power generation performance.

The present disclosure provides a rotary electrical machine that is further improved in power generation performance.

Solution to Problem

FIG. 22 is an equivalent magnetic circuit diagram of a magnet-equipped Lundell rotor. FIG. 23 is an equivalent magnetic circuit diagram of an IPM rotor. In the drawings, $\Phi m$ represents magnet magnetic flux, Rst represents the magnetic resistance of a stator, AG represents an air gap, Rrt represents the magnetic resistance of a rotor, and Ra represents the magnetic resistance of an air gap in a d-axis circuit. As illustrated in FIG. 22, in the magnet-equipped Lundell rotor, the magnet magnetic flux $\Phi m$ is branched into two magnetic circuits, that is, a magnetic circuit passing through the boss part of the Lundell rotor core and a magnetic circuit passing through the stator core.

On the other hand, in the IPM rotor, the d-axis circuit is an air gap (a broken-line portion) as illustrated in FIG. 23. Accordingly, the magnetic resistance Ra is very high and inductance Lrt is very low. This causes a difference in torque under an electrical load between the magnet-equipped Lundell rotor and the IPM rotor. That is, when the magnetic resistance Rrt is very high and the inductance Lrt is very low under an electrical load, the magnet-equipped Lundell rotor can output the same degree of torque as the IPM rotor.

The inventor has repeated studies based on the foregoing findings and discovered that it is possible to create the conditions under which the magnet-equipped Lundell rotor can output the same degree of torque as the IPM rotor by using field current If. In the IPM rotor, the magnetic resistance of the field core (rotor core) is high and the magnetic resistance of the stator core is low. Accordingly, the magnet-equipped Lundell rotor can be placed under the same conditions as the IPM rotor by increasing the magnetic resistance value of the field core (Lundell rotor core) to be larger than the magnetic resistance value of the stator core at the time of distribution of the field current If.

The inductance of the rotor is designated as Lrt, the inductance of the stator as Lst, and the magnetic resistance of the magnetic flux flowing in the stator as Rst. When an electrical load is connected to the rotor, the magnetic-equipped Lundell rotor is set to establish Lrt<Lst . . . (Equation 1) or Rrt>Rst . . . (Equation 2). This makes it possible to produce the foregoing conditions. The residual magnetic flux density of the magnet is designated as Br, the cross-sectional area of each magnetic pole of the magnet as Am, the magnetic flux density of the stator as Bs, and the cross-sectional area of the rotor as Ar. At no load, the magnetic-equipped Lundell rotor is set to establish Lrt>Lst, Rrt>Rst, and 2×Br×Am>Bs×Ar (conditions for low back-electromotive force).

However, according to the foregoing (Equation 1) and (Equation 2), the magnetic resistance R cannot be easily measured from a rotary electrical machine as a completed product including a traction motor or a generator. In addition, the inductance L varies depending on the number of windings and fluctuates with the square of the number of turns. Accordingly, it is not appropriate to evaluate the relationship using the inductance L. Therefore, in the subsequent evaluations, permeances Prt and Pst [H] as inverse numbers of the magnetic resistance R were used because they can be easily measured and calculated by an experimental method described later. The relationship between them is expressed as $L/N^2$ [$H/N^2$]=1/R [A/wb]=P [H].

Thus, the inventor has found that establishing Prt<Pst under an electrical load on the magnetic-equipped Lundell rotor would allow the rotary electrical machine with biaxial synthetic magnetic flux on a d axis to behave like an IPM rotor.

A first rotary electrical machine as an aspect of the technique of the present disclosure includes: an annular stator (20) formed by winding an armature winding (25) on a stator core (21); and a rotor (30) radially opposed to an inner peripheral side of the stator.

The rotor includes: a field core (32) having a cylindrical boss part (321, 321a, 321b) and a plurality of claw-shaped magnetic pole parts (323, 323a, 323b) that are arranged on the outer peripheral side of the boss part and have magnetic poles different in polarity alternating in a circumferential direction; a field winding (33) that is wound on the outer peripheral side of the boss part to generate a magnetomotive force by energization; and permanent magnets (34, 34A) that are arranged with an axis of easy magnetization oriented in the circumferential direction between the circumferentially adjacent claw-shaped magnetic pole parts and have magnetic poles formed to match the alternating polarities of the claw-shaped magnetic pole parts produced by the magnetomotive force of the field winding.

The first rotary electrical machine includes a d-axis magnetic circuit (36) in which a magnetic flux formed by the magnetomotive force of the field winding flows through the boss part, the pair of claw-shaped magnetic pole parts, and the stator core and a magnet magnetic circuit (38, 39) in which a magnetic flux formed by magnetic force of the permanent magnet flows. The d-axis magnetic circuit and at least part of the magnet magnetic circuit share the magnetic circuit.

In the first rotary electrical machine, when an electrical load is connected to the rotor, the relationship between a permeance Prt of the d-axis magnetic circuit and a permeance Pst of a q-axis magnetic circuit (37) that is formed from current flowing in the armature winding and passes through a q axis shifted from the d axis at an electrical angle of 90° is set to satisfy Pst>Prt.

According to this configuration, in the first rotary electrical machine, the permanent magnets arranged between the circumferentially adjacent claw-shaped magnetic pole parts form the two magnet magnetic circuits, that is, the magnet magnetic circuit in which the magnetic flux interlinked with the stator flows and the magnet magnetic circuit in which the magnetic flux passes through the boss part and returns to the rotor. When an electrical load is connected to the rotor, that is, when the field current is distributed to the field winding, the d-axis magnetic circuit is formed in which the magnetic flux formed by the magnetomotive force of the field winding flows through the boss part and the pair of claw-shaped magnetic pole parts of the field core, and the stator core. At this time, the flowing direction of the magnetic flux in, of the two magnet magnetic circuits, the magnet magnetic circuit in which the magnetic flux passes through the boss part and returns to the rotor is opposite to the flowing direction of the magnetic flux in the d-axis magnetic circuit. Accordingly, the magnetic flux of the magnet magnetic circuit is unlikely to flow due to the magnetic resistance being large. Therefore, in the first rotary electrical machine, the relationship between the permeance Prt of the d-axis magnetic circuit and the permeance Pst of the q-axis magnetic circuit is set to satisfy Pst>Prt. This increases the magnet magnetic flux in, of the two magnet magnetic circuits, the magnet magnetic circuit in which the magnetic flux interlinked with the stator flows. Accordingly, the power generation performance can be significantly improved by the efficient use of the magnet magnetic flux.

In the present disclosure, the state where the rotor is under an electrical load refers to the state in which the field current If as rated current is distributed to the field winding in a range of 4 to 20 [A] that is usual for performance of a vehicle brush. With an improved structure of the brush, the field current If at that time (for example, 30 [A] or the like) can be used. In a configuration without limitation on the field current If such as a brush-less configuration, the required relationship Pst>Prt can be established by the larger field current If. Even with the known brush, the effect of satisfying the requirement 0.9<As/Ab<1.7 described later would be enormous in the sense of establishing the relationship Pst>Prt.

A secondary rotary electrical machine with a brushless structure as an aspect of the technique of the present disclosure includes: an annular stator (20) formed by winding an armature winding (25) on a stator core (21); and a rotor (50) radially opposed to an inner peripheral side of the stator; and a housing (10) that stores and supports the stator and the rotor.

The housing has a boss part (17) that is arranged on an inner peripheral side of the rotor and has a field winding (53) generating a magnetomotive force by energization and wound on the outer peripheral side.

The rotor includes: a field core (52) having a plurality of magnetic pole parts (52n, 52s) that is arranged on an outer peripheral side of the field winding and has magnetic poles different in polarity alternating in a circumferential direction; and a permanent magnet (54) that is arranged with an axis of easy magnetization oriented in the circumferential direction between the circumferentially adjacent magnetic pole parts and has a magnetic pole formed to match the alternating polarities of the magnetic pole parts produced by the magnetomotive force of the field winding.

The second rotary electrical machine includes a d-axis magnetic circuit (56) in which the magnetic flux formed by the magnetomotive force of the field winding flows through the boss part, the pair of magnetic pole parts, and the stator core and a magnet magnetic circuit (58, 59) formed by magnetic force of the permanent magnet. The d-axis magnetic circuit and at least part of a magnet magnetic circuit share the magnetic circuit.

In the second rotary electrical machine, when an electrical load is connected to the rotor, the relationship between a permeance Prt of the d-axis magnetic circuit and a permeance Pst of a q-axis magnetic circuit (57) that is formed from current flowing in the armature winding and passes through a q axis shifted from the d axis at an electrical angle of 90° is set to satisfy Pst>Prt.

According to this configuration, in the second rotary electrical machine, the permanent magnets arranged between the circumferentially adjacent magnetic pole parts form the two magnet magnetic circuits, that is, the magnet magnetic circuit in which the magnetic flux interlinked with the stator flows and the magnet magnetic circuit in which the magnetic flux passes through the boss part and returns to the rotor. When an electrical load is connected to the rotor, that is, when the field current is distributed to the field winding, the d-axis magnetic circuit is formed in which the magnetic flux formed by the magnetomotive force of the field winding flows through the boss part and the pair of magnetic pole parts of the field core, and the stator core. At this time, the flowing direction of the magnet magnetic flux in, of the two magnet magnetic circuits, the magnet magnetic circuit in which the magnet magnetic flux passes though the boss part and returns to the rotor is opposite to the flowing direction of the magnetic flux in the d-axis magnetic circuit. Accordingly, the magnetic flux of the magnet magnetic circuit is unlikely to flow due to the magnetic resistance being large. Therefore, in the second rotary electrical machine, the relationship between the permeance Prt of the d-axis magnetic circuit and the permeance Pst of the q-axis magnetic circuit is set to satisfy Pst>Prt. This increases the magnet magnetic flux in, of the two magnet magnetic circuits, the magnet magnetic circuit in which the magnetic flux interlinked with the stator flows. Accordingly, the power generation performance can be significantly improved by the efficient use of the magnet magnetic flux.

In particular, the brushless rotary electrical machine is not subjected to current limitation due to a brush. Accordingly, it is possible to increase the value of the field current If that would be restricted due to the brush. This makes it possible to saturate the field circuit and use efficiently the magnet magnetic force even in the brushless rotary electrical machine. In addition, the independent electrical circuit distributes the field current to the field winding. Accordingly, with regard to centrifugal force as a weak point of the magnet-equipped Lundell rotor, the rear side of the magnetic pole parts is not subjected to the centrifugal force of the electrical circuit. This makes it possible to decrease stress resulting from centrifugal force.

A third rotary electrical machine as an aspect of the technique of the present disclosure includes: an annular stator (20) formed by winding an armature winding (25) on a stator core (21); and a rotor (30) rotatably arranged and radially opposed to an inner peripheral side of the stator.

The rotor includes: a field core (32) having a cylindrical boss part (321, 321*a*, 321*b*) and a plurality of claw-shaped magnetic pole parts (323, 323*a*, 323*b*) that are arranged on an outer peripheral side of the boss part and have magnetic poles different in polarity alternating in a circumferential direction; a field winding (33) that is wound on the outer peripheral side of the boss part to generate a magnetomotive force by energization; and permanent magnets (34) that are arranged with an axis of easy magnetization oriented in the circumferential direction between the circumferentially adjacent claw-shaped magnetic pole parts and have magnetic poles formed to match the alternating polarities of the claw-shaped magnetic pole parts produced by the magnetomotive force of the field winding.

In the present disclosure, the surface area of the outer peripheral surface of the claw-shaped magnetic pole part is designated as As, and the axially extending iron core cross-sectional area of a pair of NS poles of the boss part as Ab. In this case, in the third rotary electrical machine, the relationship between the surface area As and the cross-sectional area Ab is set within a range of 0.9<As/Ab<1.7.

According to this configuration, in the third rotary electrical machine, the relationship between the surface area As of the outer peripheral surface of the claw-shaped magnetic pole part and the axially extending iron core cross-sectional area Ab of a pair of NS poles of the boss part is set within the range of 0.9<As/Ab<1.7. Accordingly, the magnet magnetic flux can be increased in, of the magnet magnetic circuits formed by the permanent magnets arranged between the circumferentially adjacent claw-shaped magnetic pole parts, the magnet magnetic circuit in which the magnet magnetic flux interlinked with the stator flows. This improves significantly the power generation performance by the efficient use of the magnet magnetic flux. The permanent magnets arranged between the claw-shaped magnetic pole parts are conventionally used for the purposes of rectification of magnetic flux and prevention of leakage of magnetic flux. In contrast, in the present disclosure, the permanent magnets arranged between the claw-shaped magnetic pole parts are used like permanent magnets in an IPM rotor. This achieves increase of magnetic flux rather than prevention of leakage of magnetic flux. That is, the permanent magnets can act as a source for torque increase or a source for power increase.

A fourth rotary electrical machine with a brushless structure as an aspect of the technique of the present disclosure includes: an annular stator (20) formed by winding an armature winding (25) on a stator core (21); a rotor (30) radially opposed to an inner peripheral side of the stator; and a housing (10) that stores and supports the stator and the rotor (50).

The housing has a boss part (17) that is arranged on an inner peripheral side of the rotor and has a field winding (53) generating a magnetomotive force by energization and wound on the outer peripheral side.

The rotor includes: a field core (52) having a plurality of magnetic pole parts (523*h*, 523*i*) that is arranged on an outer peripheral side of the field winding and has magnetic poles different in polarity alternating in a circumferential direction; and permanent magnets (54) that are arranged with an axis of easy magnetization oriented in the circumferential direction between the circumferentially adjacent magnetic pole parts and have magnetic poles formed to match the alternating polarities of the magnetic pole parts produced by the magnetomotive force of the field winding.

In the present disclosure, the surface area of the outer peripheral surface of the magnetic pole part is designated as As, and the axially extending iron core cross-sectional area of a pair of NS poles of the boss part as Ab. In this case, in the fourth rotary electrical machine, the relationship between the surface area As and the cross-sectional area Ab is set within a range of 0.9<As/Ab<1.7.

According to this configuration, in the fourth rotary electrical machine, the relationship between the surface area As of the outer peripheral surface of the magnetic pole part and the axially extending iron core cross-sectional area Ab of a pair of NS poles of the boss part is set within the range of 0.9<As/Ab<1.7. Accordingly, the magnet magnetic flux can be increased in, of the magnet magnetic circuits formed by the permanent magnets arranged between the circumferentially adjacent magnetic pole parts, the magnet magnetic circuit in which the magnet magnetic flux interlinked with the stator flows. This improves significantly the power generation performance by the efficient use of the magnet magnetic flux. The permanent magnets arranged between the magnetic pole parts are conventionally used for the purposes of rectification of magnetic flux and prevention of leakage of magnetic flux. In contrast, in the present disclosure, the permanent magnets arranged between the magnetic pole parts are used like permanent magnets in an IPM rotor. This achieves increase of magnetic flux rather than prevention of leakage of magnetic flux. That is, the permanent magnets can act as a source for torque increase or a source for power increase.

DESCRIPTION OF EMBODIMENTS

Embodiments of a rotary electrical machine as an aspect of the technique of the present disclosure will be specifically described with reference to the drawings.

First Embodiment

A rotary electrical machine according to a first embodiment will be described with reference to FIGS. 1 to 21. The rotary electrical machine according to the present embodiment is a vehicle alternating-current power generator that is installed in a vehicle and used as a power generator.

<Overall Configuration of the Vehicle Alternating-Current Power Generator>

Figure 1:
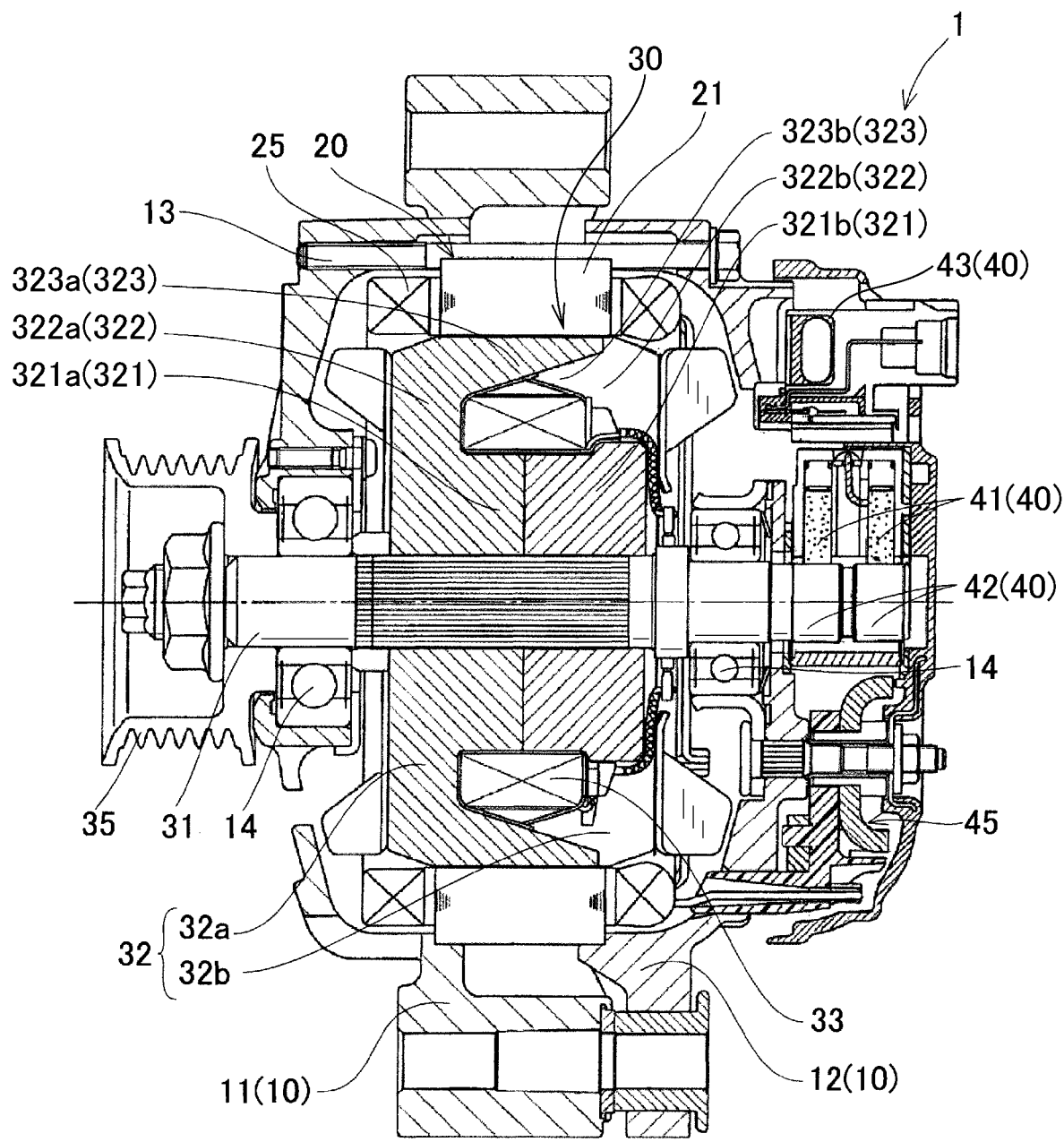
FIG. 1 is an axial cross-sectional view of a rotary electrical machine according to a first embodiment.

A vehicle alternating-current power generator 1 in the present embodiment includes a housing 10, a stator 20, a rotor 30, a field winding power supply device 40, a rectifier 45, and other components as illustrated in FIG. 1. The housing 10 includes a bottomed cylindrical front housing 11 and rear housing 12 each of which is opened at one end. The front housing 11 and the rear housing 12 are fastened together by a bolt 13 with the opened ends joined together.

The stator 20 includes an annular stator core 21 and an armature winding 25. The stator core 21 has pluralities of slots 22 and teeth 23 (see FIG. 7) aligned in the circumferential direction. The armature winding 25 is formed from a three-phase winding on the slots 22 of the stator core 21. The stator 20 is axially sandwiched and fixed between the inner peripheral surfaces of the peripheral walls of the front housing 11 and the rear housing 12.

The stator 20 has a rotation shaft 31, a Lundell field core 32, a field winding 33, and a plurality of permanent magnets 34. The rotation shaft 31 is rotatably supported on the housing 10 via a pair of bearings 14. The field core 32 includes a pair of pole cores 32a and 32b that is fitted and fixed together on the outer periphery of the rotation shaft 31. The field winding 33 is wound on the outer peripheral side of a boss part 321 of the field core 32. The permanent magnets 34 are arranged between circumferentially adjacent claw-shaped magnetic pole parts 323 of the field core 32. The rotor 30 is rotatably provided with the field core 32 radially opposed to the inner peripheral side of the stator 20. The rotor 30 is rotationally driven by an engine (not illustrated) installed in the vehicle via a pulley 35 fixed to the front end of the rotation shaft 31.

Figure 2:
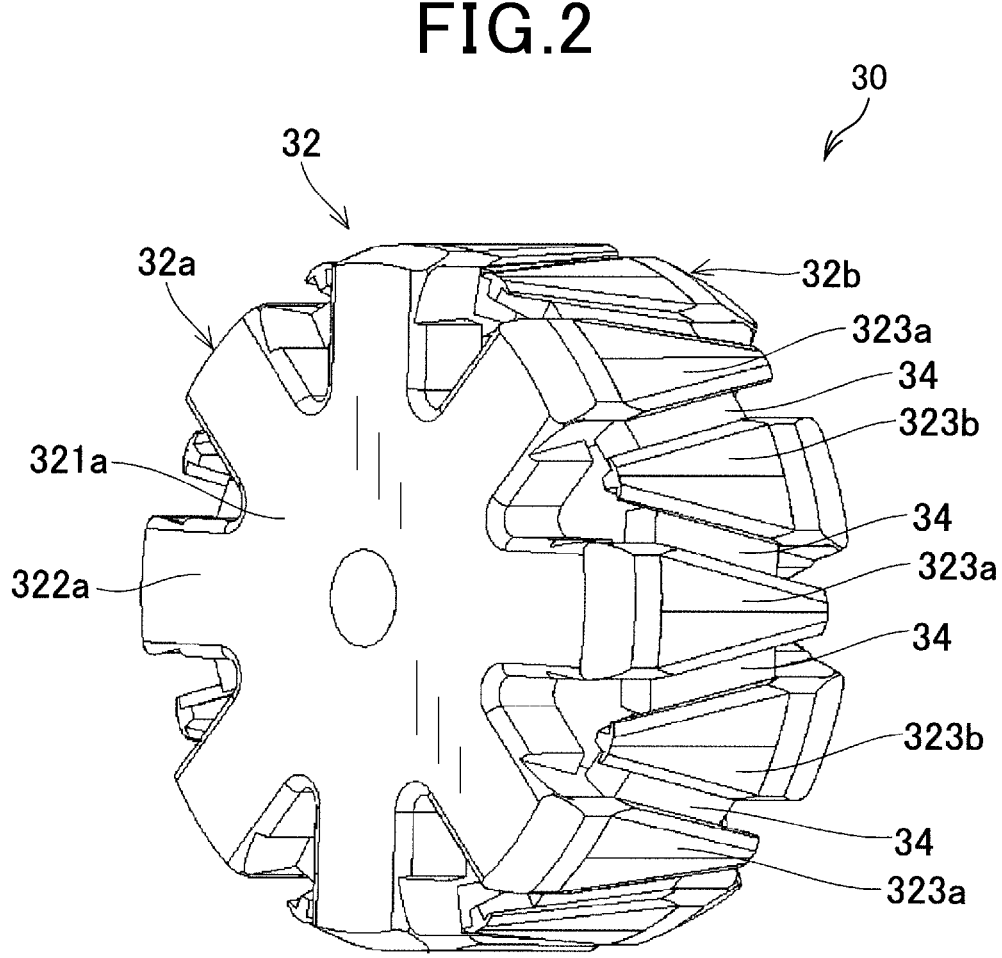
FIG. 2 is a perspective view of a rotor according to the first embodiment.

The field core 32 includes the first pole core 32a and the second pole core 32b as illustrated in FIGS. 1 and 2. The first pole core 32a is fixed to the front side of the rotation shaft 31 (the left side of FIG. 1). The second pole core 32b is fixed to the rear side of the rotation shaft 31 (the right side of FIG. 1). The first pole core 32a includes a cylindrical first boss part 321a, a first disc part 322a, and first claw-shaped magnetic pole parts 323a. The first boss part 321a flows a field magnetic flux in the axial direction on the radially inside of the field winding 33. The first disc part 322a extends the radially outward from the axial front end of the first boss part 321a at a predetermined circumferential pitch to permit the field magnetic flux to flow in the radial direction. The first claw-shaped magnetic pole parts 323a axially extend from the front end of the first disc part 322a on the outer peripheral side of the first boss part 321a to surround the field winding 33 and exchange magnetic flux with the stator core 21.

The second pole core 32b is identical in shape to the first pole core 32a. However, the second pole core 32b has a second boss part 321b, a second disc part 322b, and second claw-shaped magnetic pole parts 323b. The first and second pole cores 32a and 32b are formed from soft magnetic bodies.

The field core 32 in the present embodiment is formed from two kinds of materials different in saturation flux density Bs. Specifically, the claw-shaped magnetic pole parts 323 are formed from a material high in saturation flux density Bs. Other than the claw-shaped magnetic pole parts 323, the boss part 321 and the disc part 322 are formed from a material low in saturation flux density Bs. Examples of a material high in saturation flux density Bs include a material with about 0.1% carbon such as S10C (prescribed by Japanese Industrial Standards). Examples of a material low in saturation flux density Bs include a material with a large amount of carbon such as S45C (prescribed by Japanese Industrial Standards). For reference, SUS430 (prescribed by Japanese Industrial Standards) and electromagnetic steel sheets are lower in saturation flux density Bs than S10C.

The material low in saturation flux density Bs used here is higher in magnetic permeability than the material high in saturation flux density Bs. Examples of a material high in magnetic permeability include permalloy. Iron mixed with nickel cobalt is not suitable because of its high saturation flux density Bs.

The first pole core 32a and the second pole core 32b are assembled together such that the first claw-shaped magnetic pole parts 323a and the second claw-shaped magnetic pole parts 323b are opposed to each other in a staggered pattern, and the axial rear end surface of the first pole core 32a and the axial front end surface of the second pole core 32b face each other. Accordingly, the first claw-shaped magnetic pole parts 323a of the first pole core 32a and the second claw-shaped magnetic pole parts 323b of the second pole core 32b are alternately arranged in the circumferential direction. The first and second pole cores 32a and 32b have eight each claw-shaped magnetic pole parts 323. In the present embodiment, the Lundell rotor core is provided with 16 poles (eight N poles and eight S poles).

Figure 3:
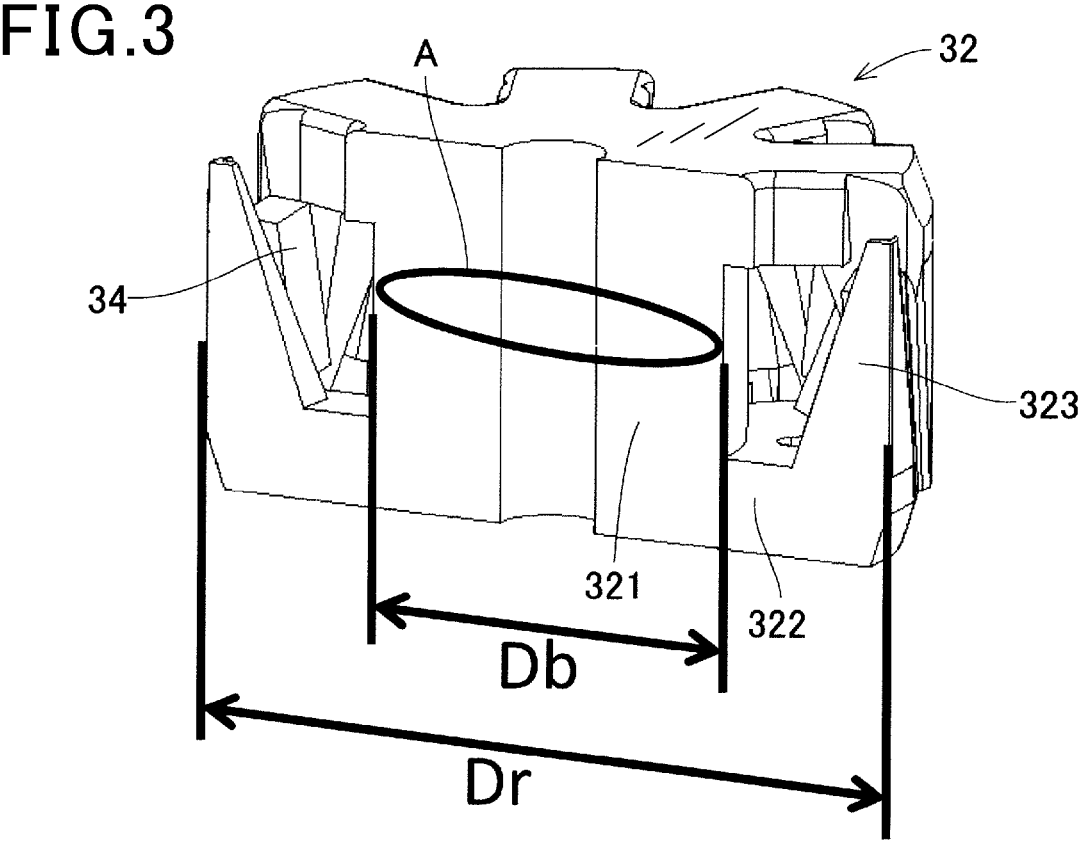
FIG. 3 is a diagram illustrating various dimensions of a field core according to the first embodiment.

In the present embodiment, as illustrated in FIG. 3, the outer diameter of the boss part 321 of the field core 32 is designated as Db (hereinafter, also called "boss part outer diameter Db") and the outer diameter of the rotor 30 (the field core 32) as Dr (hereinafter, also called "rotor outer diameter Dr"). In the present embodiment, the relationship between the boss part outer diameter Db and the rotor outer diameter Dr is set within a range of 0.46<Db/Dr<0.53. The relationship between the boss part outer diameter Db and the rotor outer diameter Dr will be described later in detail.

Figure 4:
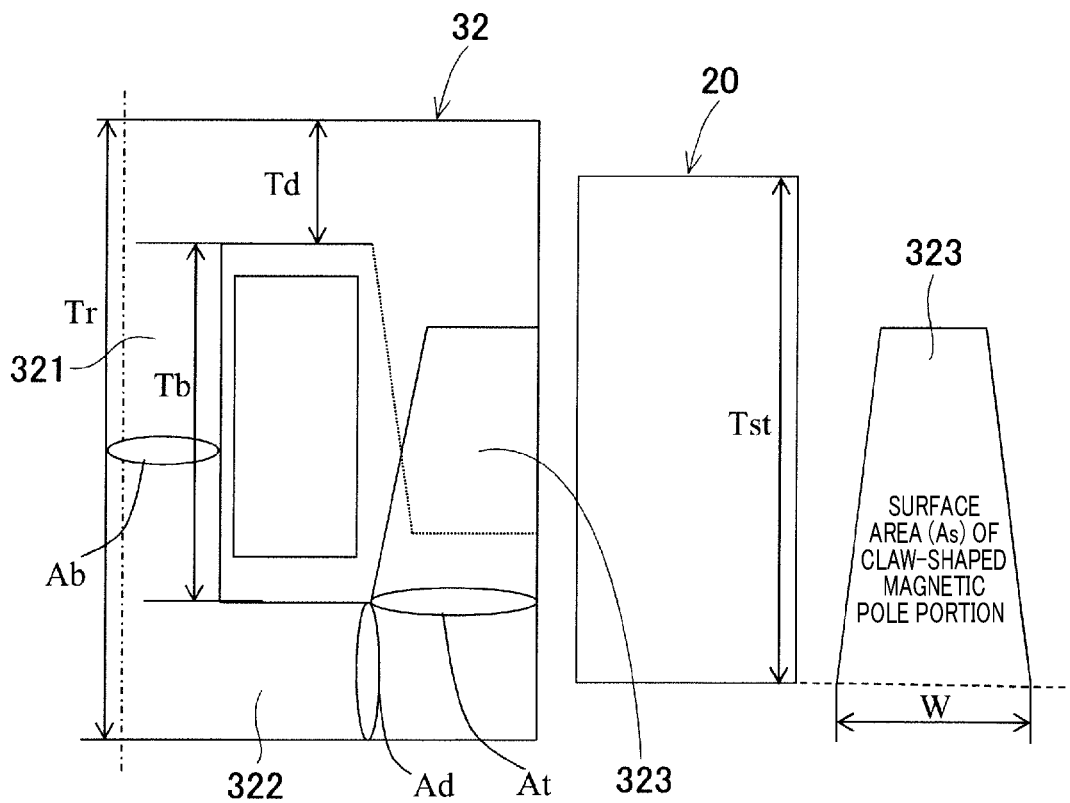
FIG. 4 is a diagram illustrating various dimensions of the field core according to the first embodiment.

In addition, the surface area of the outer peripheral surface of the claw-shaped magnetic pole part 323 is designated as As (hereinafter, also called "claw-shaped magnetic pole part surface area As") and the axially extending iron core cross-sectional area of a pair of NS poles of the boss part 321 (the area of a cross section vertical to the direction in which the iron core extends (the axial direction) as Ab (hereinafter, also called "boss part cross-sectional area Ab"). In the present embodiment, the relationship between the claw-shaped magnetic pole part surface area As and the boss part cross-sectional area Ab is set within a range of 0.9<As/Ab<1.7. The boss part cross-sectional area Ab can be expressed as A/P where A represents the total cross-sectional area of the cylindrical boss part 321 and P represents the number of pole pairs in the rotary electrical machine as illustrated in FIGS. 3 and 4.

Figure 5:
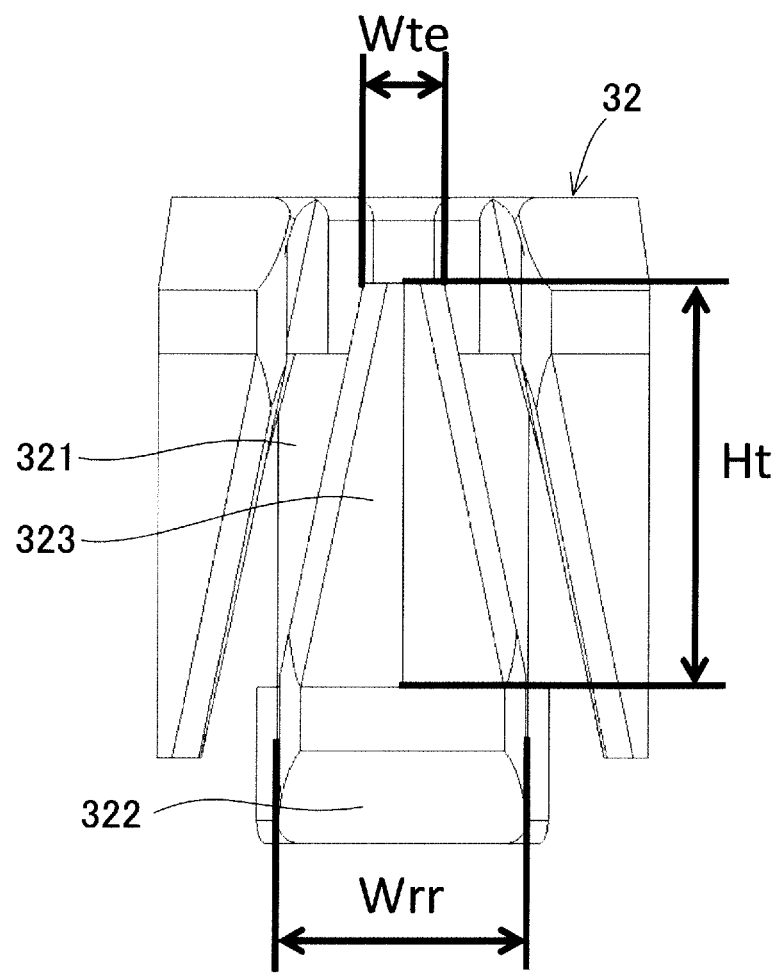
FIG. 5 is a diagram illustrating various dimensions of a claw-shaped magnetic pole part of the field core according to the first embodiment.
Figure 6:
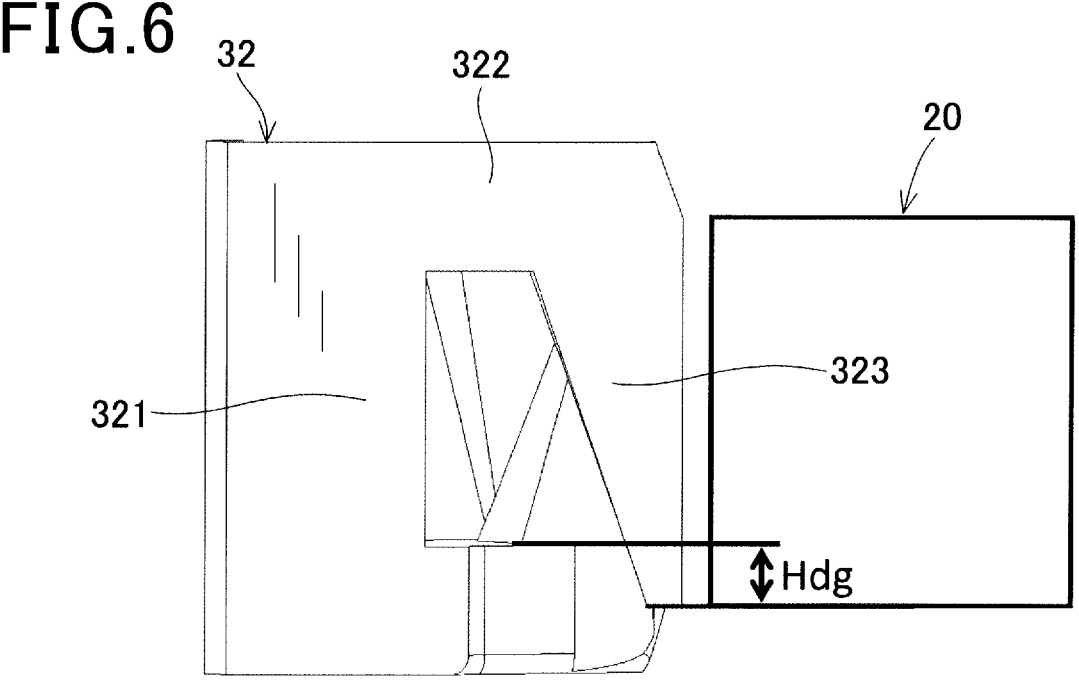
FIG. 6 is a diagram illustrating various dimensions of the field core according to the first embodiment.

Next, the claw-shaped magnetic pole part surface area As will be defined. In the present embodiment, as illustrated in FIGS. 5 and 6, the peripheral width of the root of the claw-shaped magnetic pole part 323 or the disc part 322 is designated as Wrr, the circumferential width of the front end of the claw-shaped magnetic pole part 323 as Wte, and the axial height of the claw-shaped magnetic pole part 323 as Ht. On radially opposed surfaces of the rotor 30 and the stator 20, the area in which the axial length of the stator core 21 and the axial thickness of the disc part 322 radially overlap is designated as disc guide Hdg. No large differences in dimensions are caused by cut portions, rounded portions, and chamfered portions designed in the disc part 322, the claw-shaped magnetic pole parts 323, and the stator core 21 for the purposes of magnet insertion and strength enhancement. In this case, the claw-shaped magnetic pole part surface area As is equal to (Wte+Wrr)×Ht/2+Hdg×Wrr. In the present disclosure, the circumferential width W is measured by linear distance with no consideration given to curvature. The relationship between the claw-shaped magnetic pole part surface area As and the boss part cross-sectional area Ab will be described later in detail.

The field winding 33 is wound in the state isolated from the field core 32 on the outer peripheral sides of the first and second boss parts 321a and 321b of the first and second pole cores 32a and 32b, and is surrounded by the first and second claw-shaped magnetic pole parts 323a and 323b. The field winding 33 generates a magnetomotive force in the boss part 321 by distribution of the field current If from a field current control circuit (not illustrated). Accordingly, magnetic poles different in polarity are formed in the first claw-shaped magnetic pole parts 323a and the second claw-shaped magnetic pole parts 323b of the first and second pole cores 32a and 32b. That is, the first claw-shaped magnetic pole parts 323a are magnetized at one of the NS poles, and the second claw-shaped magnetic pole parts 323b are magnetized at the other of the NS poles.

Figure 7:
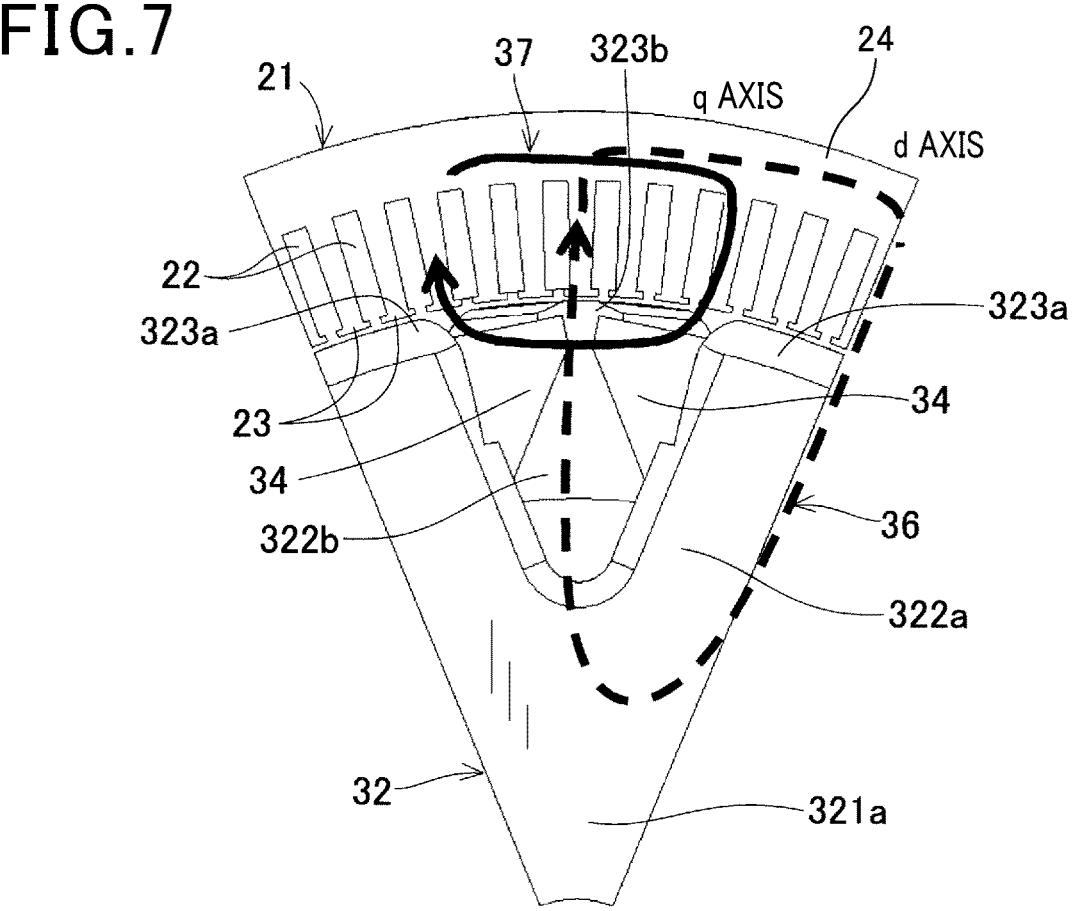
FIG. 7 is a diagram illustrating a d-axis magnetic circuit and a q-axis magnetic circuit formed in the rotary electrical machine according to the first embodiment.
Figure 8:
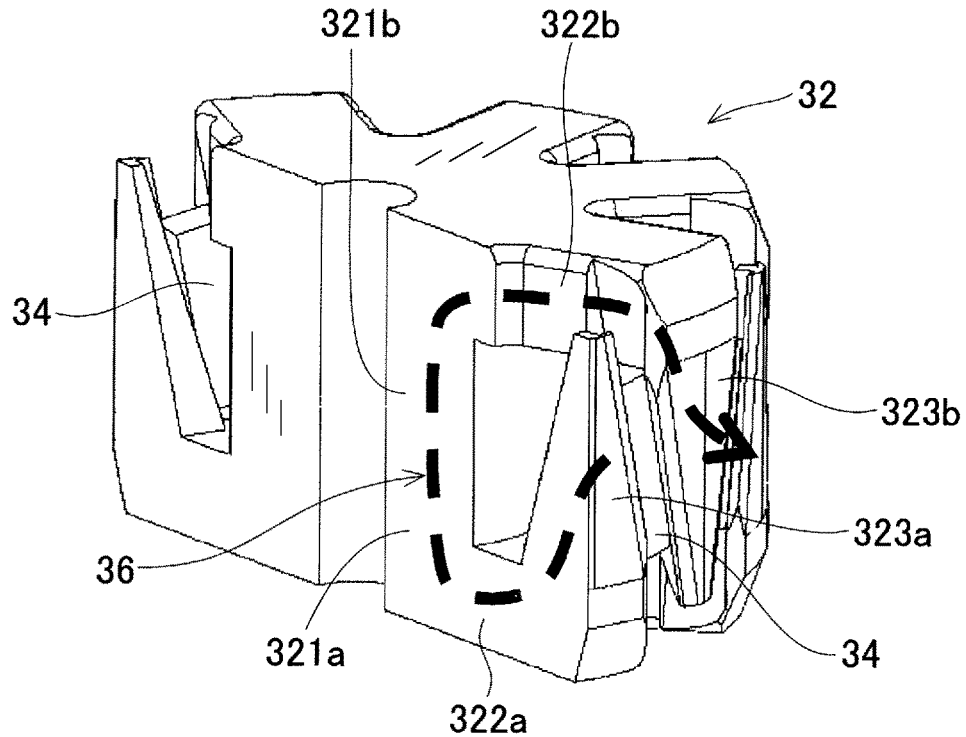
FIG. 8 is a diagram illustrating a flow of a magnetic flux on the field core side of the d-axis magnetic circuit formed in the rotary electrical machine according to the first embodiment.

Accordingly, as illustrated in FIGS. 7 and 8, a d-axis magnetic circuit 36 (indicated by a broken line in FIGS. 7 and 8) is formed by the magnetic flux passing through the boss part 321 and the pair of first and second claw-shaped magnetic pole parts 323a and 323b of the field core 32. The d-axis magnetic circuit 36 enters from the d-axis tooth 23 of the stator core 21 into the first claw-shaped magnetic pole part 323a of the field core 32 and passes through the first disc part 322a, the first boss part 321a, the second boss part 321b, the second disc part 322b, and the second claw-shaped magnetic pole part 323b. Then, after returning to the stator core 21 from the tooth 23 shifted by one magnetic pole of the stator core 21, the d-axis magnetic circuit 36 passes through a back core 24 and reaches the d-axis tooth 23 shifted by one magnetic pole. The d-axis magnetic circuit 36 is a magnetic circuit that generates a back-electromotive force of the rotor 30.

Current flows into the armature winding 25 by the d-axis magnetic circuit 36 and the magnetic flux interlinked with the stator 20 in a first magnet magnetic circuit 38 described later. This forms a q-axis magnetic circuit 37 (indicated by a solid line in FIG. 7). The q-axis magnetic circuit 37 is formed by the magnetic flux passing through a q axis shifted from the d axis of the stator core 21 at an electrical angle of 90°. In the present embodiment, the relationship between a permeance Prt of the d-axis magnetic circuit 36 and a permeance Pst of the q-axis magnetic circuit 37 is set to satisfy Pst>Prt under an electrical load on the rotor 30.

In this example, the state where the rotor 30 is under an electrical load refers to the state in which the field current If as rated current is distributed to the field winding 33 in a range of 4 to 20 [A] that is usual for performance of a vehicle brush. With an improved structure of the brush, the field current If at that time (for example, 30 [A] or the like) can be used. In a configuration without limitation on the field current If such as a brush-less configuration, the required relationship Pst>Prt can be established by the larger field current If. Even using a brush, in the sense of establishing the relationship Pst>Prt, the effect of setting the relationship between the boss part outer diameter Db and the rotor outer diameter Db within the range of 0.46<Db/Dr<0.53 and the effect of setting the relationship between the claw-shaped magnetic pole part surface area As and the boss part cross-sectional area Ab within the range of 0.9<As/Ab<1.7 are very significant.

The ratio of the permeance Prt of the d-axis magnetic circuit 36 to the permeance Pst of the q-axis magnetic circuit 37 is set to Pst:Prt=2n:1 (n is a real number of 1 or larger). In this example, the ratio (Lq/Ld) of a q-axis inductance Lq to a d-axis inductance Ld is designated as saliency ratio ρ.

Figure 9:
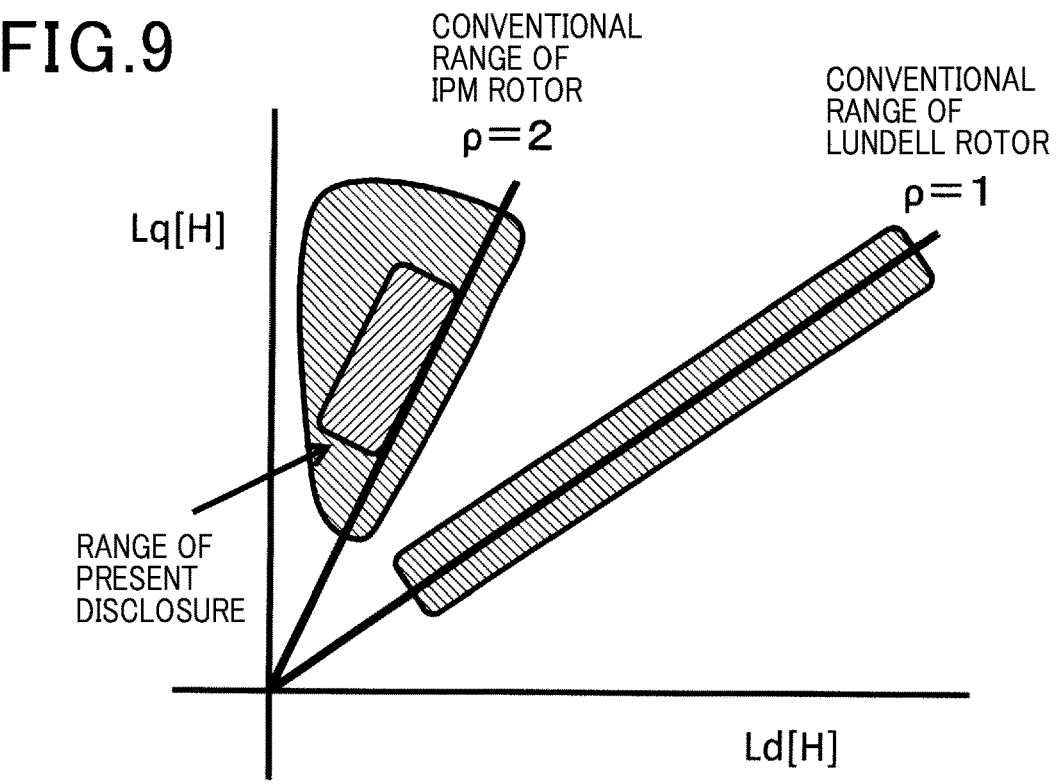
FIG. 9 is a graph illustrating saliency ratios ρ of a Lundell rotor and an IPM rotor.

As illustrated in FIG. 9, the saliency ratio ρ of a conventional Lundell rotor is ρ≈1, and the saliency ratio ρ of a conventional IPM rotor is ρ≈2 to 4. In contrast, in the present embodiment, the permeance ratio of the d-axis magnetic circuit 36 to the q-axis magnetic circuit 37 is set as described above. Accordingly, the operation mode of the Lundell rotor 30 under an electrical load can be brought closer to that of the IPM rotor. In addition, the saliency ratio ρ can be set to 2 or larger. Methods for measuring the permeance Prt of the d-axis magnetic circuit 36 and the permeance Pst of the q-axis magnetic circuit 37 will be described later in detail.

As illustrated in FIGS. 2, 3, and 8, there are formed longitudinally extending clearances in an axially oblique direction between the first claw-shaped magnetic pole parts 323a and the second claw-shaped magnetic pole parts 323b that are alternately arranged in the circumferential direction. One permanent magnet 34 is arranged in each clearance. Each of the permanent magnets 34 has a rectangular solid shape and has an axis of easy magnetization oriented in the circumferential direction. Each of the permanent magnets 34 is held by the first and second claw-shaped magnetic pole parts 323a and 323b while the magnetic pole parts of the permanent magnet 34 on the both circumferential sides are in abutment with the peripheral side surfaces of the first and second claw-shaped magnetic pole parts 323a and 323b. That is, each of the permanent magnets 34 has magnetic poles formed to match the alternating polarities of the first and second claw-shaped magnetic pole parts 323a and 323b produced by the magnetomotive force of the field winding 33.

Figure 10:
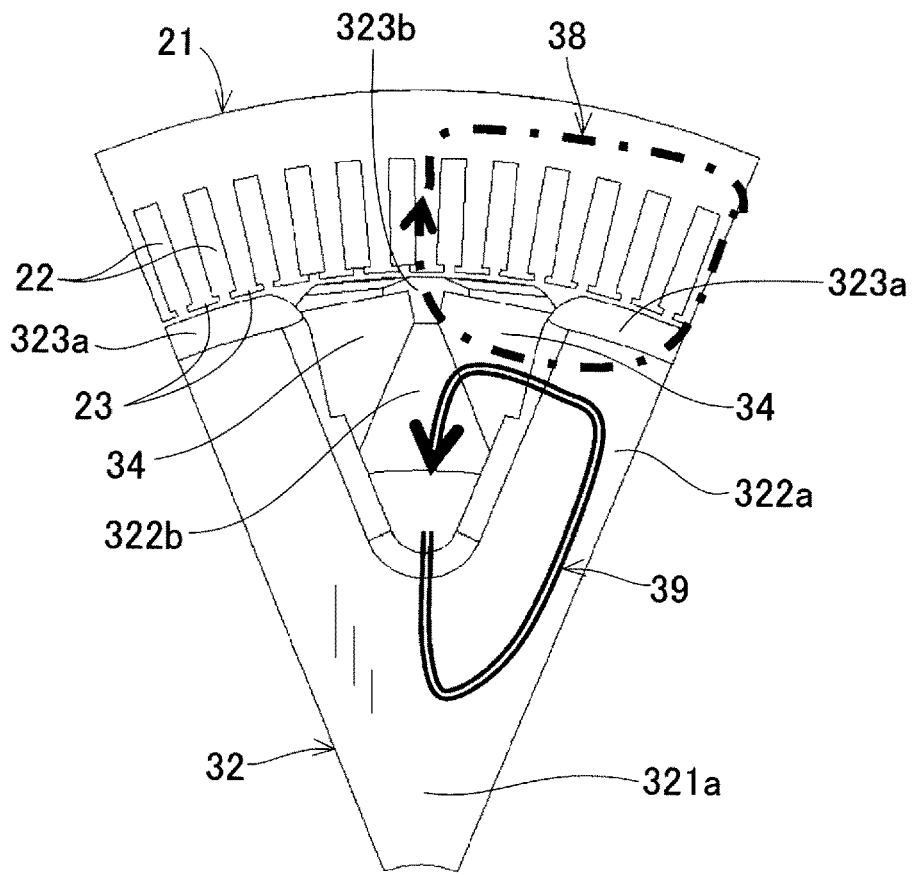
FIG. 10 is a diagram illustrating two magnetic circuits formed by permanent magnets in the rotary electrical machine according to the first embodiment.

In the present embodiment, the permanent magnets 34 are arranged in this manner. As illustrated in FIG. 10, each of the permanent magnets 34 has the first and second magnet magnetic circuits 38 and 39. The first magnet magnetic circuit (indicated by a one-dot chain line in FIG. 10) 38 is a magnetic circuit with, of the magnet magnetic fluxes, the magnetic flux interlinked with the stator 20. The second magnet magnetic circuit (indicated by a double line in FIG. 10) 39 is a magnetic circuit with, of the magnet magnetic fluxes, the magnetic flux passing through the boss part 321a and the disc parts 322a and 322b and returning to the rotor 30. From the viewpoint of these magnetic fluxes, the second magnet magnetic circuit 39 passing through the boss part 321 is a magnetic circuit with the magnet magnetic flux ineffective for the stator 20, whereas the first magnet magnetic circuit 38 is a magnetic circuit with the magnet magnetic flux interlinked with the stator 20 and forming a back-electromotive force and torque.

In this case, the first magnet magnetic circuit 38 and the d-axis magnetic circuit 36 share the magnetic circuit from the second claw-shaped magnetic pole part 323b through the stator 20 to the first claw-shaped magnetic pole part 323a. The second magnet magnetic circuit 39 and the d-axis magnetic circuit 36 share the magnetic circuit that corresponds to the first and second boss parts 321a and 321b and the first and second disc parts 322a and 322b of the rotor 30.

In the present embodiment, the axially extending iron core cross-sectional area of a pair of NS poles of the boss part 321 is designated as Ab and the magnetic flux density of the boss part 321 with a magnetic field of 5000 [A/m] as B50. In addition, the residual magnetic flux density of the permanent magnet 34 arranged between the claw-shaped magnetic pole parts 323 is designated as Br, and the cross-sectional area of the surface of the permanent magnet 34 constituting the magnetic pole as Am. In the present embodiment, the foregoing elements are set to satisfy the relationship $2 \times Br\ [T] \times Am\ [mm^2] < B50\ [T] \times Ab\ [mm^2]$. The settings for this relationship will be described later in detail.

The field winding power supply device 40 is a device for supplying power to the field winding 33. As illustrated in FIG. 1, the field winding power supply device 40 has a pair of brushes 41, a pair of slip rings 42, a regulator 43, and other components. The pair of slip rings 42 is fitted and fixed to one axial end of the rotation shaft 31 (the right end in FIG. 1). The pair of brushes 41 is arranged with the radially inner front ends pressed on the surfaces of the slip rings 42 in a slidable manner. The pair of brushes 41 supplies power to the field winding 33 via the slip rings 42. The regulator 43 regulates the output voltage of the vehicle alternating-current power generator 1 by controlling the field current If to be supplied to the field winding 33. The rectifier 45 is electrically connected to the armature winding 25. The rectifier 45 is a device that rectifies alternating current from the armature winding 25 to direct current. The rectifier 45 is formed from a plurality of diodes (rectifier elements) and other components.

In the vehicle alternating-current power generator 1 configured as described above, when a rotational force from the engine is transferred to the pulley 35 via a belt or the like, the rotor 30 rotates together with the rotation shaft 31 in a predetermined direction. In this state, the vehicle alternating-current power generator 1 applies an exciting voltage from the brushes 41 to the field winding 33 of the rotor 30 via the slip rings 42. Accordingly, the respective first and second claw-shaped magnetic pole parts 323a and 323b of the first and second pole cores 32a and 32b are excited to form alternately the NS poles along the rotational circumferential direction of the rotor 30. As a result, in the vehicle alternating-current power generator 1, a rotating magnetic field is applied to the armature winding 25 of the stator 20. Thus, in the vehicle alternating-current power generator 1, an alternating-current electromotive force is generated in the armature winding 25. The alternating-current electromotive force generated in the armature winding 25 passes through the rectifier 45 and is rectified to direct current, and then is taken from the output terminal and supplied to a battery (not illustrated).

In the vehicle alternating-current power generator 1 configured as described above, the boss parts 321a and 321b of the pole cores 32a and 32b are narrower than the conventional ones or the disc parts 322a and 322b of the pole cores 32a and 32b are thinner than the conventional ones. Accordingly, in the vehicle alternating-current power generator 1, the field winding 33 can be wound an increased number of times by the narrowing of the boss parts 321a and 321b or the thinning of the disc parts 322a and 322b. Otherwise, in the vehicle alternating-current power generator 1, the wire material for the field winding 33 can be thickened by the narrowing of the boss parts 321a and 321b or the thinning of the disc parts 322a and 322b. As a result, in the vehicle alternating-current power generator 1, the volume ratio of the field winding 33 increases in the rotor 30 including the field core 32 and the field winding 33. The field winding 33 is formed from a wire material made of copper or the like, which is higher in thermal conductivity than the field core 32 made of iron or the like. That is, in the rotor 30 including the field core 32 and the field winding 33, the volume ratio of the field winding 33 higher in thermal conductivity than the field core 32 increases. Accordingly, in the vehicle alternating-current power generator 1, the rotor 30 can be improved in heat dissipation. Thus, the vehicle alternating-current power generator 1 allows the rotor 30 to be cooled by air.

In addition, in the vehicle alternating-current power generator 1, the total amount of the material for the pole cores 32a and 32b can be decreased by the narrowing of the boss parts 321a and 321b or the thinning of the disc parts 322a and 322b. Therefore, welding pressure necessary for forge processing can be reduced. Accordingly, although the boss part 321 is separately formed in the present embodiment, the boss part 321 and the disc parts 322, and also the claw-shaped magnetic pole parts 323 can be integrally molded in an easy manner.

<About the Setting of the Relationship $2 \times Br\ [T] \times Am\ [mm^2] < B50\ [T] \times Ab\ [mm^2]$>

The rotary electrical machine in the present disclosure is a vehicle rotary electrical machine that is connected to a power source of 12 to 48 [V], or 6 to 60 [V] including a range of tolerance, and can function as an alternator or a starter. Accordingly, in the rotary electrical machine of the present disclosure, the back-electromotive force is not to be large unlike in an IPM rotor. A usual group of products with a rotor diameter of about 70 to 120 [mm] and a rotor axial length of about 30 to 80 [mm] generates a back-electromotive force of 200 to 300 [V] in an IPM rotor. In this situation, there is a concern that overcharging of a 12 to 48-[V] battery may occur, or there may be some negative influence of high voltage on other electric components even in the absence of overcharge. Accordingly, the back-electromotive force cannot be sufficiently lowered.

To solve this problem, in the rotary electrical machine of the present disclosure, the relationship $2 \times Br\ [T] \times Am\ [mm^2] < Bs\ [T] \times Ab\ [mm^2]$ is satisfied. Otherwise, the magnetic flux cannot be sufficiently lowered. The symbol Bs [T] represents the saturation flux density of the field core 32. The Br [T] cannot be sufficiently absorbed without sufficiently high relative permeability. The saturation flux density Bs [T] of the field core 32 is employed here as the value of B50 [T] that is usually used.

A usual 12 to 48-[V] product has a magnetomotive force of 2500 [AT] or less applied to the field core 32. Thus, the thickness (mm) and holding capacity (Hc) of the permanent magnets 34 are designed at a safety ratio of about 5000 [A] or more. The Br value and the Hc value vary somewhat depending on the temperature assumed by the designer. However, the range of 5000 [A] needs to fall within a temperature range of −40 to 160 [° C.] in which the product is supposed to be used. The present disclosure specified by the permanent magnets 34 designed at about 5000 [A] and the value of B50 as the magnetic flux density at 5000 [A] is very high in reliability. Prior to this, the relative magnetic permeability is as sufficiently high as 30 or more. The permanent magnets 34 with the residual magnetic flux density Br are connected to air gaps for insertion or air gaps for holding an air gap distance of about 1 [mm] at maximum in the field core 32 and are placed with a sufficiently high permeance in the magnetic circuit. Accordingly, the effective magnetic flux density Bd [T] can be sufficiently considered to be equal to Br [T].

<Methods for Measuring the Permeances>

Figure 11:
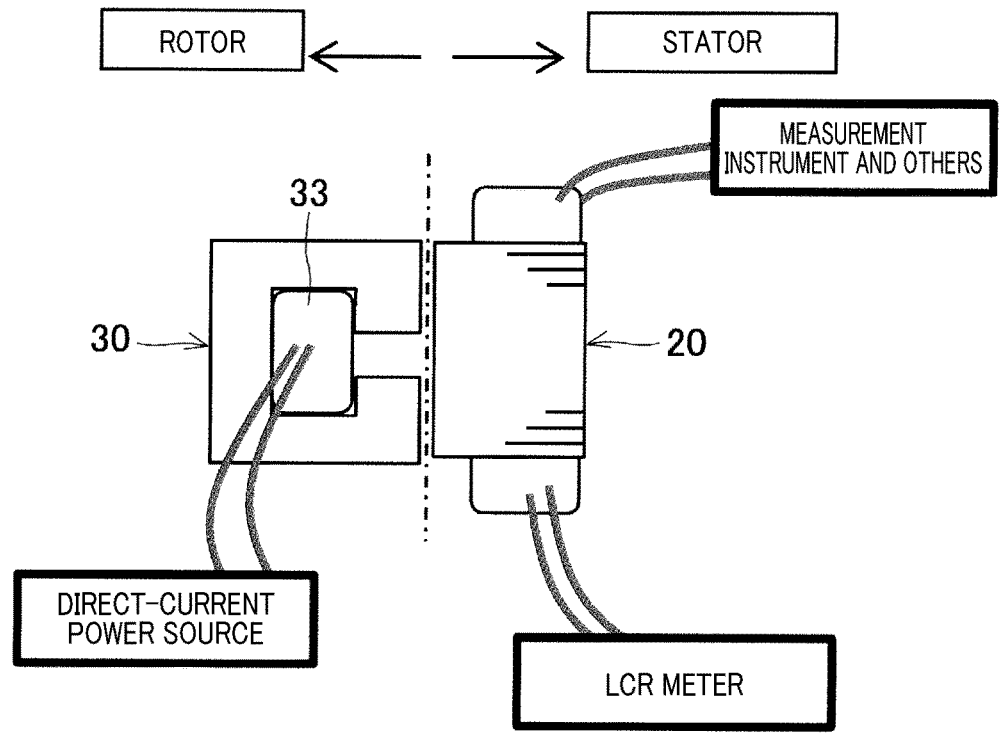
FIG. 11 is a diagram for describing a method for measuring permeances in the first embodiment.
Figure 12:
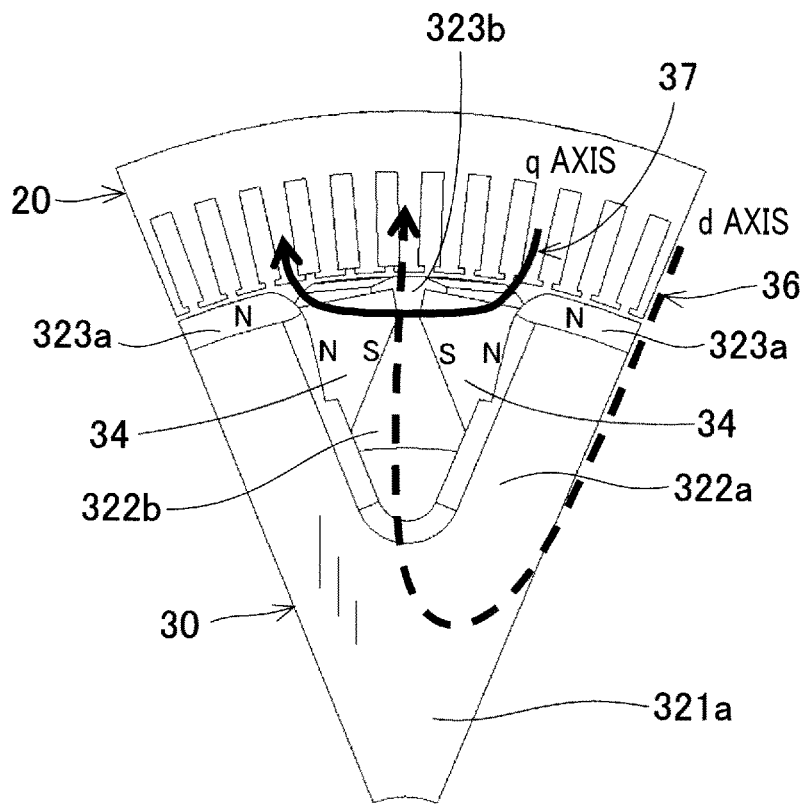
FIG. 12 is a diagram for describing the method for measuring permeances in the first embodiment.

Methods for measuring the permeance Prt of the d-axis magnetic circuit 36 and the permeance Pst of the q-axis magnetic circuit 37 will be described. FIGS. 11 and 12 schematically illustrate the N pole and S poles of the rotor 30, the field winding 33, and the stator 20. At the time of measurement, a direct-current power source is connected to the field winding 33. In addition, a measurement instrument with an LCR meter and a voltage probe is connected to any of the terminals of the conducting stator 20. The measurement instrument may be any instrument capable of measuring a voltage such as an oscilloscope. Accordingly, the measurement instrument can be a combination of a voltage probe and any voltmeter.

In this case, the stator 20 and the rotor 30 are preferably in the positional relationship in which the stator 20 is not subjected to field weakening excitation with respect to the center of the d axis of the rotor 30 but is subjected to excitation toward the q axis. This is because, in the case of field weakening excitation, applying field weakening to the field circuit of the rotor 30 might not allow correct measurement. As a matter of course, at an electrical angle of about 15° or less at which field weakening is less effective, the effect of field weakening is sin 15°≈0.25 in excitation magnetic flux. Accordingly, a certain degree of reliable data can be obtained in the positional relationship with the maximum inductance within a range of electrical angle ±15° from the energization of the q axis. For consideration excluding magnet magnetic flux, the measurement is preferably made without the permanent magnets 34 or with the permanent magnets 34 sufficiently demagnetized.

Figure 13:
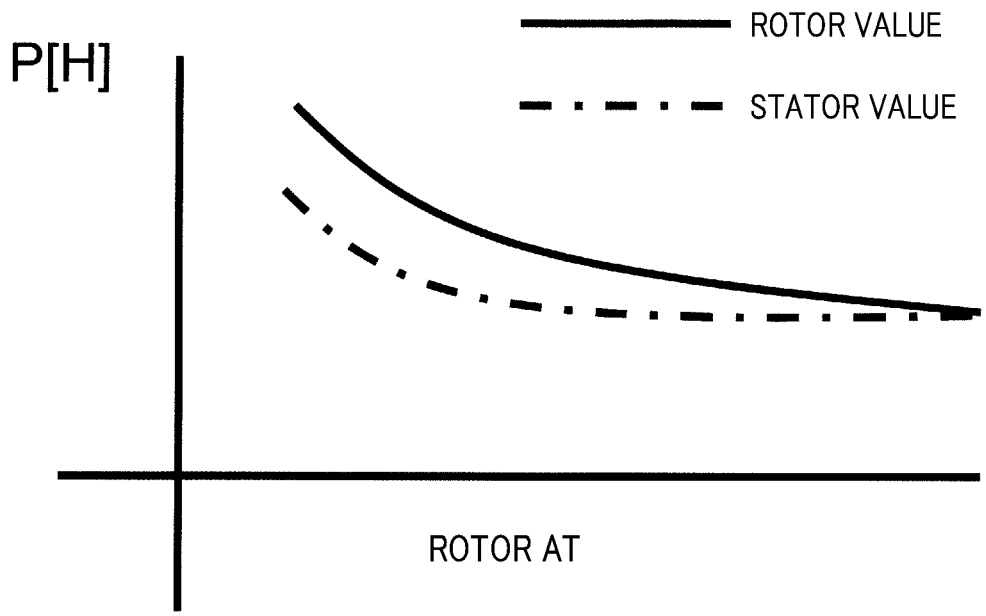
FIG. 13 is a diagram illustrating measurement results of permeances in a rotary electrical machine according to a first comparative example.
Figure 14:
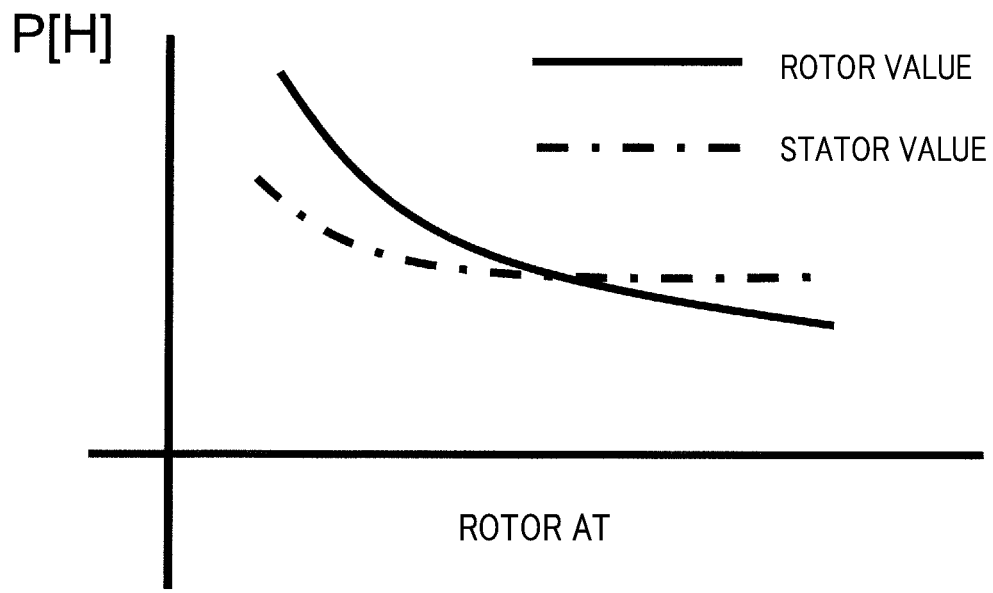
FIG. 14 is a graph illustrating measurement results of permeances in the rotary electrical machine according to the first embodiment.

FIG. 13 is a graph illustrating the measurement results of permeances in a rotary electrical machine according to a first comparative example. FIG. 14 is a graph illustrating the measurement results of permeances in the rotary electrical machine according to the first embodiment. The first comparative example is targeted at a rotary electrical machine prescribed by the mathematical expression described in PTL 1. As illustrated in FIG. 13, in the first comparative example, the permeance of the rotor 30 is higher at no load. However, as the field current of the rotor 30 is increased, the permeance of the rotor 30 becomes equal to that of the stator 20. At no load, the stator 20 is lower in permeance than the rotor 30 due to the magnetic barrier on the q axis and the magnets. That is, the magnetic flux is unlikely to flow into the stator 20 to prevent overcharge resulting from a back-electromotive force at no load. Although the first comparative example and the present embodiment are identical in this point, the permeance of the stator 20 is higher than that of the rotor 30 under an electrical load. That is, the magnetic flux is likely to flow into the stator 20, which makes it possible to increase the back-electromotive force under an electrical load and obtain high main magnetic flux torque (main magnetic flux (magnet magnetic flux+field flux)×current value). In this case, Tm [Nm]=Ψ×Iq where Tm represents magnet torque, Ψ represents main magnetic flux, and Iq represents q-axis current.

Figure 15:
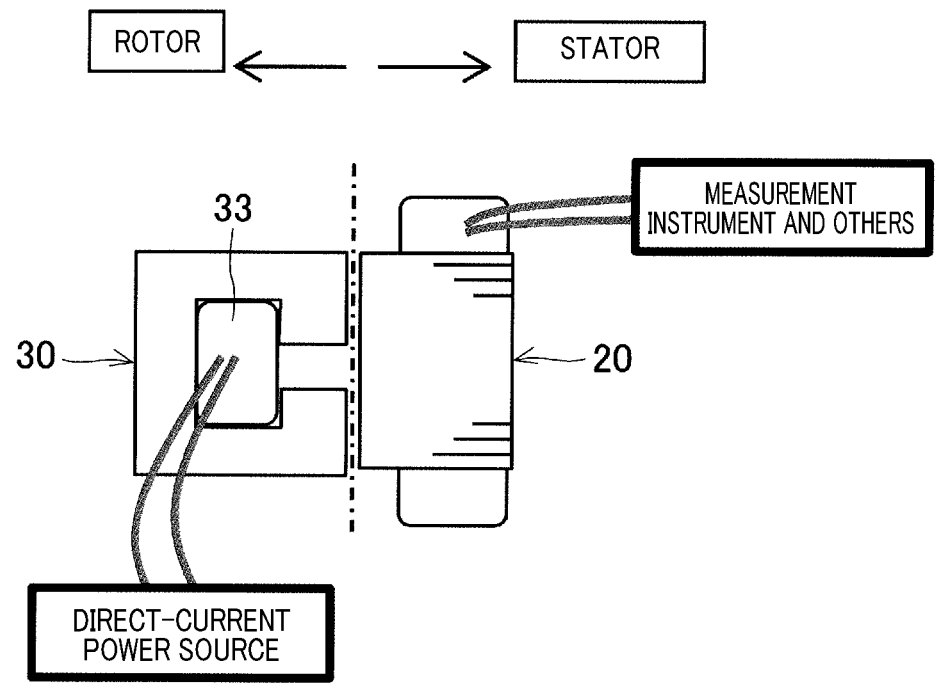
FIG. 15 is a diagram for describing a method for measuring a permeance in a rotor in the first embodiment.
Figure 16:
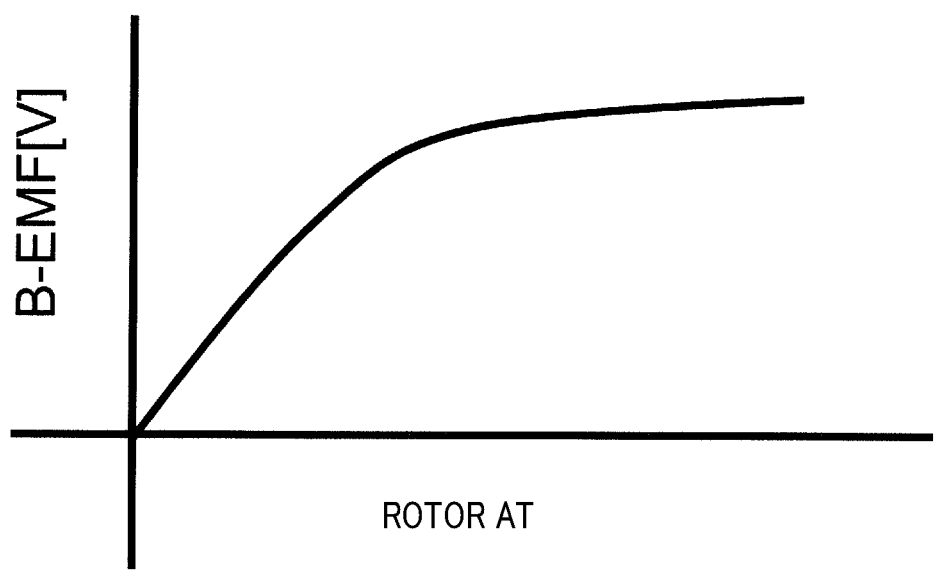
FIG. 16 is a diagram for describing the method for measuring a permeance in the rotor in the first embodiment.

Next, a method for calculating the permeance of the rotor 30 will be described with reference to FIGS. 15 and 16. The field winding 33 is caused to generate a magnetic field and excite a field circuit (the d-axis magnetic circuit 36) by a direct-current power source. At this time, the rotor 30 is rotated to generate a back-electromotive force. The rotor 30 is operated at a constant velocity with an arbitrarily set number of rotations to measure the back-electromotive force. The back-electromotive force increases depending on the number of rotations of the rotor 30. It is obvious that the back-electromotive force of the rotor 30 tends to be saturated in change of inclination in combination with the saturation of the field circuit. In this case, an inductance L_0 at no load is considered as a magnetic flux change between 0 [AT] and 0+X [AT]. With regard to the indexes, for example, the inductance at 100 [AT] excitation is described as L_100. The excitation current I indicates (inflow current value of the direct-current power source)×(the number of turns of the field winding 33 on the boss part 321).

$$L\_0=(V\_x-V\_0)/(I\_x-I\_0)$$

For example, the inductance at the time of 100 [AT] excitation is expressed as follows:

$$L\_100=(V\_200-V\_100)/(200-100)$$

In this case, the denominator is already multiplied by the number of turns and thus the permeance value [H] of the rotor 30 equals to these inductance values [H], that is, $P=L/N^2$.

Figure 17:
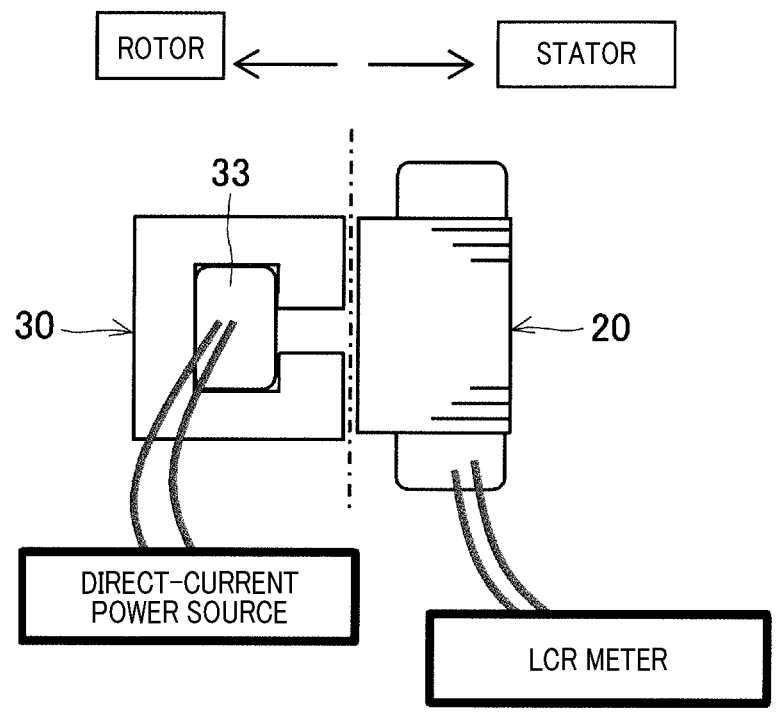
FIG. 17 is a diagram for describing the method for measuring a permeance in a stator in the first embodiment.
Figure 18:
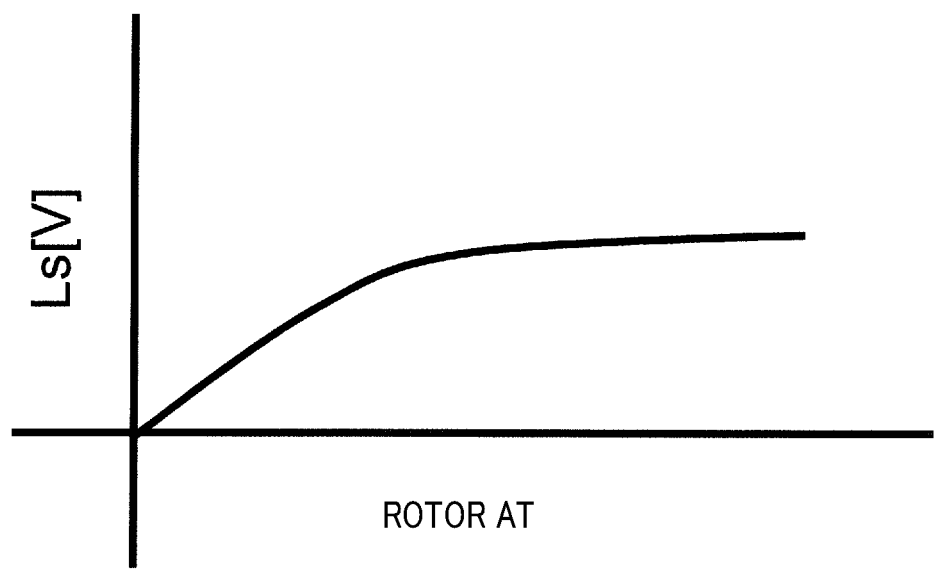
FIG. 18 is a diagram for describing the method for measuring a permeance in the stator in the first embodiment.
Figure 19:
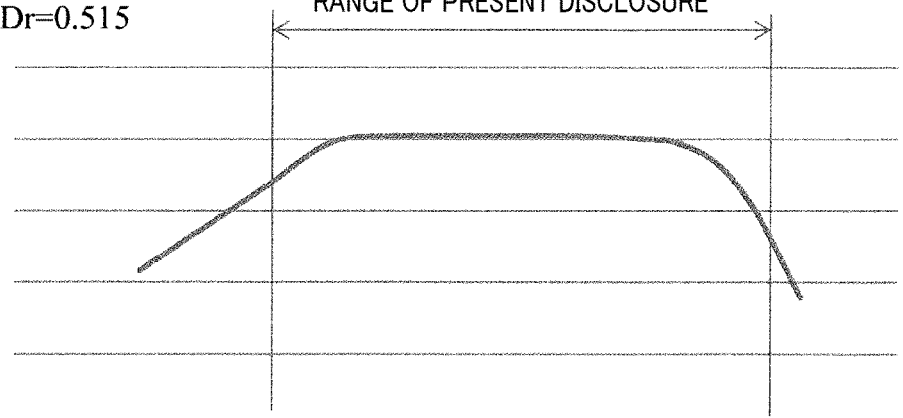
FIG. 19 is a graph illustrating the relationship between the ratio (As/Ab) of a claw-shaped magnetic pole part surface area As to a boss part cross-sectional area Ab and the amount of an interlinked magnetic flux under an electrical load on the stator.
Figure 19:

Next, a method for calculating the permeance value of the stator 20 will be described with reference to FIGS. 17 and 18. The field winding 33 is caused to generate a magnetic field and excite a field circuit (the d-axis magnetic circuit 36) by a direct-current power source. At this time, while the stator 20 and the rotor 30 are in the foregoing positional relationship, when the stator 20 is energized, a magnetic flux change takes place. When the rotation shaft 31 of the rotary electrical machine is locked to increase the field current If, the magnetomotive force of the stator 20 becomes lower. Accordingly, the decrease in the inductance can be measured. The inductance value is divided by the square of series conductor number of the stator 20 to determine the permeance value, that is, $P=L/N^2$.

<About the Relationship Between the Claw-Shaped Magnetic Pole Part Surface Area As and the Boss Part Cross-Sectional Area Ab and the Relationship Between the Boss Part Outer Diameter Db and the Rotor Outer Diameter Dr>

The effective use range of a magnet magnetic flux will be discussed here. In the relational expression described in PTL 1, the condition is partial. Accordingly, when the boss part of the field core is changed in size, the relational expression may not hold. Accordingly, the entire rotor will be taken into account.

In a disc-pole rotary electrical machine, the axial length of the stator can be used completely by generating a magnetic flux at a position (the boss part) not located between the opposing surfaces of the stator and the rotor and passing the magnetic flux in the axial direction. In such a claw-pole rotary electrical machine, as illustrated in FIG. 4, the magnetic flux is output under the condition that the boss part cross-sectional area Ab, the cross-sectional area Ad of the disc part 322 (hereinafter, also called "disc part cross-sectional area Ad"), and root cross-sectional area At of the claw-shaped magnetic pole part 323 (hereinafter, also called "claw-shaped magnetic pole part cross-sectional area At") are constant in usual.

When a step portion is formed with a decreased cross-sectional area from the boss part 321 to the disc part 322, the decreased cross-sectional area of the portion is regarded as the boss part cross-sectional area Ab or the disc part cross-sectional area Ad. Providing the step portion makes it possible to change the amount of a permissible magnetic flux. Each of the claws (the claw-shaped magnetic pole parts 323) has an opposing surface area (the area of a surface opposing to the appropriate stator 20 corresponding to the boss part cross-sectional area Ab) though which the field flux generated in the boss part 321 can be passed by power distribution to the field winding 33 (not illustrated in FIG. 4) wound on the outer peripheral side of the boss part 321.

As illustrated in FIG. 4, when the disc part 322 extends over the stator 20, the claw-shaped magnetic pole part surface area As can be decreased as compared to the boss part cross-sectional area Ab by the extension of the disc part 322 over the axial length Tst of the stator 20. That is, Ab≈Ad≈As, or As≈Ab−(Tst−Tb)/2×W can be calculated as an ideal value. In this example, there are increased number of magnetic power sources for the rotor with the permanent magnets 34. Accordingly, another solution should exist.

In the rotor 30 with the permanent magnets 34 and the field circuit, the magnet magnetic flux is branched into two directions, a route passing through the rotor 30 against the field flux (the d-axis magnetic circuit 36) (the second magnet magnetic circuit 39 illustrated in FIG. 10) and a route traveling to the stator 20 (the first magnet magnetic circuit 38 illustrated in FIG. 10). That is, the three cross-sectional areas illustrated in FIG. 4, the boss part cross-sectional area Ab, the disc part cross-sectional area Ad, and the claw-shaped magnetic pole part cross-sectional area At should be smaller than conventional ones. At the same time, the electromotive force needs to be considered while the relationship Ab×B50≥2×Am×Br is satisfied. In addition, at this time, the boss part outer diameter Db (see FIG. 3) becomes small. Accordingly, the arrangement space of the field winding 33 should become larger with decrease in the amount of heat generation.

When the rotor outer diameter Dr (see FIG. 3) is determined, the ratio of the width W of the claw-shaped magnetic pole part 323 to the width of each pole of the boss part 321 hardly changes. Accordingly, the ratio of the rotor outer diameter Dr to the boss part outer diameter Db should be uniquely determined. The boss part outer diameter Db can be calculated from the magnet magnetic flux and the field flux flowing rearward. Needless to say, for suppression of heat generation, the electrical resistance value of the field winding 33 is to be set to 0.1 to 1.0 [Ohm] in a motor or to 1.0 to 3.0 [Ohm] in a power generator, with consideration given to the present air-cooling performance.

$$Ab \times B50 - 2 \times Am \times Bd \times (Prt/(Pst+Prt)) = Abopt \text{(ideal value of } Ab\text{)}$$

In the present technical level, the claw-shaped magnetic pole part surface area As is enough to permit the field flux to flow. The conventional permanent magnets mainly play the role of preventing leakage of a magnetic flux between claw-shaped magnetic pole parts. Accordingly, in presently available neodymium magnet-equipped Lundell rotary electrical machines, the claw-shaped magnetic pole part surface areas As are distributed in a range corresponding to the boss part cross-sectional area Ab. That is, the values of As are distributed in a range with reference to Ab satisfying Ab×0.8 to Ab×1.2. In the present disclosure, the calculation formula Bd×(Pst/(Pst+Prt)) can be effectively used. Accordingly, the claw-shaped magnetic pole part surface area As responsible for exchanging the magnetic flux with the stator 20 has a magnet satisfying 2×Am=Ab×B50÷Br in Ab×Bs. Thus, the claw-shaped magnetic pole part surface area As needs to be dimensioned to be sufficient to pass the magnetic flux of the rotor 30 with an optimum value of [As=Bd×Am+Ab×Bs] to the stator 20, which should be larger than Ab×1.2.

The effective use range of the magnet magnetic flux with Ab×B50=2×Am×Br will be discussed. This means that the field circuit needs to be dimensioned to be sufficient to block the magnet magnetic flux. In this state, FIG. 19 indicates the ratio (As/Ab) of the claw-shaped magnetic pole part surface area As to the boss part cross-sectional area Ab on the lateral axis and indicates the interlinked magnetic flux amount under an electrical load on the stator 20 on the vertical axis. As seen from FIG. 19, the interlinked magnetic flux amount usually peaks in an As/Ab range of 1.0 to 1.5, preferably in an As/Ab range of 0.9 to 1.7. The range of As/Ab in the conventional technique (PTL 1) is about 0.4 to 0.8, which does not overlap but is separate from the preferred As/Ab range in the present disclosure.

Figure 20:
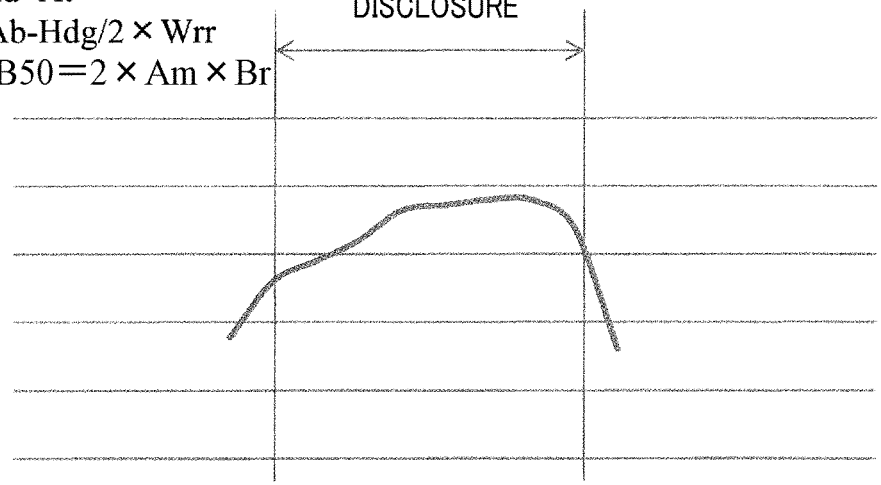
FIG. 20 is a graph illustrating the relationship between the ratio (Db/Dr) of a boss part outer diameter Db to a rotor outer diameter Dr and the amount of an interlinked magnetic flux under an electrical load on the stator.
Figure 20:

Further consideration will be given with As/Ab=1.4. The following consideration is based on the assumption that the amount of the field flux and the suppressed amount of the magnet magnetic flux are appropriate and the magnets can be utilized to the same degree as in an IPM rotor. In this case, the optimum value of the boss part outer diameter Db is calculated. FIG. 20 indicates the ratio (Db/Dr) of the boss part outer diameter Db to the rotor outer diameter Dr on the lateral axis and indicates the amount of the interlinked magnetic flux under an electrical load on the stator 20 on the vertical axis. As seen from FIG. 20, the amount of the interlinked magnetic flux peaks around a Db/Dr of 0.51, preferably in a Db/Dr range of 0.46 to 0.53. The Db/Dr range in the conventional technique (PTL 1) is about 0.54 to 0.595, which does not overlap but is separate from the preferred Db/Dr range in the present disclosure.

Figure 21:
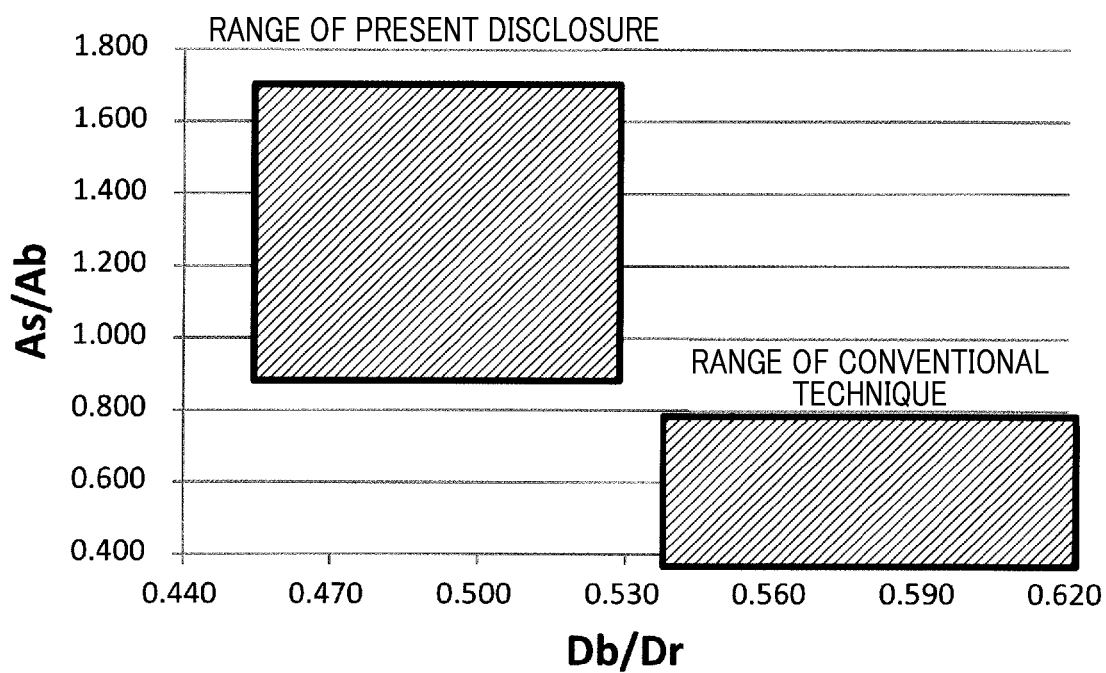
FIG. 21 is a diagram illustrating the relationship between the ratio (As/Ab) of the claw-shaped magnetic pole part surface area As to the boss cross-sectional area Ab and the ratio (Db/Dr) of the boss part outer diameter Db to the rotor outer diameter Dr.
Figure 22:
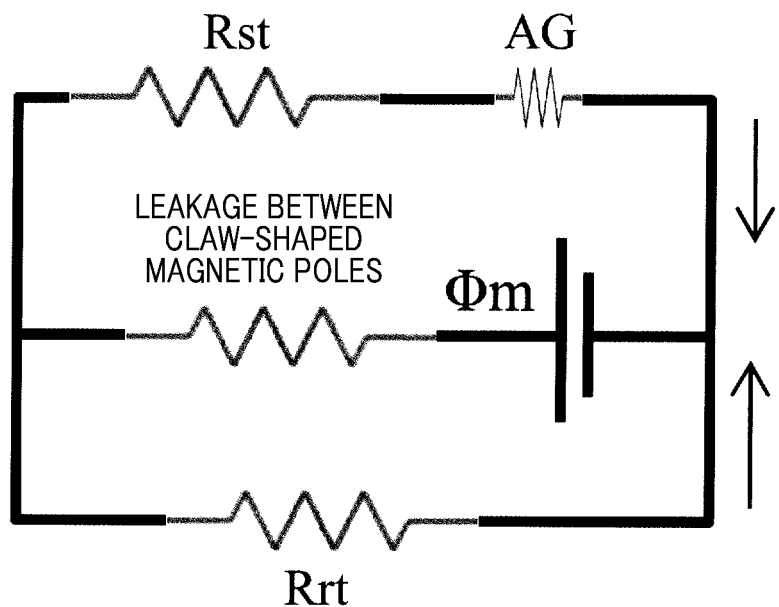
FIG. 22 is an equivalent magnetic circuit diagram of a magnet-equipped Lundell rotor.
Figure 23:
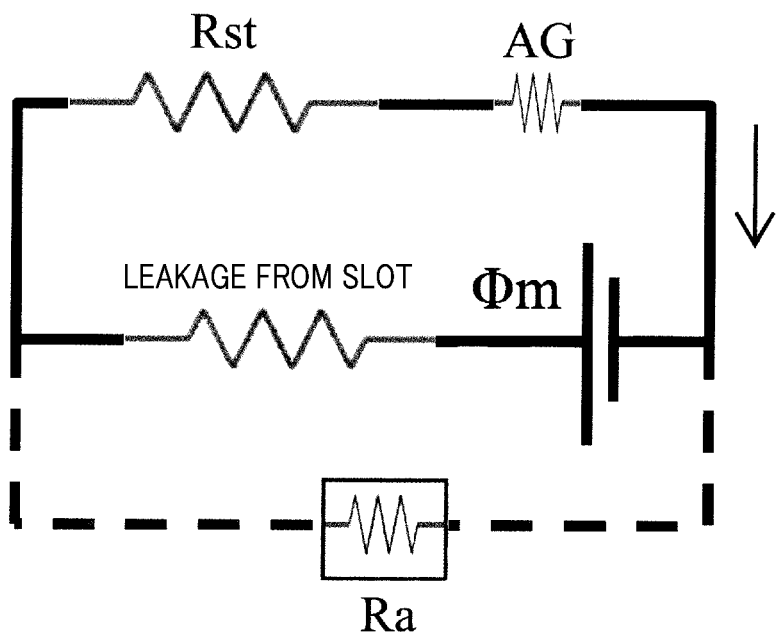
FIG. 23 is an equivalent magnetic circuit diagram of an IPM rotor.

FIG. 21 indicates the ratio (As/Ab) of the claw-shaped magnetic pole part surface area As to the boss part cross-sectional area Ab on the vertical axis and the ratio (Db/Dr) of the boss part outer diameter Db to the rotor outer diameter Dr on the lateral axis. As seen from FIG. 21, it is obvious that the range in the present disclosure and the range in the conventional technique do not overlap but are separate from each other.

In this consideration, it is assumed that, when the value of Ab×B50=2×Am×Br is large, the magnet has Br=1.2 [T] or so to produce higher effects. The material for the maximum effects is obviously not a Fe magnet with Br=0.4 [T] or so but a neodymium magnet with Br=1 [T] or more. Further, the boss part cross-sectional area Ab is smaller and thus the space saved by the smaller area can be used to decrease the electrical resistance of the field winding 33. This makes it possible to reduce the amount of heat generation by the field winding 33.

<Operations and Advantageous Effects>

In the vehicle alternating-current power generator 1 of the present embodiment, the permanent magnets 34 arranged between the circumferentially adjacent claw-shaped magnetic pole parts 323 form the two magnet magnetic circuits, that is, the first magnet magnetic circuit 38 in which the magnetic flux interlinked with the stator 20 flows and the second magnet magnetic circuit 39 in which the magnetic flux passes through the boss part 321 and returns to the rotor 30. When an electrical load is connected to the rotor 30, that is, when the field current If is distributed to the field winding 33, the d-axis magnetic circuit 36 is formed in which the magnetic flux formed by the magnetomotive force of the field winding 33 flows through the boss part 321 and the pair of claw-shaped magnetic pole parts 323 of the field core 32, and the stator core 21. At this time, the flowing direction of the magnet magnetic flux in, of the two magnet magnetic circuits 38 and 39, the second magnet magnetic circuit 39, is opposite to the flowing direction of the magnetic flux in the d-axis magnetic circuit 36. Accordingly, the magnetic flux of the magnet magnetic circuit is unlikely to flow due to the magnetic resistance being large. In the present embodiment, the relationship between the permeance Prt of the d-axis magnetic circuit 36 and the permeance Pst of the q-axis magnetic circuit 37 is set to establish Pst>Prt. This increases the magnet magnetic flux in, of the two magnet magnetic circuits 38 and 39, the first magnet magnetic circuit 38. Accordingly, the power generation performance can be significantly improved by the efficient use of the magnet magnetic flux.

In the present embodiment, the boss part cross-sectional area is designated as Ab and the magnetic flux density of the boss part 321 with a magnetic field of 5000 [A/m] as B50. In addition, the residual magnetic flux density of the permanent magnet 34 is designated as Br and the cross-sectional area of the surface constituting the magnetic pole of the permanent magnet 34 as Am. In the present embodiment, the foregoing elements are set to satisfy the relationship $2 \times Br \, [T] \times Am \, [mm^2] < B50 \, [T] \times Ab \, [mm^2]$. Accordingly, in the present embodiment, the magnetic force generated by the permanent magnet 34 can be absorbed by the d-axis magnetic circuit 36. This makes it possible to decrease the back-electromotive force and suppress the power generated in a high-speed rotation state without power distribution.

In the present embodiment, the ratio of the permeance Prt of the d-axis magnetic circuit 36 to the permeance Pst of the q-axis magnetic circuit 37 is set to Pst:Prt=2n:1 (n is a real number of 1 or larger). Accordingly, the operation mode of the Lundell rotor 30 under an electrical load can be brought closer to that of an IPM rotor. In addition, the saliency ratio ρ as the ratio (Lq/Ld) of the q-axis inductance Lq to the d-axis inductance Ld can be set to 2 or more. Accordingly, in the present embodiment, it is possible to output the same degree of reluctance torque as that in an IPM rotor.

In the present embodiment, the relationship between the claw-shaped magnetic pole part surface area As and the boss part cross-sectional area Ab is set within the range of 0.9<As/Ab<1.7. That is, the claw-shaped magnetic pole part surface area As is larger than the boss part cross-sectional area Ab. Accordingly, in the present embodiment, the permanent magnets 34 that have been conventionally used for the purposes of rectifying a magnetic flux between the adjacent claw-shaped magnetic pole parts 323 and preventing leakage of a magnetic flux, are used like permanent magnets in an IPM rotor. This achieves increase of a magnetic flux rather than prevention of leakage of a magnetic flux. That is, the permanent magnets can act as a source for torque increase or a source for power increase.

In the present embodiment, the relationship between the boss part outer diameter Db and the rotor outer diameter Dr is set within the range of 0.46<Db/Dr<0.53. In the present embodiment, the boss part cross-sectional area Ab falls within a range determined with maximum consideration given to counteraction of the magnet magnetic force against the magnetic force of the boss part. The magnetic force of the boss part 321 enough to counteract the counteraction of the magnet magnetic force acts on the field core 32. At this time, with the claw-shaped magnetic pole portion cross-sectional area At, the total magnetic force of the boss part 321 and the total magnetic force of the magnets can be passed to the stator 20.

In the present embodiment, the residual magnetic flux density Br of the permanent magnet 34 is set to 1 or more [T]. In many cases, the magnetic force of a bond magnet made of neodymium-iron-boron or a plastic-molded magnet formed by injection molding of samarium-iron-nitride is incapable of supplying a sufficient demagnetizing field to the field core 32. That is, the cross-sectional area of the magnet is frequently ensured by reducing the space for the field winding 33. Accordingly, the foregoing operations and advantageous effects can be effectively obtained in particular when the residual magnetic flux density Br of the permanent magnet 34 is 1 or more [T].

In the present embodiment, the portion of the field core 32 with the d-axis magnetic circuit 36 is formed from two kinds of materials different in the saturation flux density Bs. The claw-shaped magnetic pole parts 323 are formed from a material high in the saturation flux density Bs, and the portions other than the claw-shaped magnetic pole parts 323 are formed from a material low in the saturation flux density Bs. Accordingly, in the present embodiment, the boss part 321 becomes quickly saturated in magnetic flux and likely to change to the behavior of magnetic flux characteristics of an IPM rotor. This makes it possible to improve the power generation performance in a more reliable manner.

In the present embodiment, the material low in the saturation flux density Bs for the portion other than the claw-shaped magnetic pole parts 323 is higher in magnetic permeability than the material high in the saturation flux density Bs. Accordingly, the effect of absorbing the electromotive force can be enhanced at no load on the rotor 30.

Second Embodiment

A rotary electrical machine according to a second embodiment will be described with reference to FIGS. 24 to 32. The rotary electrical machine according to the present embodiment is a vehicle alternating-current power generator as in the first embodiment. The rotary electrical machine according to the present embodiment is different from the first embodiment in having a brushless structure. The different and important points of the present embodiment will be described below. The components in common with the first embodiments will be given the same reference signs and detailed descriptions thereof will be omitted.

<Overall Configuration of the Vehicle Alternating-Current Power Generator>

Figure 24:
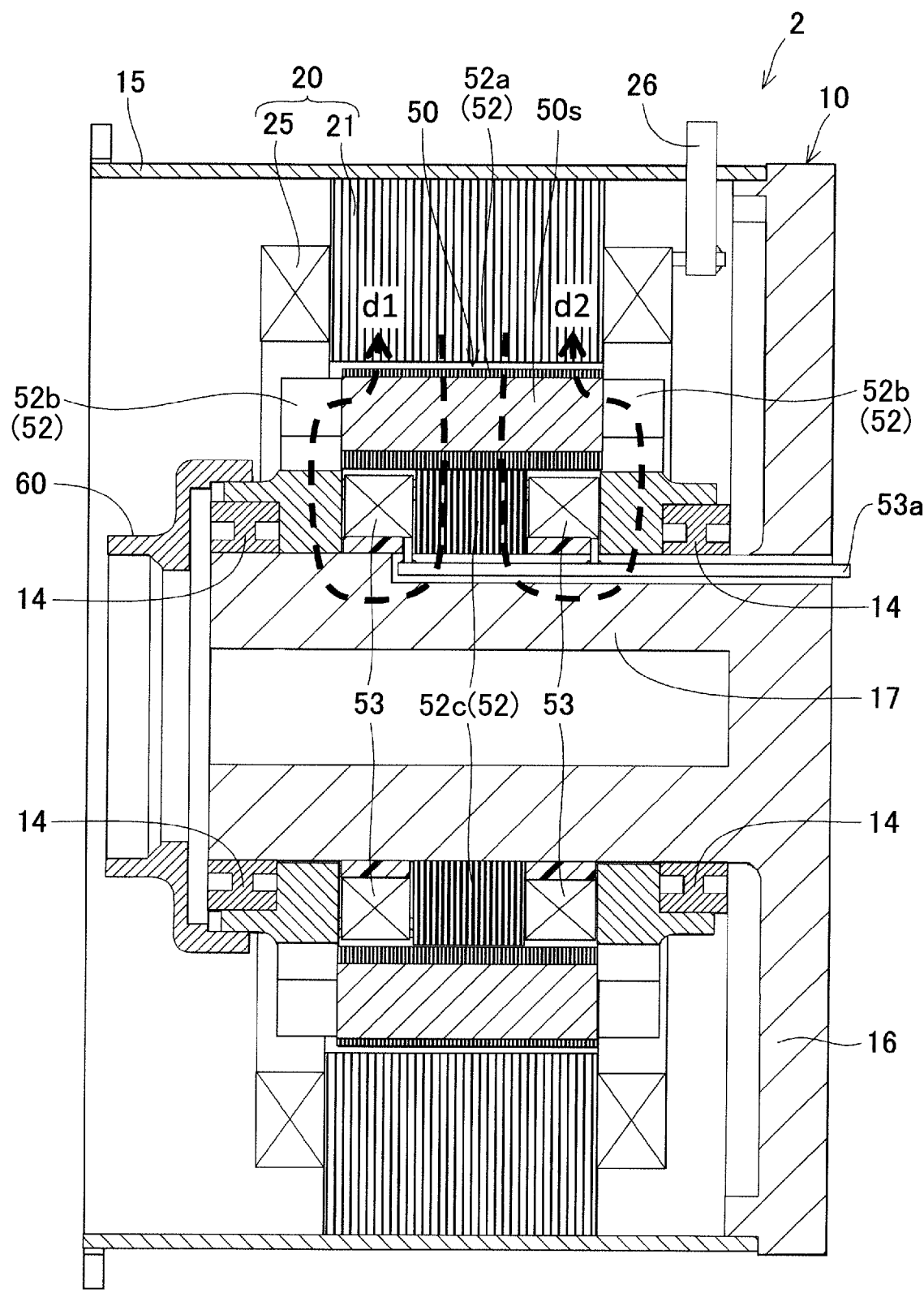
FIG. 24 is an axial cross-sectional view of a rotary electrical machine according to a second embodiment, which corresponds to cross sections of FIGS. 25 and 27 taken along line XXIV-XXIV.
Figure 25:
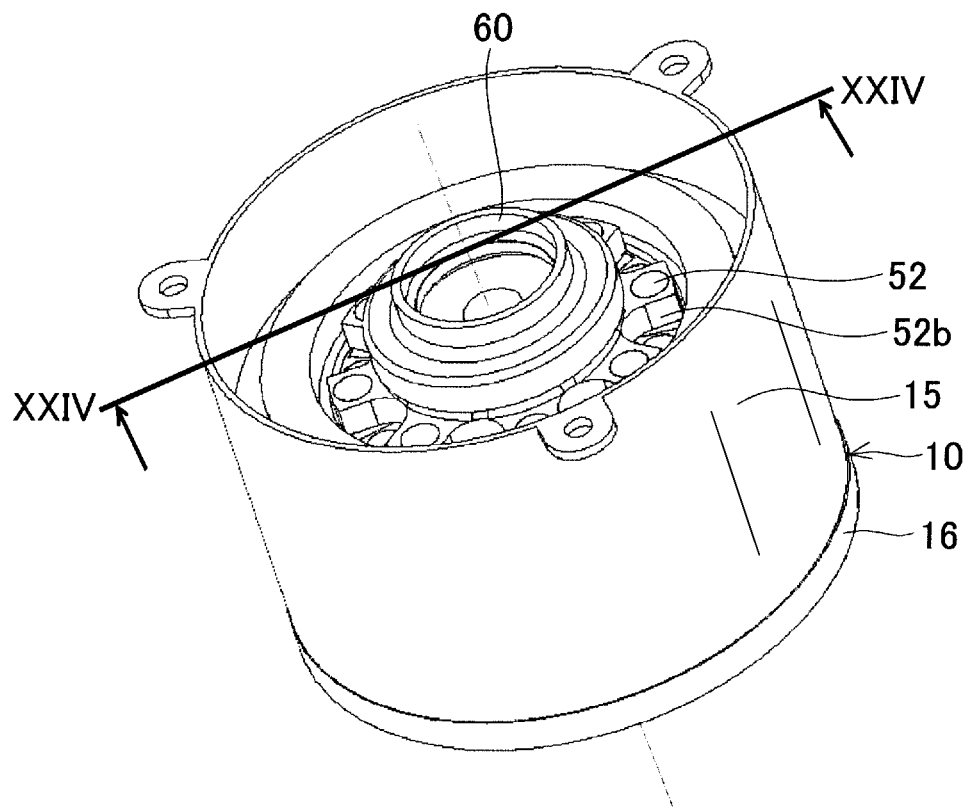
FIG. 25 is a perspective view of the rotary electrical machine according to the second embodiment.
Figure 26:
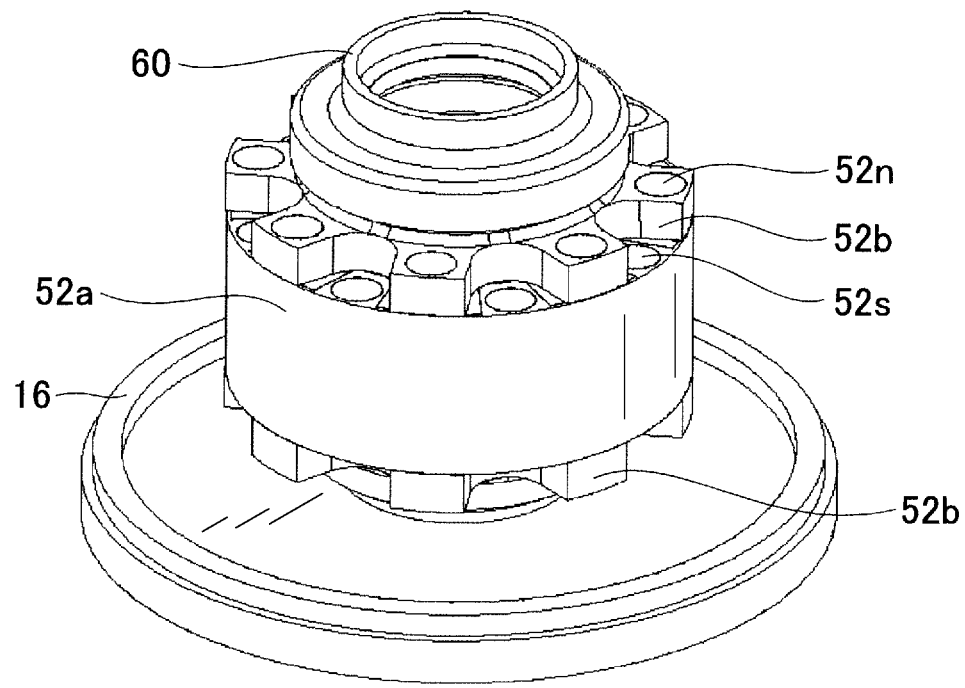
FIG. 26 is a perspective view of a rotor and a cover portion according to the second embodiment.

A vehicle alternating-current power generator 2 in the present embodiment includes an annular stator 20, a rotor 50, a housing 10, and other components as illustrated in FIGS. 24 to 26. The vehicle alternating-current power generator 2 has a brushless structure as described above. The stator 20 is formed by winding the armature winding 25 on the stator core 21. The rotor 50 is radially opposed to the inner peripheral side of the stator 20. The housing 10 stores and supports the stator 20 and the rotor 50.

The housing 10 includes a hollow cylindrical portion 15, a disc-shaped cover portion 16, and a boss part 17. The cover portion 16 is fitted and fixed to an opening on one end side of the cylindrical portion 15. The boss part 17 protrudes axially from the center of the cover portion 16 and is coaxially arranged on the inner peripheral side of the cylindrical portion 15. A pair of field windings 53 generating a magnetomotive force by energization is wound in a state isolated from the boss part 17. The pair of field windings 53 is connected in parallel and are axially separated from each other. The pair of field windings 53 is connected to a power source (not illustrated) supplying the field current If via an output line 53a.

The stator 20 has an annular stator core 21 and an armature winding 25. The stator core 21 has pluralities of slots and teeth (not illustrated) aligned in the circumferential direction. The armature winding 25 is formed from a three-phase winding on the slot of the stator core 21. The armature winding 25 is connected to an output line 26 that outputs three-phase alternating current generated in the armature winding 25. In the stator 20, the outer peripheral surface of the stator core 21 is fixed to the inner peripheral surface of the cylindrical portion 15 of the housing 10.

Figure 27:
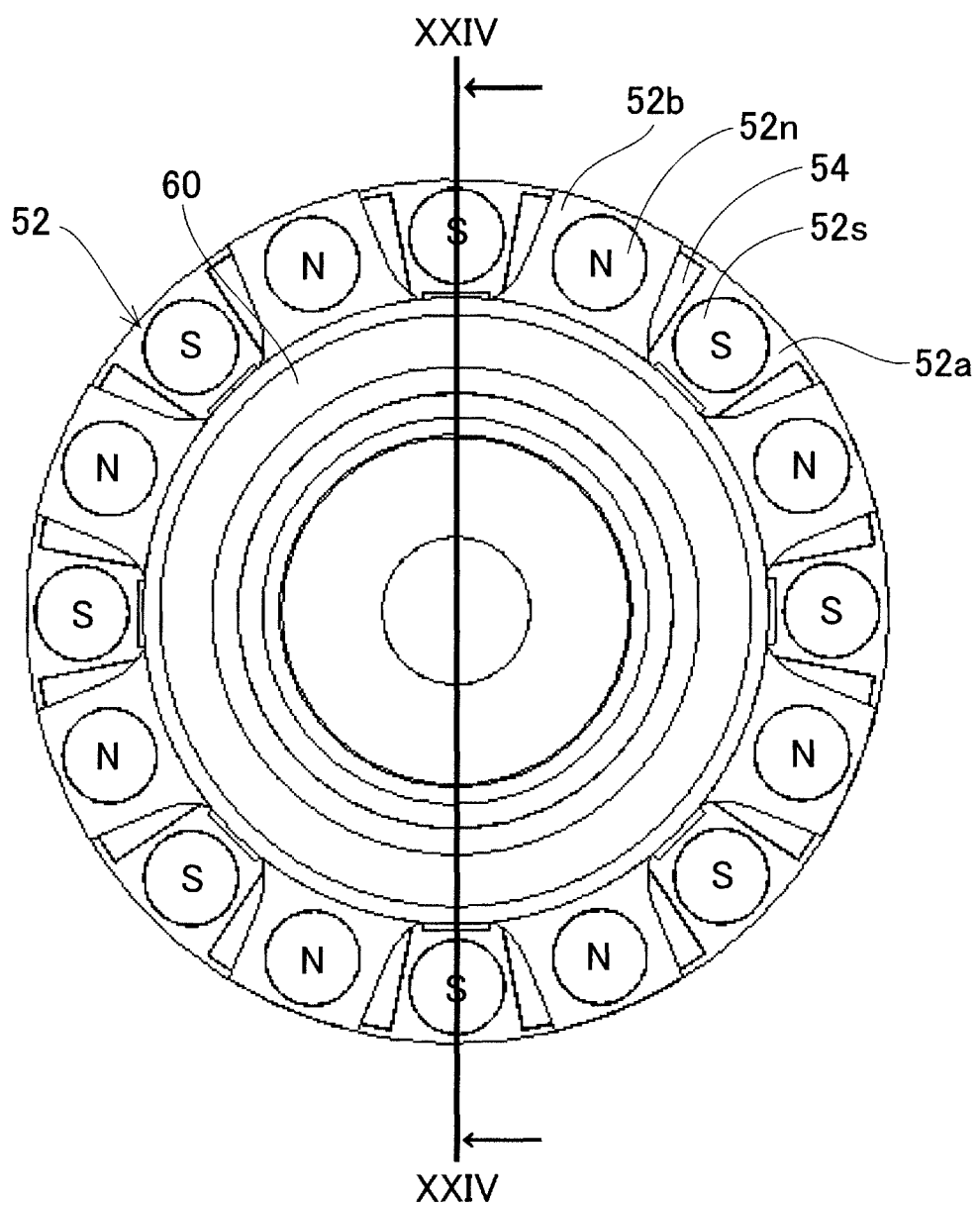
FIG. 27 is a front view of the rotor according to the second embodiment.
Figure 28:
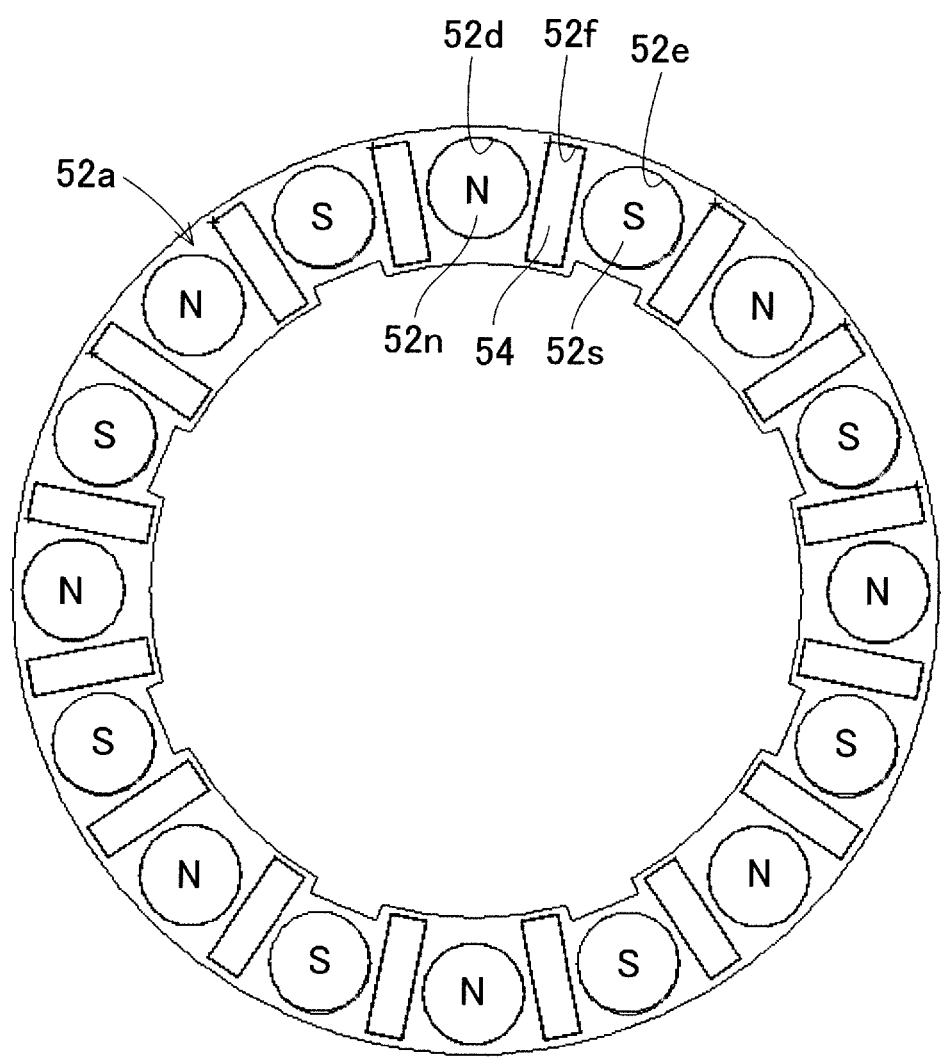
FIG. 28 is a front view of an iron core of the rotor according to the second embodiment.
Figure 29:
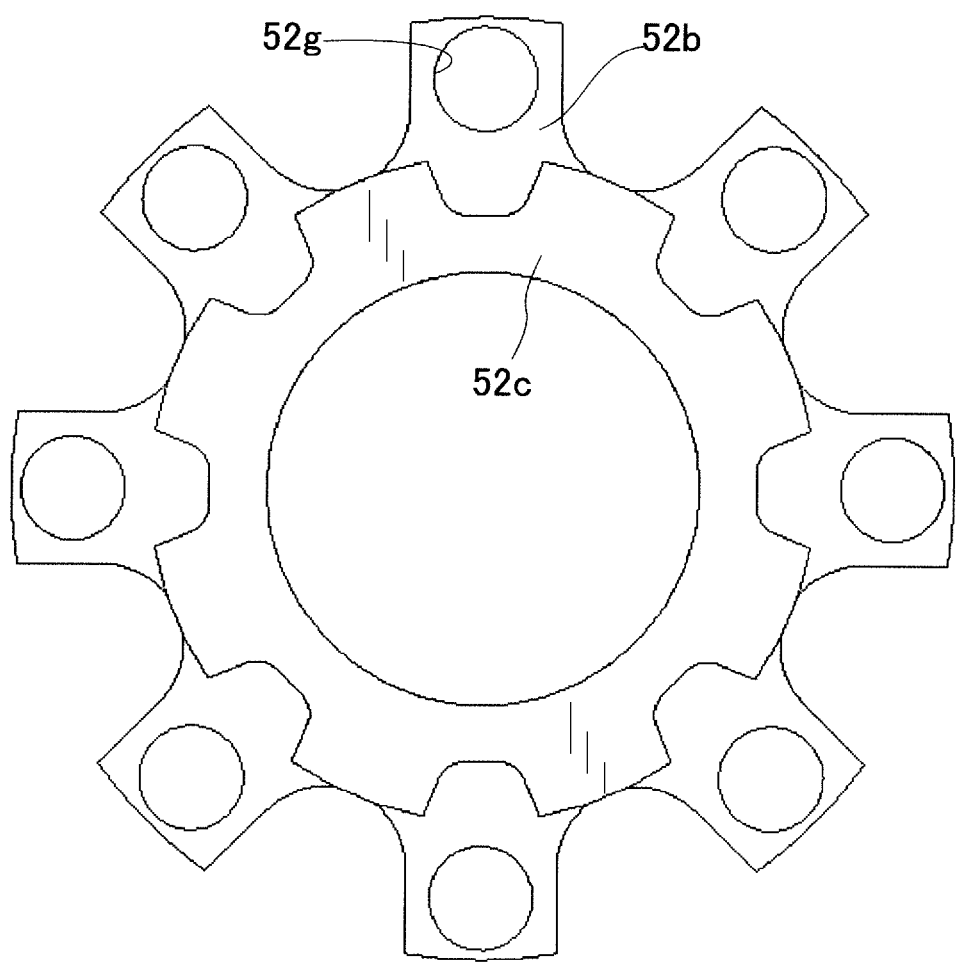
FIG. 29 is a front view of an N pole core and an S pole core of the rotor according to the second embodiment.

The rotor 50 is rotatably supported by the boss part 17 via the pair of bearings 14 provided on the both axial ends of the boss part 17 as illustrated in FIG. 24. The rotor 50 is positioned on the radially and axially outside of the pair of field windings 53 and is radially opposed to the inner peripheral side of the stator 20. The rotor 50 is rotationally driven by an engine (not illustrated) installed in the vehicle via a coupling member 60 and a driving force transfer unit (not illustrated) fitted and fixed to a front-side N pole core 52b. The rotor 50 includes a tandem-type field core 52 and a plurality of permanent magnets 54 as illustrated in FIGS. 27 to 29. The field core 52 has an iron core 52a, a pair of N pole cores 52b, an S pole core 52c, N poles (magnetic pole parts) 52n, and S poles (magnetic pole parts) 52s. The permanent magnets 54 are embedded in the iron core 52a.

The iron core 52a of the field core 52 is formed in a hollow cylindrical shape as illustrated in FIG. 28. The iron core 52a has eight N pole holes 52d circular in cross section, eight S pole holes 52e circular in cross section, and 16 magnet storage holes 52f rectangular in cross section. The N poles 52n are inserted and placed in the N pole holes 52d. The S poles 52s are inserted and placed in the S pole holes 52e. The permanent magnets 54 are embedded in the magnet storage holes 52f. The eight N pole holes 52d and the eight S pole holes 52e are alternately arranged with a predetermined circumferential distance therebetween. The N pole holes 52d and the S pole holes 52e are parallel to each other with respect to the central axis line of the iron core 52a. Accordingly, the N poles 52n stored in the N pole holes 52d and the S poles 52s stored in the S pole holes 52e are axially extended and are alternately arranged in the circumferential direction on the outer peripheral side of the boss part 17. One magnet storage holes 52f is provided at a predetermined distance between each the adjacent N pole hole 52d and S pole hole 52e.

The pair of N pole cores 52b is formed in a ring shape as illustrated in FIG. 29. While sandwiching the both axial end surfaces of the iron core 52a, the inner peripheral surfaces of the N pole cores 52b are fitted and fixed to the outer peripheral surface of the boss part 17 (see FIG. 24). The N pole cores 52b has eight each radially recessed concave portions and radially protruding convex portions alternately formed in the circumferential direction at the outer peripheral portions. The convex portions have hold holes 52g for holding the ends of the N poles 52n. The both ends of the N poles 52n are held in the hold holes 52g of the pair of N pole cores 52b, with axially central portions inserted and fitted into the N pole holes 52d of the iron core 52a.

The S pole core 52c is formed in a ring shape as illustrated in FIG. 29. The inner diameter of the S pole core 52c is the same as the inner diameter of the N pole cores 52b. The S pole core 52c is positioned between the pair of field windings 53 and is fitted and fixed to the outer peripheral surface of the axial center of the boss part 17 (see FIG. 24). The S pole core 52c has eight each radially recessed concave portions and radially protruding convex portions alternately formed in the circumferential direction at the outer peripheral portion. The protruding front end surfaces (outer peripheral surfaces) of the convex portions of the S pole core 52c are at the same positions as the bottom surfaces of the concave portions of the N pole cores 52b. The S pole core 52c is arranged such that the protruding front end surfaces of the convex portions are in contact with the inner peripheral surface of the iron core 52a (see FIG. 24). Accordingly, the S pole core 52c is magnetically connected to the S poles 52s stored in the S pole holes 52e via the iron core 52a.

In the present embodiment, as in the first embodiment, the outer diameter of the boss part of the field core 52 is designated as Db (hereinafter, also called "boss part outer diameter Db") and the outer diameter of the rotor 50 (the field core 32) as Dr (hereinafter, also called "rotor outer diameter Dr"). At this time, in the present embodiment, the relationship between the boss part outer diameter Db and the rotor outer diameter Dr is set within the range of 0.46<Db/Dr<0.53. The relationship between the boss part outer diameter Db and the rotor outer diameter Dr will be described later in detail.

As in the first embodiment, the surface area of the outer peripheral surfaces of the N poles 52n and the S poles 52s to be magnetic pole parts is designated as As (hereinafter, also called "magnetic pole part surface area As"), and the axially extending iron core cross-sectional area of a pair of NS poles of the boss part as Ab (hereinafter, called "boss part cross-sectional area Ab"). In the present embodiment, the relationship between the magnetic pole part surface area As and the boss part cross-sectional area Ab is set within the range of 0.9<As/Ab<1.7. The boss part cross-sectional area Ab is expressed as A/P where A represents the total cross-sectional area of the cylindrical boss part and P represents the number of pole pairs of the rotary electrical machine.

Figure 30:
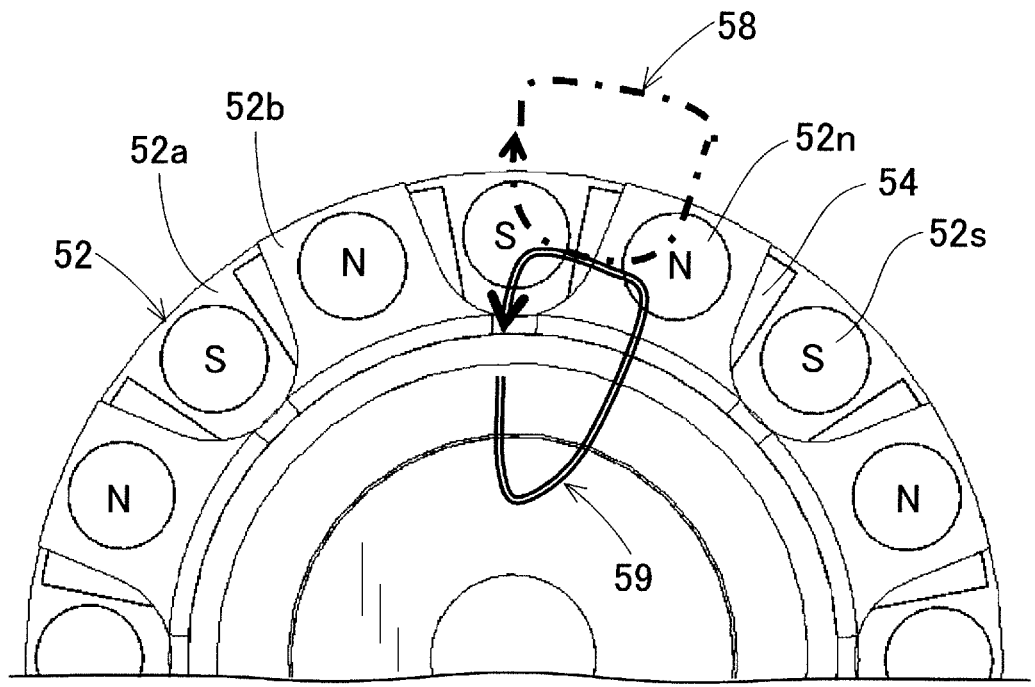
FIG. 30 is a diagram illustrating two magnetic circuits formed by permanent magnets in the rotary electrical machine according to the second embodiment.

The permanent magnets 54 have an outer shape with a rectangular cross section and are individually embedded in the magnetic storage holes 52f of the iron core 52a. The residual magnetic flux density Br of the permanent magnets 54 is set to 1 or more [T]. The permanent magnets 54 are arranged with an axis of easy magnetization oriented in the circumferential direction. The permanent magnets 54 have magnetic poles formed to match the alternating polarities of the magnetic pole parts (the N poles 52n and the S poles 52s) by the magnetomotive force of the field windings 53. In the present embodiment, the permanent magnets 54 are arranged in this manner. Accordingly, as illustrated in FIG. 30, each of the permanent magnets 54 has the first and second magnet magnetic circuits 58 and 59.

The first magnet magnetic circuit (indicated by a one-dot chain line in FIG. 30) 58 is a magnetic circuit with, of the magnet magnetic fluxes, the magnetic flux passing through the S pole hole 52e in the iron core 52a, the permanent magnet 54, and the N pole 52n and returning to the S pole 52s in the iron core 52a through the stator core 21. The second magnet magnetic circuit (indicated by a double line in FIG. 30) 59 is a magnetic circuit with, of the magnet magnetic fluxes, the magnetic flux passing through the S pole 52s in the iron core 52a, the permanent magnet 54, and the N pole 52n, then flowing from the S pole core 52c through the boss part 17 and the N pole core 52b and returning to the S pole 52s in the iron core 52a, and then returning to the rotor 50. From the viewpoint of these magnetic fluxes, the second magnet magnetic circuit 59 passing through the boss part 17 is a magnetic circuit with the magnet magnetic flux ineffective for the stator 20, whereas the first magnet magnetic circuit 58 is a magnetic circuit with the magnet magnetic flux interlinked with the stator 20 and forming a back-electromotive force and torque.

Figure 31:
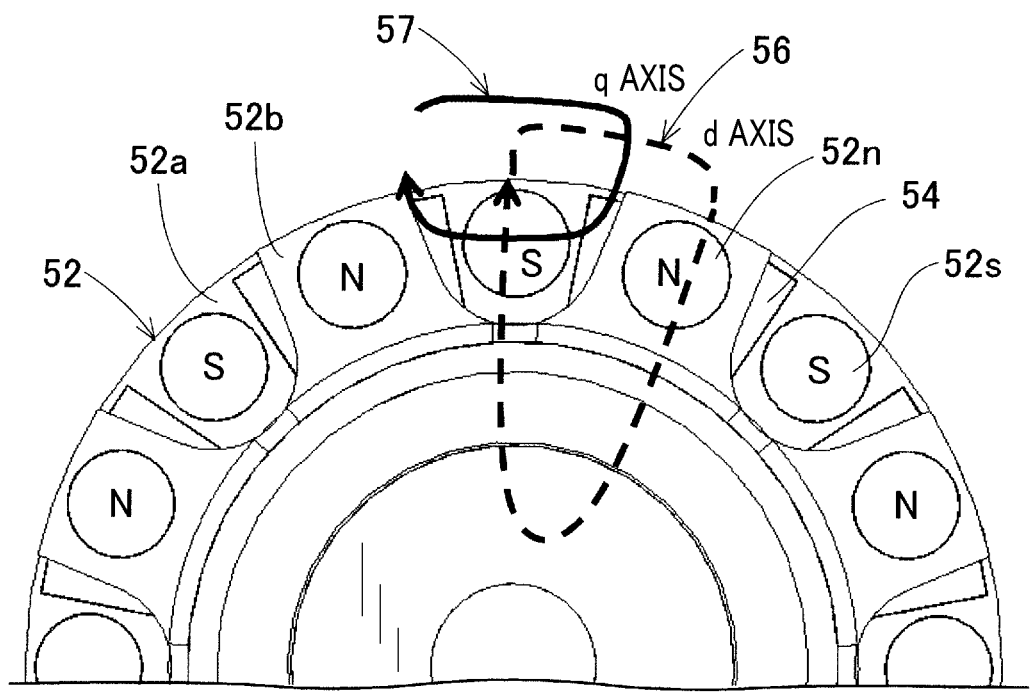
FIG. 31 is a diagram illustrating a d-axis magnetic circuit and a q-axis magnetic circuit formed in the rotary electrical machine according to the second embodiment.

The field windings 53 generate a magnetomotive force in the boss part 17 by distribution of the field current If from a field current control circuit (not illustrated). As a result, the N poles 52n are N-pole magnetized and the S poles 52s are S-pole magnetized. Accordingly, as illustrated in FIG. 31, a d-axis magnetic circuit 56 (indicated by a broken line in FIG. 31) is formed such that magnetic flux flows from the boss part 17 of the housing 10 to the pair of N pole cores 52b and the N pole 52n, then flows from the S pole 52s of the iron core 52a and the S pole core 52c through the stator core 21, and then returns to the boss part 17. In this case, after passing through the S pole core 52c in the axially center, the d-axis orientation of the N poles is reversed on the both axial ends, and thus the d-axis magnetic circuit 56 branches the magnetic flux into two directions, d1 and d2, as illustrated in FIG. 24. The d-axis magnetic circuit 56 is a magnetic circuit that generates a back-electromotive force for the rotor 50.

Current flows into the armature winding 25 by the d-axis magnetic circuit 56 and the magnetic flux interlinked with the stator 20 in the first magnet magnetic circuit 58. This forms a q-axis magnetic circuit 57. The q-axis magnetic circuit 57 is a magnetic circuit that is formed by the magnetic flux passing through a q axis shifted from the d axis of the stator core 21 at an electrical angle of 90°. In the present embodiment, the relationship between a permeance Prt of the d-axis magnetic circuit 56 and a permeance Pst of the q-axis magnetic circuit 57 are set to establish Pst>Prt under an electrical load on the rotor 50.

In the present embodiment, as in the first embodiment, the ratio of the permeance Prt of the d-axis magnetic circuit 56 to the permeance Pst of the q-axis magnetic circuit 57 are set to Pst:Prt=2n:1 (n is a real number of 1 or larger). Accordingly, the operation mode of the Lundell rotor 50 under an electrical load can be brought closer to that of an IPM rotor. In addition, the saliency ratio ρ can be set to 2 or larger. The methods for measuring the permeance Prt of the d-axis magnetic circuit 56 and the permeance Pst of the q-axis magnetic circuit 57 are the same as those in the first embodiment.

In the present embodiment, the d-axis magnetic circuit 56 and the first magnet magnetic circuit 58 share the magnetic circuit from the S pole 52s, through the iron core 52a, the stator 20, and the iron core 52a to the N pole 52n. In addition, the d-axis magnetic circuit 56 and the second magnet magnetic circuit 59 share part of the magnetic circuit flowing from the S pole 52s of the rotor 50 through the iron core 52a, the S pole core 52c, the boss part 17, and the N pole cores 52b, and returning to the N pole 52n. Accordingly, the d-axis magnetic circuit 56 and at least parts of the first and second magnet magnetic circuits 58 and 59 are shared.

In the present embodiment, as in the first embodiment, the axially extending iron core cross-sectional area of a pair of NS poles of the boss part 17 is designated as Ab and the magnetic flux density of the boss part 17 with a magnetic field of 5000 [A/m] as B50. In addition, the residual magnetic flux density of the permanent magnet 54 arranged between the N pole 52n and the S pole 52s is designated as Br and the cross-sectional area of the plane constituting the magnetic pole of the permanent magnet 54 as Am. In the present embodiment, the foregoing elements are set to establish the relationship $2 \times Br\ [T] \times Am\ [mm^2] < B50\ [T] \times Ab\ [mm^2]$.

The portions of the field core 52 and the housing 10 with the d-axis magnetic circuit 56 are formed from two kinds of materials different in the saturation flux density Bs. In the present embodiment, the N poles 52n and the S poles 52s as magnetic pole parts are formed from a material high in the saturation flux density Bs, and the portions other than the N poles 52n and the S poles 52s are formed from a material low in the saturation flux density Bs. Examples of a material high in the saturation flux density Bs and a material low in the saturation flux density Bs are the same as those in the first embodiment.

<Operations and Advantageous Effects>

In the vehicle alternating-current power generator 2 of the present embodiment, when an electrical load is connected to the rotor 50, the relationship between the permeance Prt of the d-axis magnetic circuit 56 and the permeance Pst of the q-axis magnetic circuit 57 are set to establish the relationship Pst>Prt. Accordingly, as in the first embodiment, the magnet magnetic flux increases in the first magnet magnetic circuit 58 formed by the magnetic flux interlinked with the stator 20 and flowing in the same direction as that in the d-axis magnetic circuit 56. In the present embodiment, the power generation performance can be significantly improved by the efficient use of the magnet magnetic flux.

In the present embodiment, the boss part cross-sectional area is designated as Ab and the magnetic flux density of the boss part 17 with a magnetic field of 5000 [A/m] as B50. In addition, the residual magnetic flux density of the permanent magnet 54 is designated as Br and the cross-sectional area of the surface of the permanent magnet 54 constituting the magnetic pole as Am. In the present embodiment, the foregoing elements are set to establish the relationship $2 \times Br\ [T] \times Am\ [mm^2] < B50\ [T] \times Ab\ [mm^2]$. Accordingly, in the present embodiment, as in the first embodiment, it is possible to decrease the back-electromotive force and suppress the power generated in a high-speed rotation state without power distribution.

In the present embodiment, the ratio of the permeance Prt of the d-axis magnetic circuit 56 to the permeance Pst of the q-axis magnetic circuit 57 is set to Pst:Prt=2n:1 (n is a real number of 1 or larger). Therefore, as in the first embodiment, the saliency ratio ρ can be set to 2 or more. Accordingly, in the present embodiment, it is possible to output the same degree of reluctance torque as that in an IPM rotor.

In the present embodiment, the relationship between the magnetic pole part surface area As and the boss part cross-sectional area Ab is set within the range of 0.9<As/Ab<1.7. That is, the magnetic pole part surface area As is larger than the boss part cross-sectional area Ab. Accordingly, in the present embodiment, the permanent magnets 54 that have been conventionally used for the purposes of rectifying a magnetic flux between the adjacent magnetic pole parts and preventing leakage of a magnetic flux, are used like permanent magnets in an IPM rotor. This achieves increase of a magnetic flux rather than prevention of leakage of a magnetic flux. That is, the permanent magnets can act as a source for torque increase or a source for power increase.

In the present embodiment, the relationship between the boss part outer diameter Db and the rotor outer diameter Dr is set within the range of 0.46<Db/Dr<0.53. In the present embodiment, the boss part cross-sectional area Ab falls within a range determined in maximum consideration given to counteraction of the magnet magnetic force against the magnetic force of the boss part. The magnetic force of the boss part enough to counteract the counteraction of the magnet magnetic force acts on the field core 52. At this time, with the root cross-sectional area At of the N poles 52n and the S poles 52s as magnetic pole parts, the total magnetic force of the boss part and the total magnetic force of the magnets can be passed to the stator 20.

In the present embodiment, the residual magnetic flux density Br of the permanent magnet 54 is set to 1 or more [T]. In many cases, the magnetic force of a bond magnet made of neodymium-iron-boron or a plastic-molded magnet formed by injection molding of samarium-iron-nitride is incapable of supplying a sufficient demagnetizing field to the field core 52. That is, the cross-sectional area of the magnet is frequently ensured by reducing the space for the field windings 53. Accordingly, the foregoing operations and advantageous effects can be effectively obtained in particular when the residual magnetic flux density Br of the permanent magnet 54 is 1 or more [T].

In the present embodiment, the field core 51 with the d-axis magnetic circuit 56 caused by magnetomotive force of the field windings 55 is formed from two kinds of materials different in the saturation flux density Bs. The N poles 52n and the S poles 52s are formed from a material high in the saturation flux density Bs, and the portions other than the N poles 52*n* and the S poles 52*s* are formed from a material low in the saturation flux density Bs. Accordingly, in the present embodiment, the boss part 321 becomes quickly saturated in magnetic flux and likely to change to the behavior of magnetic flux characteristics of an IPM rotor. This makes it possible to improve the power generation performance in a more reliable manner.

In the present embodiment, the material low in the saturation flux density Bs for the portion other than the N poles 52*n* and the S poles 52*s* is higher in magnetic permeability than the material high in the saturation flux density Bs. Accordingly, the effect of absorbing the electromotive force can be enhanced at no load on the rotor 30.

Third Embodiment

Figure 32:
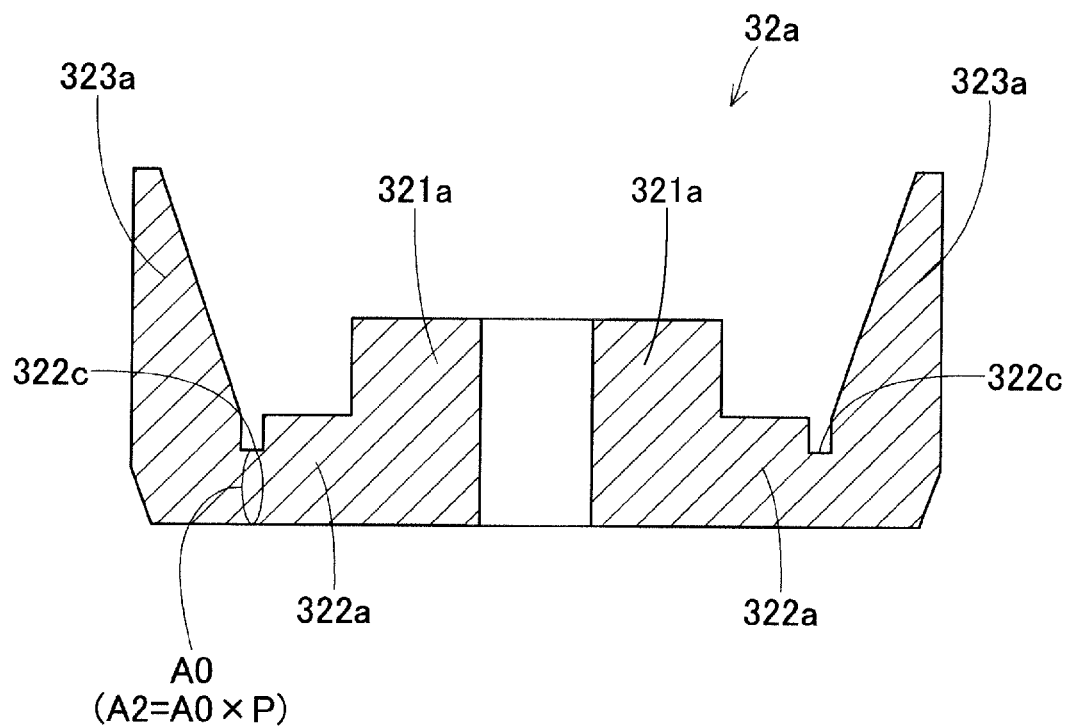
FIG. 32 is an axial cross-sectional view of a pole core according to a third embodiment.

A rotary electrical machine according to a third embodiment will be described with reference to FIG. 32. The rotary electrical machine according to the present embodiment is a vehicle alternating-current power generator as in the first embodiment. The rotary electrical machine according to the present embodiment is different from the first embodiment in the structure of the pole cores constituting the field core. The different and important points of the present embodiment will be described below. The components in common with the first embodiment will be given the same reference signs and detailed descriptions thereof will be omitted.

<Configuration of the Field Core>

The field core 32 includes the first pole core 32*a* and the second pole core 32*b*. As illustrated in FIG. 32, the first pole core 32*a* includes the first boss part 321*a*, the first disc part 322*a*, and the first claw-shaped magnetic pole parts 323*a*. The first disc part 322*a* has a groove portion 322*c* to decrease the area of the cross section orthogonal to the flowing direction of the magnetic flux. The groove portion 322*c* is formed on the inner surface of the first disc part 322*a* axially opposed to the second disc part 322*b*. The groove portion 322*c* is formed to circumferentially extend in an arc shape from a portion connected to the outermost first claw-shaped magnetic pole parts 323*a* as seen in the radial direction of the first disc part 322*a*.

The magnetic flux flows axially in the first disc part 322*a*. The arc-shaped groove portion 322*c* is formed on the inner surface of the first disc part 322*a* axially opposed to the second disc part 322*b* to circumferentially extend from the position connected to the outermost claw-shaped magnetic pole parts 323*a* as seen in the radial direction. Accordingly, due to the groove portion 322*c*, the area of the cross section orthogonal to the flowing direction of the magnetic flux is decreased. That is, the cross section of the outermost periphery of the first disc part 322*a* connected to the first claw-shaped magnetic pole parts 323*a* becomes small.

In the present embodiment, the relationship between the area A1 of the circle with a diameter equivalent to the outer diameter Dr of the first pole core 32*a* as the outer diameter of the rotor 30 and the cross-sectional area A2 of the portion with the minimum area of the cross section orthogonal to the flowing direction of the magnetic flux is set within a range of 0.2116<A2/A1<0.2809. The cross-sectional area A2 is obtained by multiplying a cross-sectional area A0 of a portion of the first disc part 322*a* having the groove portion 322*c* connected to the first claw-shaped magnetic pole parts 323*a* by the number of pole pairs P.

The second pole core 32*b* is identical in shape to the first pole core 32*a*. Accordingly, the second disc part 322*b* has a groove portion to decrease the area of the cross section orthogonal to the flowing direction of the magnetic flux.

<Operations and Advantageous Effects>

In the vehicle alternating-current power generator of the present embodiment, the field core 32 has the decreased area of the cross section orthogonal to the flowing direction of the magnetic flux. Specifically, the cross-sectional area of the disc part is decreased. This changes the characteristics of the vehicle alternating-current power generator. That is, it is easy to form vehicle alternating-current power generators different in characteristics. Further, in the present embodiment, the relationship between the area A1 of the circle with a diameter equivalent to the outer diameter Dr of the rotor and the cross-sectional area A2 of the portion with the minimum area of the cross section orthogonal to the flowing direction of the magnetic flux is set within the range of 0.2116<A2/A1<0.2809. This makes it possible to ensure the same magnetic relationship and produce the same advantageous effects as those in the case of setting the relationship between the outer diameter Db of the boss part and the outer diameter Dr of the rotor in the range of 0.46<Db/Dr<0.53.

In the present embodiment, the arc-shaped groove portions are formed at the first boss part 322*a* and the second boss part 322*b*. This decreases the area of the cross section orthogonal to the flowing direction of the magnetic flux. The arc-shaped groove portions can be easily processed by a milling machine or the like. Accordingly, the area of the cross section orthogonal to the flowing direction can be easily decreased. In addition, the arc-shaped groove portions are formed only on the inner surfaces of the first disc part 322*a* and the second disc part 322*b*, which makes it possible to use continuously the field windings, the winding frames, and other components that have been used before the formation of the groove portions. Accordingly, in the present embodiment, in the case of forming vehicle alternating-current power generators different in characteristics, the costs resulting from the change of characteristics can be suppressed.

Fourth Embodiment

Figure 33:
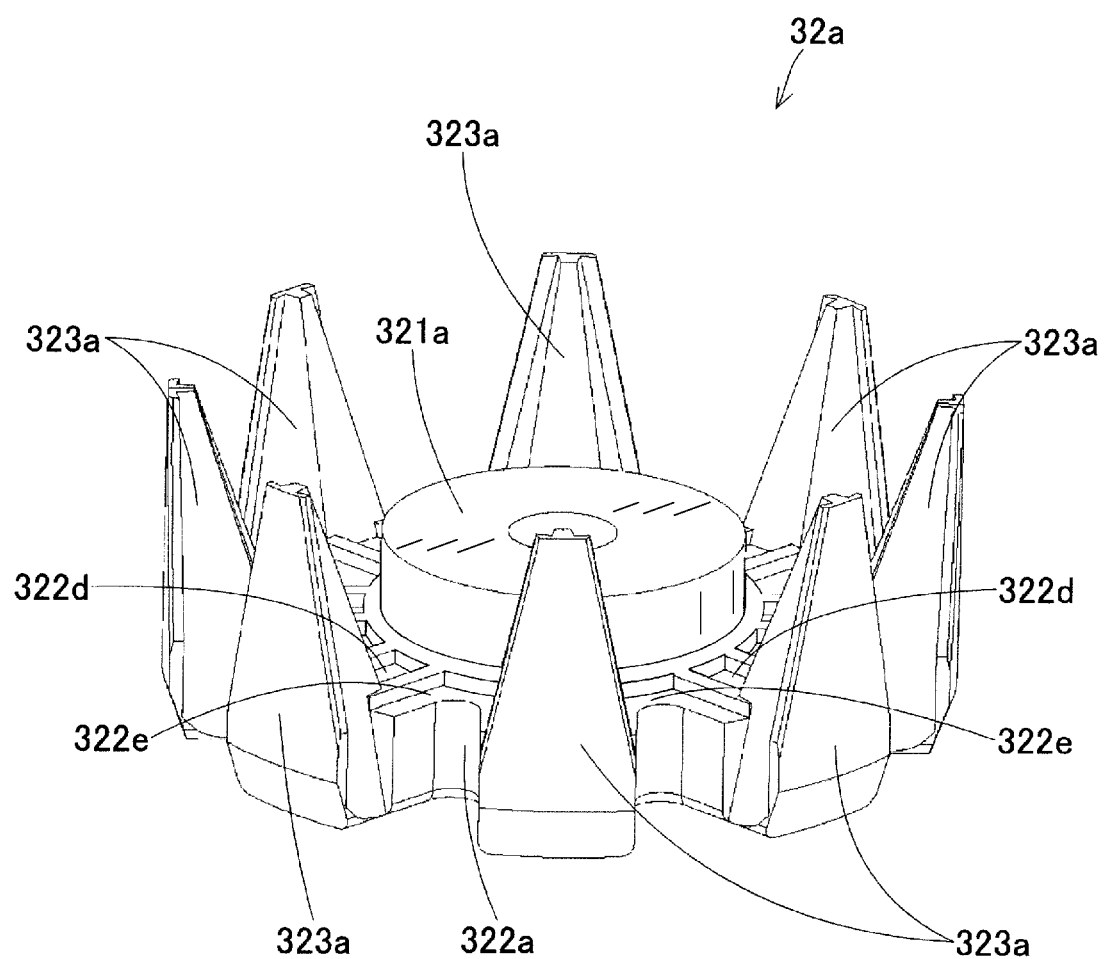
FIG. 33 is a perspective view of a pole core according to a fourth embodiment.

A rotary electrical machine according to a fourth embodiment will be described with reference to FIG. 33. The rotary electrical machine according to the present embodiment is a vehicle alternating-current power generator as in the first embodiment. The rotary electrical machine according to the present embodiment is different from the first embodiment in the structure of the pole cores constituting the field core. The rotary electrical machine according to the present embodiment has the decreased cross-sectional area of the disc part. In the rotary electrical machine according to the present embodiment, the cross section of part of the disc part is decreased in a configuration different from that of the third embodiment. The different and important points of the present embodiment will be described below. The components in common with the first embodiment will be given the same reference signs and detailed descriptions thereof will be omitted.

<Configuration of the Field Core>

The field core 32 includes the first pole core 32*a* and the second pole core 32*b*. As illustrated in FIG. 33, the first pole core 32*a* includes the first boss part 321*a*, the first disc part 322*a*, and the first claw-shaped magnetic pole parts 323*a*. The first disc part 322*a* has groove portions 322*d* and 322*e* of different widths to decrease the area of the cross section orthogonal to the flowing direction of the magnetic flux. The groove portions 322*d* and 322*e* are formed on the inner surface of the first disc part 322*a* axially orthogonal to the second disc part 322*b*. The groove portions 322*d* and 322*e* are formed to extend in a radial pattern outward as seen in the radial direction from predetermined positions radially inside the first disc part 322a.

The magnetic flux flows radially in the first disc part 322a. The first disc part 322a has the groove portions 322d and 322e formed to extend in a radial pattern outward as seen in the radial direction from a predetermined position radially inside the first disc part 322a. Accordingly, due to the groove portions 322d and 322e, the area of the cross section orthogonal to the flowing direction of the magnetic flux is decreased. That is, the cross section of the outermost periphery of the first disc part 322a connected to the first claw-shaped magnetic pole parts 323a becomes small.

In the present embodiment, as in the third embodiment, the relationship between the area A1 of the circle with a diameter equivalent to the outer diameter Dr of the first pole core 32a as the outer diameter of the rotor 30 and the cross-sectional area A2 of the portion with the minimum area of the cross section orthogonal to the flowing direction of the magnetic flux is set within the range of 0.2116<A2/A1<0.2809. As in the third embodiment, the cross-sectional area A2 is obtained by multiplying the cross-sectional area A1 of the first disc part 322a connected to the first claw-shaped magnetic pole parts 323a by the number of pole pairs P.

The second pole core 32b is identical in shape to the first pole core 32a. Accordingly, the second disc part 322b has a groove portion to decrease the area of the cross section orthogonal to the flowing direction of the magnetic flux.

<Operations and Advantageous Effects>

In the vehicle alternating-current power generator of the present embodiment, the field core 32 has the decreased area of the cross section orthogonal to the flowing direction of the magnetic flux. Specifically, the cross-sectional area of the disc part is decreased. This changes the characteristics of the vehicle alternating-current power generator. That is, it is easy to form vehicle alternating-current power generators different in characteristics. Further, in the present embodiment, the relationship between the area A1 of the circle with a diameter equivalent to the outer diameter Dr of the rotor and the cross-sectional area A2 of the portion with the minimum area of the cross section orthogonal to the flowing direction of the magnetic flux is set within the range of 0.2116<A2/A1<0.2809. Accordingly, in the present embodiment, it is possible to ensure the same magnetic relationship and produce the same advantageous effects as those in the case of setting the relationship between the outer diameter Db of the boss part and the outer diameter Dr of the rotor in the range of 0.46<Db/Dr<0.53.

In the present embodiment, the groove portions are formed to extend radially in a radial pattern at the first disc part 322a and the second disc part 322b. As a result, a rib with high second moment of area is radially formed in a radial pattern between the groove portions. Accordingly, in the present embodiment, it is possible to improve the rigidity of the field core 32 against centrifugal force as compared to the third embodiment. In addition, the formation of the groove portions decreases the contact area between the first disc part 322a and the field winding 33 and the contact area between the second disc part 322b and the field winding 33. Accordingly, in the present embodiment, even when the field core 32 generates heat due to eddy current, the heat transfer from the field core 32 to the field winding 33 can be suppressed. Therefore, it is possible to suppress heat deterioration and improve the reliability of the field winding 33. In the present embodiment, as in the third embodiment, it is possible to use continuously the field winding, the winding frame, and other components that have been used before the formation of the groove portions. Accordingly, in the case of forming vehicle alternating-current power generators different in characteristics, the costs resulting from the change of characteristics can be suppressed.

Fifth Embodiment

Figure 34:
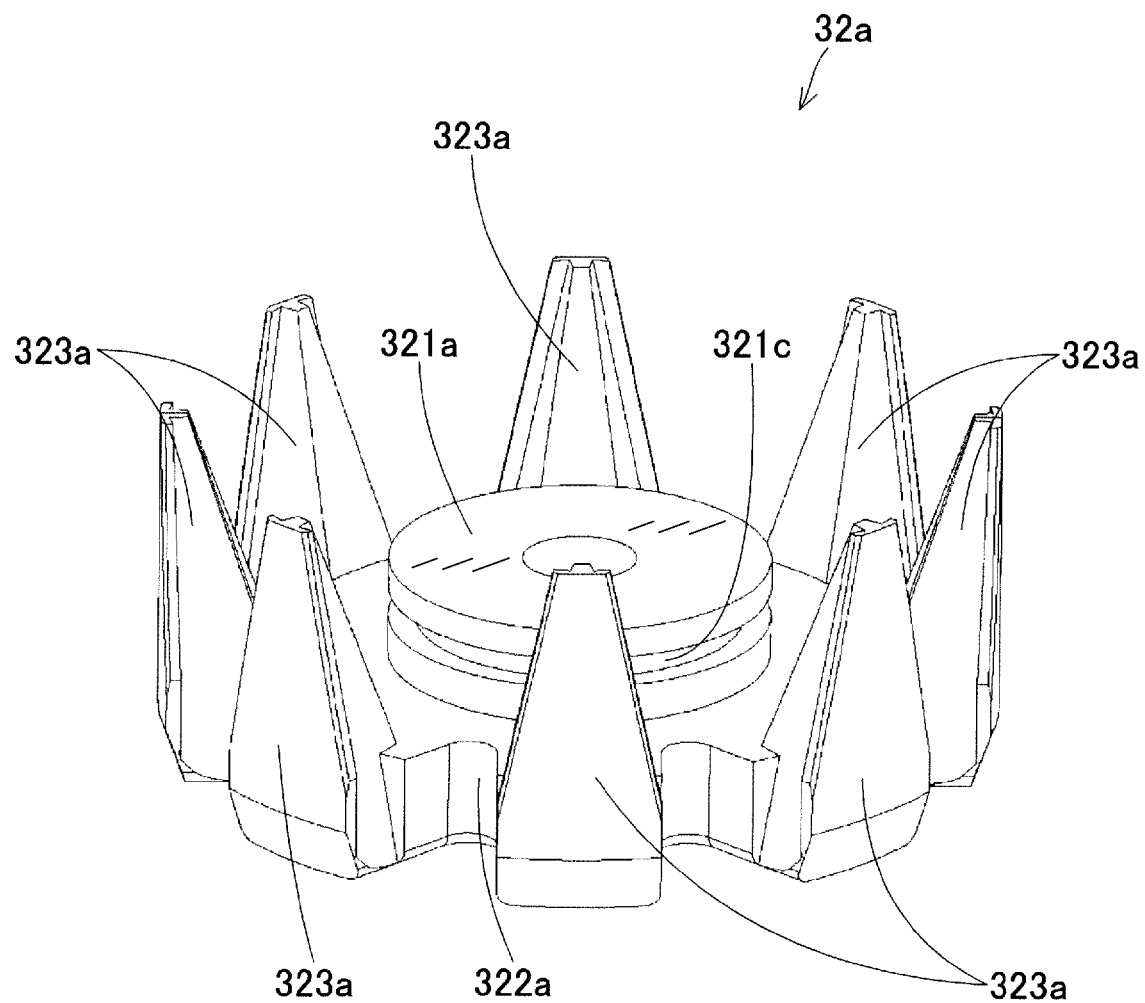
FIG. 34 is a perspective view of a pole core according to a fifth embodiment.

A rotary electrical machine according to a fifth embodiment will be described with reference to FIG. 34. The rotary electrical machine according to the present embodiment is a vehicle alternating-current power generator as in the first embodiment. The rotary electrical machine according to the present embodiment is different from the first embodiment in the structure of the pole cores constituting the field core. In the rotary electrical machine according to the present embodiment, the cross section of part of the boss part is decreased unlike in the third and fourth embodiments. The different and important points of the present embodiment will be described below. The components in common with the first embodiment will be given the same reference signs and detailed descriptions thereof will be omitted.

<Configuration of the Field Core>

The field core 32 includes the first pole core 32a and the second pole core 32b. As illustrated in FIG. 34, the first pole core 32a includes the first boss part 321a, the first disc part 322a, and the first claw-shaped magnetic pole parts 323a. The first boss part 321a has a groove portion 321c to decrease the area of the cross section orthogonal to the flowing direction of the magnetic flux. The groove portion 321c is formed in a circular shape on the outer peripheral surface of an axially intermediate portion of the first boss part 321a.

The magnetic flux flows axially in the first boss part 321a. The first boss part 321a has the circular groove portion 321c on the outer peripheral surface of the axially intermediate portion. Accordingly, due to the groove portion 321c, the area of the cross section orthogonal to the flowing direction of the magnetic flux is decreased. That is, the cross section of the axially intermediate portion of the first boss part 321a becomes smaller than the other portions.

In the present embodiment, the relationship between the area A1 of the circle with a diameter equivalent to the outer diameter Dr of the first pole core 32a as the outer diameter of the rotor 30 and the cross-sectional area A2 of the portion with the minimum area of the cross section orthogonal to the flowing direction of the magnetic flux is set within the range of 0.2116<A2/A1<0.2809. The cross-sectional area A2 is the cross-sectional area of a portion of the first boss part 321a having the groove portion 321c and is the area of the cross section of the portion having the groove portion 321c orthogonal to the axial direction.

The second pole core 32b is identical in shape to the first pole core 32a. Accordingly, the second boss part 321b has a groove portion to decrease the area of the cross section orthogonal to the flowing direction of the magnetic flux.

<Operations and Advantageous Effects>

In the vehicle alternating-current power generator of the present embodiment, the field core 32 has the decreased area of the cross section orthogonal to the flowing direction of the magnetic flux. Specifically, the cross-sectional area of the boss part is decreased. This changes the characteristics of the vehicle alternating-current power generator. That is, it is easy to form vehicle alternating-current power generators different in characteristics. Further, in the present embodiment, the relationship between the area A1 of the circle with a diameter equivalent to the outer diameter Dr of the rotor and the cross-sectional area A2 of the portion with the minimum area of the cross section orthogonal to the flowing direction of the magnetic flux is set within the range of $0.2116 < A2/A1 < 0.2809$. Accordingly, in the present embodiment, it is possible to ensure the same magnetic relationship and produce the same advantageous effects as those in the case of setting the relationship between the outer diameter Db of the boss part and the outer diameter Dr of the rotor in the range of $0.46 < Db/Dr < 0.53$.

In the present embodiment, the groove portions are formed at the first boss part 321a and the second boss part 321b. Accordingly, the field core 32 can be formed without reducing rigidity against centrifugal force. In the present embodiment, as in the third embodiment, it is possible to use continuously the field winding, the winding frame, and other components that have been used before the formation of the groove portions. Accordingly, in the case of forming vehicle alternating-current power generators different in characteristics, the costs resulting from the change of characteristics can be suppressed.

Sixth Embodiment

Figure 35:
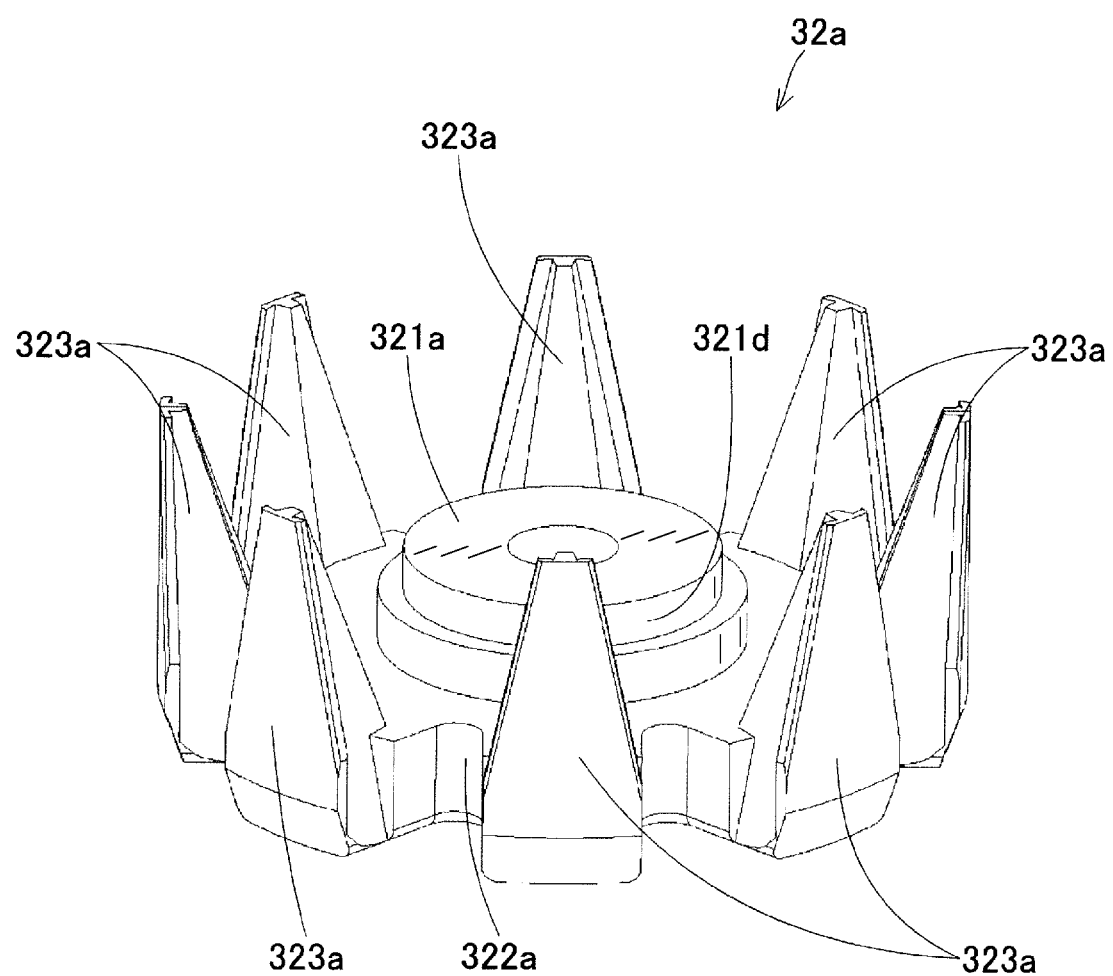
FIG. 35 is a perspective view of a pole core according to a sixth embodiment.

A rotary electrical machine according to a sixth embodiment will be described with reference to FIG. 35. The rotary electrical machine according to the present embodiment is a vehicle alternating-current power generator as in the first embodiment. The rotary electrical machine according to the present embodiment is different from the first embodiment in the structure of the pole cores constituting the field core. In the rotary electrical machine according to the present embodiment, the cross section of the boss part is decreased. In the rotary electrical machine according to the present embodiment, the cross section of part of the boss part is decreased at a position different from that in the fifth embodiment. The different and important points of the present embodiment will be described below. The components in common with the first embodiment will be given the same reference signs and detailed descriptions thereof will be omitted.

<Configuration of the Field Core>

The field core 32 includes the first pole core 32a and the second pole core 32b. As illustrated in FIG. 35, the first pole core 32a includes the first boss part 321a, the first disc part 322a, and the first claw-shaped magnetic pole part 323a. The first boss part 321a has a small-diameter portion 321d to decrease the area of the cross section orthogonal to the flowing direction of the magnetic flux. The small-diameter portion 321d is smaller in outer diameter than the other portions and is formed at an axial end of the first boss part 321a axially opposed to the second boss part 321b.

The magnetic flux axially flows in the first boss part 321a. The small-diameter portion 321d smaller in outer diameter than the other portions is formed at the axial end of the first boss part 321a. Accordingly, due to the small-diameter portion 321d, the area of the cross section orthogonal to the flowing direction of the magnetic flux becomes small. That is, the cross section of the axial end of the first boss part 321a becomes smaller than the other portions.

In the present embodiment, the relationship between the area A1 of the circle with a diameter equivalent to the outer diameter Dr of the first pole core 32a as the outer diameter of the rotor 30 and the cross-sectional area A2 of the portion with the minimum area of the cross section orthogonal to the flowing direction of the magnetic flux is set within the range of $0.2116 < A2/A1 < 0.2809$. The cross-sectional area A2 is the cross-sectional area of a portion of the first boss part 321a having the small-diameter portion 321d and is the area of the cross section of the portion having the small-diameter portion 321d orthogonal to the axial direction.

The second pole core 32b is identical in shape to the first pole core 32a. Accordingly, the second boss part 321b has a small-diameter portion to decrease the area of the cross section orthogonal to the flowing direction of the magnetic flux.

<Operations and Advantageous Effects>

The vehicle alternating-current power generator in the present embodiment can produce the same advantageous effects as those of the fifth embodiment.

Seventh Embodiment

Figure 36:
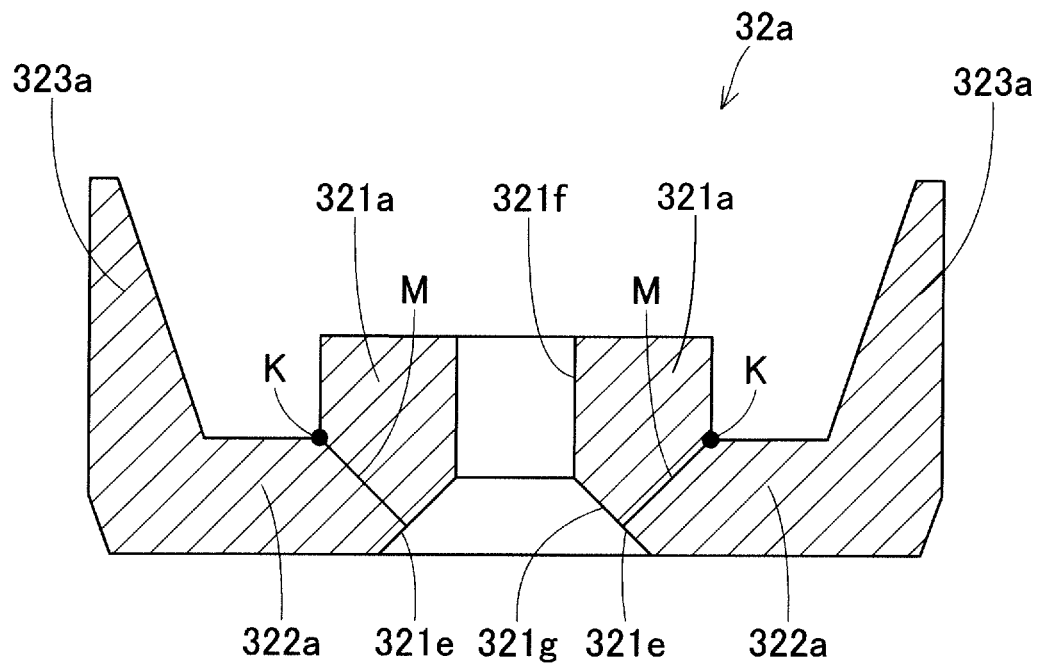
FIG. 36 is an axial cross-sectional view of a pole core according to a seventh embodiment.

A rotary electrical machine according to a seventh embodiment will be described with reference to FIG. 36. The rotary electrical machine according to the present embodiment is a vehicle alternating-current power generator as in the first embodiment. The rotary electrical machine according to the present embodiment is different from the first embodiment in the structure of the pole cores constituting the field core. In the rotary electrical machine according to the present embodiment, the cross-sectional area of the boss part is decreased. In the rotary electrical machine according to the present embodiment, the cross section of part of the boss part is decreased in a configuration different from those of the fifth and sixth embodiments. The different and important points of the present embodiment will be described below. The components in common with the first embodiment will be given the same reference signs and detailed descriptions thereof will be omitted.

<Configuration of the Field Core>

The field core 32 includes the first pole core 32a and the second pole core 32b. As illustrated in FIG. 36, the first pole core 32a includes the first boss part 321a, the first disc part 322a, and the first claw-shaped magnetic pole parts 323a. The first boss part 321a has a chamfered portion 321e to decrease the area of the cross section orthogonal to the flowing direction of the magnetic flux. The first boss part 321a has a through hole portion 321f to fit with the rotation shaft 31. The chamfered portion 321e is formed on the entire periphery of the axial end of the through hole portion 321f on the first disc part 322a side.

The magnetic flux flows axially in the first boss part 321a. The magnetic flux also flows radially in the first disc part 322a. The flow of the magnetic flux changes from the axial direction to the radial direction or from the radial direction to the axial direction in the portion of the first boss part 321a on the first disc part 322a side connected to the first disc part 322a. The chamfered portion 321e is formed on the entire periphery of the axial end of the through hole portion 321f on the first disc part 322a side. Accordingly, due to the chamfered portion 321e, the area of the cross section orthogonal to the flowing direction of the magnetic flux is decreased.

In the present embodiment, the relationship between the area A1 of the circle with a diameter equivalent to the outer diameter Dr of the first pole core 32a as the outer diameter of the rotor 30 and the cross-sectional area A2 of the portion with the minimum area of the cross section orthogonal to the flowing direction of the magnetic flux is set within the range of $0.2116 < A2/A1 < 0.2809$. In this example, the point at which the outer peripheral surface of the first boss part 321a is in contact with the inner surface of the first disc part 322a is designated as K, and the line connecting the point K with an inclination surface 321g of the chamfered portion 321e at the minimum distance as M. The cross-sectional area A2 is the area of a cross section cut along the line M.

The second pole core 32b is identical in shape to the first pole core 32a. Accordingly, the second boss part 321b has a chamfered portion to decrease the area of the cross section orthogonal to the flowing direction of the magnetic flux.

<Operations and Advantageous Effects>

In the vehicle alternating-current power generator of the present embodiment, the field core 32 has the decreased area of the cross section orthogonal to the flowing direction of the magnetic flux. Specifically, the cross-sectional area of the boss part is decreased. This changes the characteristics of the vehicle alternating-current power generator. That is, it is easy to form vehicle alternating-current power generators different in characteristics. Further, in the present embodiment, the relationship between the area A1 of the circle with a diameter equivalent to the outer diameter Dr of the rotor and the cross-sectional area A2 of the portion with the minimum area of the cross section orthogonal to the flowing direction of the magnetic flux is set within the range of $0.2116 < A2/A1 < 0.2809$. Accordingly, in the present embodiment, it is possible to ensure the same magnetic relationship and produce the same advantageous effects as those in the case of setting the relationship between the outer diameter Db of the boss part and the outer diameter Dr of the rotor in the range of $0.46 < Db/Dr < 0.53$.

In the present embodiment, the chamfered portions are formed at the first boss part 321a and the second boss part 321b. Accordingly, the area of the cross section orthogonal to the flowing direction of the magnetic flux is decreased. The chamfered portions can be easily processed by drilling or the like. Accordingly, it is easy to decrease the area of the cross section orthogonal to the flowing direction. In addition, the chamfered portions are formed only at the axial ends of the through holes in the first boss part 321a and the second boss part 321b, which makes it possible to use continuously the field winding, the winding frame, and other components that have been used before the formation of the chamfered portions. Accordingly, in the present embodiment, in the case of forming vehicle alternating-current power generators different in characteristics, the costs resulting from the change of characteristics can be suppressed.

Eighth Embodiment

Figure 37:
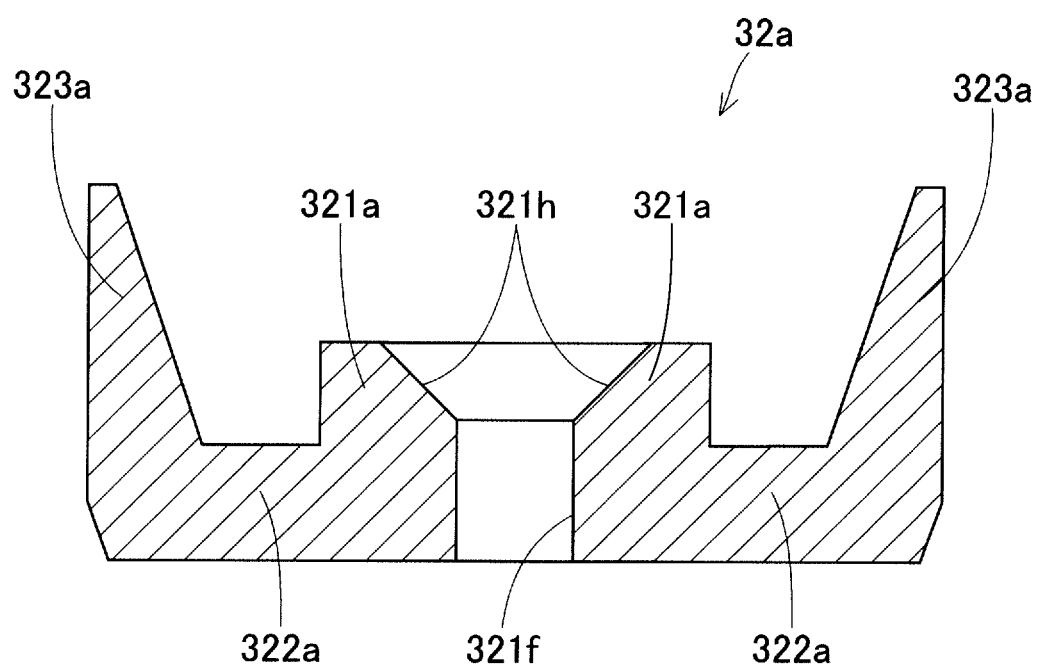
FIG. 37 is an axial cross-sectional view of a pole core according to an eighth embodiment.

A rotary electrical machine according to an eighth embodiment will be described with reference to FIG. 37. The rotary electrical machine according to the present embodiment is a vehicle alternating-current power generator as in the first embodiment. The rotary electrical machine according to the present embodiment is different from the first embodiment in the structure of the pole cores constituting the field core. The rotary electrical machine according to the present embodiment has the decreased cross-sectional area of the boss part. In the rotary electrical machine according to the present embodiment, the cross section of part of the boss part is decreased at a position different from that in the seventh embodiment. The different and important points of the present embodiment will be described below. The components in common with the first embodiment will be given the same reference signs and detailed descriptions thereof will be omitted.

<Configuration of the Field Core>

The field core 32 includes the first pole core 32a and the second pole core 32b. As illustrated in FIG. 37, the first pole core 32a includes the first boss part 321a, the first disc part 322a, and the first claw-shaped magnetic pole parts 323a.

The first boss part 321a has a chamfered portion 321h to decrease the area of the cross section orthogonal to the flowing direction of the magnetic flux. The chamfered portion 321h is formed on the entire periphery of the axial end of the through hole portion 321f on the second boss part 321b side.

The magnetic flux flows axially in the first boss part 321a. The chamfered portion 321h is formed at the axial end of the through hole portion 321f on the second boss part 321b side. Accordingly, due to the chamfered portion 321h, the area of the cross section orthogonal to the flowing direction of the magnetic flux is decreased. That is, the cross section of the axial end of the first boss part 321a becomes smaller than the other portions.

<Operations and Advantageous Effects>

The vehicle alternating-current power generator in the present embodiment can produce the same advantageous effects as those of the seventh embodiment.

Ninth Embodiment

Figure 38:
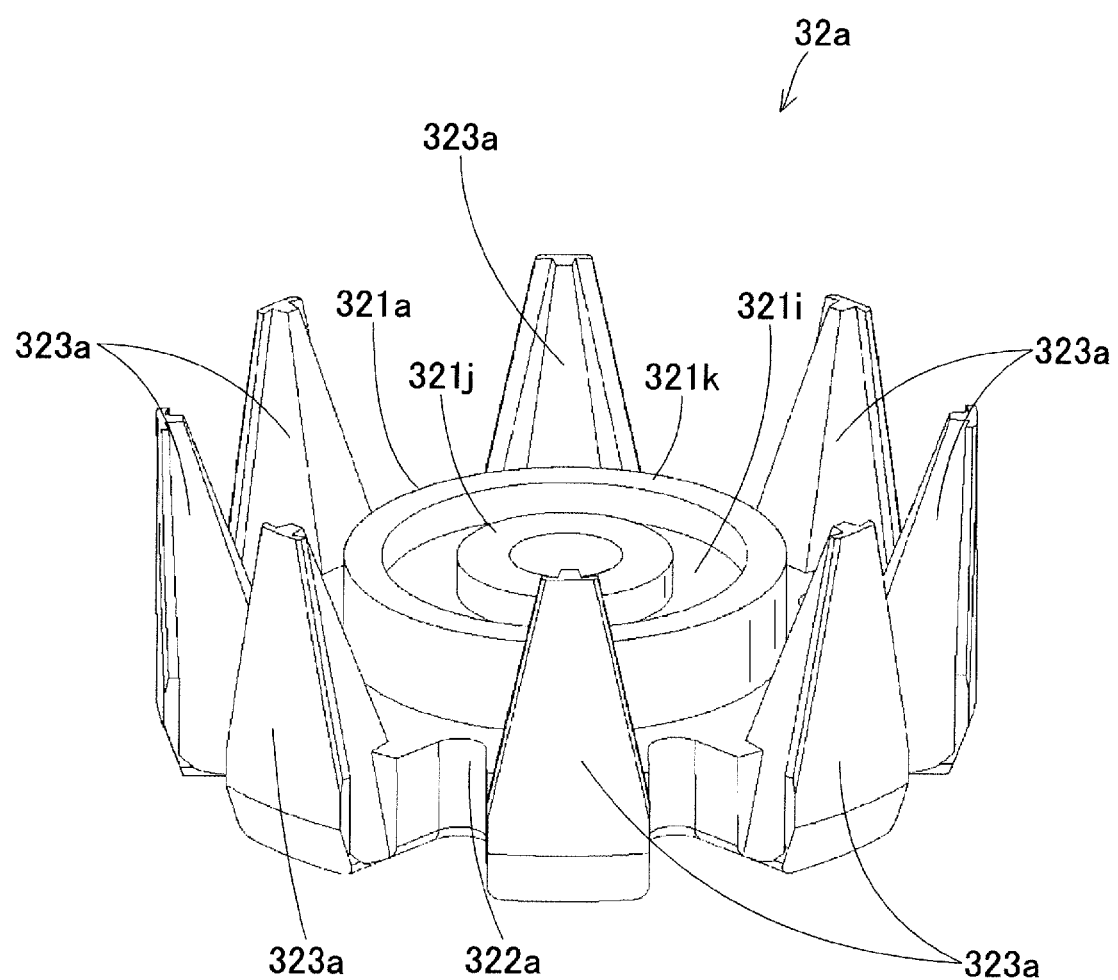
FIG. 38 is a perspective view of a pole core according to a ninth embodiment.

A rotary electrical machine according to a ninth embodiment will be described with reference to FIG. 38. The rotary electrical machine according to the present embodiment is a vehicle alternating-current power generator as in the first embodiment. The rotary electrical machine according to the present embodiment is different from the first embodiment in the structure of the pole cores constituting the field core. The rotary electrical machine according to the present embodiment has the decreased cross-sectional area of the boss part. In the rotary electrical machine according to the present embodiment, the cross section of part of the boss part is decreased in a configuration different from those in the fifth to eighth embodiments. The different and important points of the present embodiment will be described below. The components in common with the first embodiment will be given the same reference signs and detailed descriptions thereof will be omitted.

<Configuration of the Field Core>

The field core 32 includes the first pole core 32a and the second pole core 32b. As illustrated in FIG. 38, the first pole core 32a includes the first boss part 321a, the first disc part 322a, and the first claw-shaped magnetic pole parts 323a. The first boss part 321a has a groove portion 321i to decrease the area of the cross section orthogonal to the flowing direction of the magnetic flux. The groove portion 321i is formed on the axial end surface of the first boss part 321a axially opposed to the second boss part 321b.

The magnetic flux flows axially in the first boss part 321a. The circular groove portion 321i is formed at the axial end surface of the first boss part 321a. Accordingly, due to the groove portion 321i, the area of the cross section orthogonal to the flowing direction of the magnetic flux is decreased. That is, the cross section of the axial end of the first boss part 321a becomes smaller than the other portions.

In the present embodiment, the relationship between the area A1 of the circle with a diameter equivalent to the outer diameter Dr of the first pole core 32a as the outer diameter of the rotor 30 and the cross-sectional area A2 of the portion with the minimum area of the cross section orthogonal to the flowing direction of the magnetic flux is set within the range of $0.2116 < A2/A1 < 0.2809$. In this example, the cross-sectional area A2 is the cross-sectional area of the axial end of the first boss part 321a having the groove portion 321i. The cross-sectional area A2 is the sum of the areas of the axial end surfaces of cylindrical portions 321j and 321k formed by providing the groove portion 321i.

The second pole core 32b is identical in shape to the first pole core 32a. The second boss part 321b has a groove portion to decrease the area of the cross section orthogonal to the flowing direction of the magnetic flux.

<Operations and Advantageous Effects>

The vehicle alternating-current power generator in the present embodiment can produce the same advantageous effects as those of the fifth embodiment.

Tenth Embodiment

A rotary electrical machine according to a tenth embodiment will be described with reference to FIG. 39. The rotary electrical machine according to the present embodiment is a vehicle alternating-current power generator as in the first embodiment. The rotary electrical machine according to the present embodiment is different from the first embodiment in the structure of the pole cores constituting the field core. The rotary electrical machine according to the present embodiment is equivalent to a modified mode of the ninth embodiment. The different and important points of the present embodiment will be described below. The components in common with the first embodiment will be given the same reference signs and detailed descriptions thereof will be omitted.

<Configuration of the Field Core>

Figure 39:
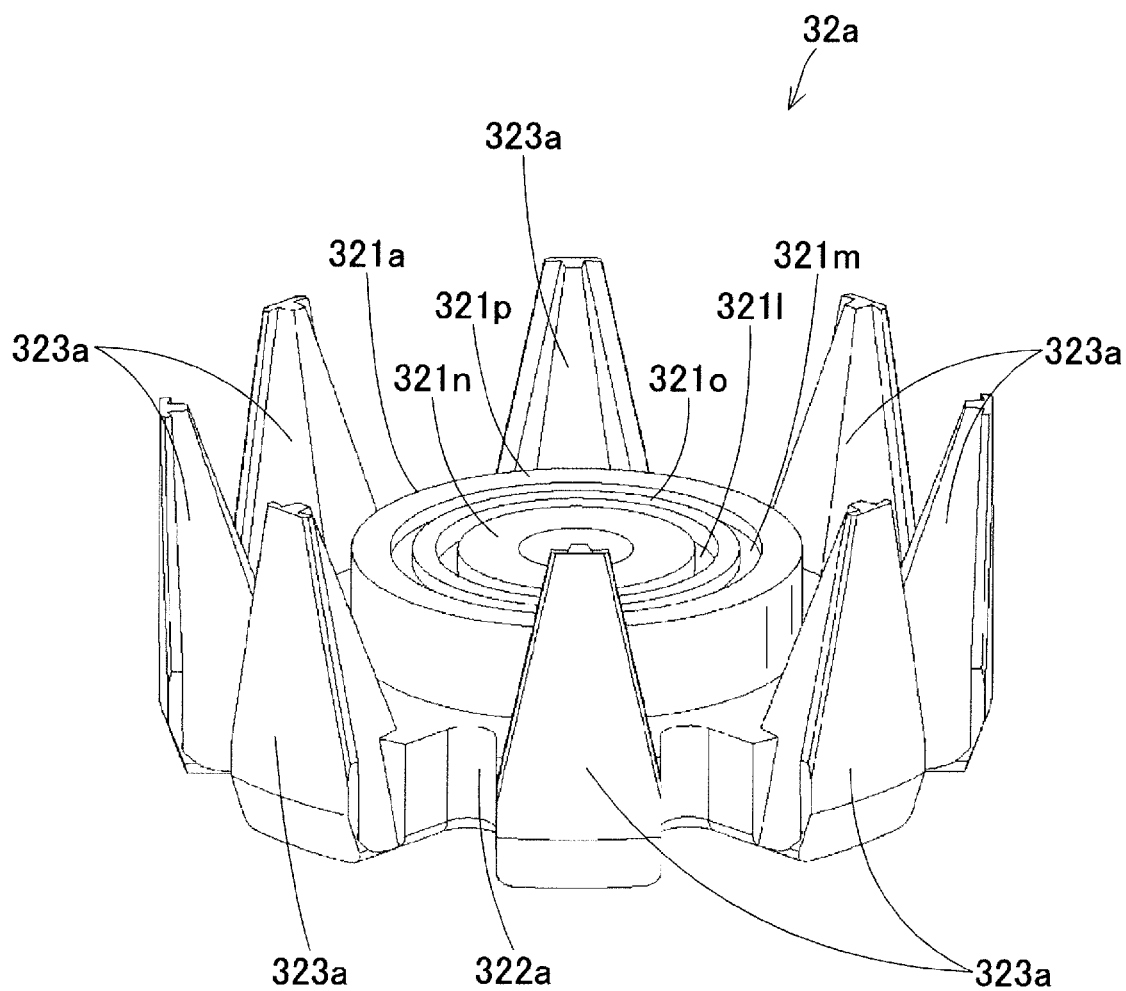
FIG. 39 is a perspective view of a pole core according to a tenth embodiment.

As illustrated in FIG. 39, the first boss part 321a has groove portions 321l and 321m to decrease the area of the cross section orthogonal to the flowing direction of the magnetic flux. The groove portions 321l and 321m are concentrically formed at the axial end surface of the first boss part 321a axially opposed to the second boss part 321b. Accordingly, due to the groove portions 321l and 321m, the area of the cross section orthogonal to the flowing direction of the magnetic flux is decreased. That is, the cross section of the axial end of the first boss part 321a becomes smaller than the other portions.

In the present embodiment, the relationship between the area A1 of the circle with a diameter equivalent to the outer diameter Dr of the first pole core 32a as the outer diameter of the rotor 30 and the cross-sectional area A2 of the portion with the minimum area of the cross section orthogonal to the flowing direction of the magnetic flux is set within the range of $0.2116 < A2/A1 < 0.2809$. The cross-sectional area A2 is the cross-sectional area of the axial end of the first boss part 321a having the groove portions 321l and 321m. The cross-sectional area A2 is the sum of the areas of the axial end surfaces of cylindrical portions 321n to 321p formed by providing the groove portions 321l and 321m.

<Operations and Advantageous Effects>

The vehicle alternating-current power generator in the present embodiment can produce the same advantageous effects as those of the fifth embodiment.

Eleventh Embodiment

A rotary electrical machine according to an eleventh embodiment will be described with reference to FIG. 40. The rotary electrical machine according to the present embodiment is a vehicle alternating-current power generator as in the second embodiment. The rotary electrical machine according to the present embodiment is different from the second embodiment in the structure of the pole cores constituting the field core. In the rotary electrical machine according to the present embodiment, the field core in the third embodiment is changed to a brushless structure. The different and important points of the present embodiment will be described below. The components in common with the second embodiment will be given the same reference signs and detailed descriptions thereof will be omitted. The constituent elements corresponding to those of the field core in the third embodiment will be given the same designations as those of the field core in the third embodiment.

<Configuration of the Field Core>

Figure 40:
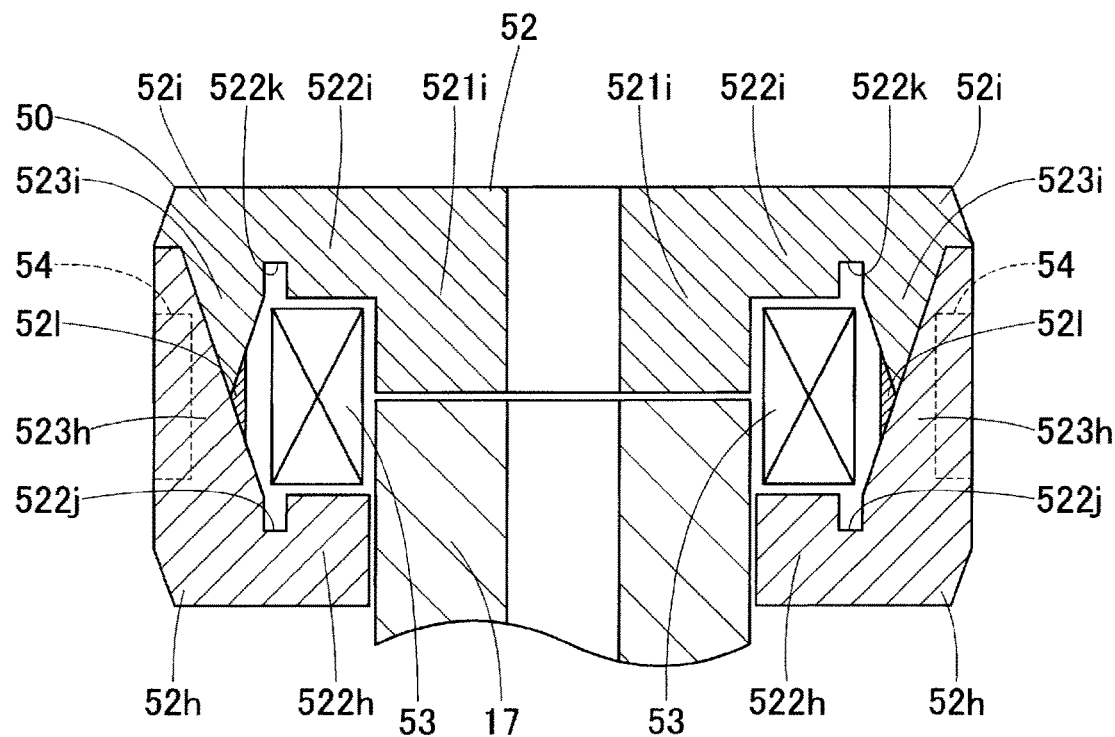
FIG. 40 is an axial cross-sectional view of a pole core according to an eleventh embodiment.

As illustrated in FIG. 40, the field core 52 includes a first pole core 52h and a second pole core 52i.

The first pole core 52h includes a first disc part 522h and first claw-shaped magnetic pole parts 523h. The first pole core 52h is structured such that the first boss part 321a is removed from the first pole core 32a in the third embodiment. The first disc part 522h has a groove portion 522j to decrease the area of the cross section orthogonal to the flowing direction of the magnetic flux. The groove portion 522j is formed on the inner surface of the first disc part 522h axially opposed to the second disc part 522i. The groove portion 522j is circumferentially extended in an arc shape from a portion connected to the outermost first claw-shaped magnetic pole parts 523h as seen in the radial direction of the first disc part 522h.

The second pole core 52i includes a second boss part 521i, a second disc part 522i, and second claw-shaped magnetic pole parts 523i. The second pole core 52i is identical in configuration to the first pole core 32a in the third embodiment. The second disc part 522i has a groove portion 522k to decrease the area of the cross section orthogonal to the flowing direction of the magnetic flux. The groove portion 522k is formed on the inner surface of the second disc part 522i axially opposed to the first disc part 522h. The groove portion 522k is circumferentially extended in an arc shape from a portion connected to the outermost second claw-shaped magnetic pole parts 523i as seen in the radial direction of the second disc part 522i.

The first pole core 52h is arranged such that the inner peripheral surface of the first disc part 522h is radially opposed to the outer peripheral surface of the boss part 17 with a space therebetween. The second pole core 52i is arranged such that the axial end surface of the second boss part 521i is axially opposed to the axial end surface of the boss part 17 with a space therebetween. The second pole core 52i has the first claw-shaped magnetic pole parts 523h and the second claw-shaped magnetic pole parts 523i alternately arranged in the circumferential direction. The permanent magnets 54 are arranged between the circumferentially adjacent first claw-shaped magnetic pole parts 523h and second claw-shaped magnetic pole parts 523i. The permanent magnets 54 are arranged with an axis of easy magnetization oriented in the circumferential direction. The permanent magnets 54 have magnetic poles formed to match the alternating polarities of the first claw-shaped magnetic pole parts 523h and the second claw-shaped magnetic pole parts 523i produced by the magnetomotive force of the field windings 53. In the first pole core 52h and the second pole core 52i, the inner peripheral sides of the first claw-shaped magnetic pole parts 523h and the second claw-shaped magnetic pole parts 523i are fixed by fixation members 521. The first pole core 52h and the second pole core 52i fixed by the fixation members 521 are rotatably supported on the housing 10 via bearings. The field windings 53 are arranged in the space between the first pole core 52h and the second pole core 52i. The field windings 53 are fixed to the boss part 17.

The magnetic flux radially flows in the disc parts 522h and 522i. The disc parts 522h and 522i have the arc-shaped groove portions 522j and 522k formed to extend in the circumferential direction from the portions connected to the outermost claw-shaped magnetic pole parts 523*h* and 523*i* as seen in the radial direction of the disc parts 522*h* and 522*i*. Accordingly, due to the groove portions 522*j* and 522*k*, the area of the cross section orthogonal to the flowing direction of the magnetic flux is decreased. That is, the cross sections of the outermost peripheral portions of the disc parts 522*h* and 522*i* connected to the claw-shaped magnetic pole parts 523*h* and 523*i* become smaller.

In the present embodiment, the relationship between the area A1 of the circle with a diameter equivalent to the outer diameter Dr of the pole cores 52*h* and 52*i* as the outer diameter of the rotor 30 and the cross-sectional area A2 of the portion with the minimum area of the cross section orthogonal to the flowing direction of the magnetic flux is set within the range of 0.2116<A2/A1<0.2809. The cross-sectional area A2 is obtained by multiplying the cross-sectional area A0 of the disc parts 522*h* and 522*i* having the groove portions 522*j* and 522*k* connected to the claw-shaped magnetic pole parts 523*h* and 523*i* by the number of pole pairs P.

<Operations and Advantageous Effects>

Even with the brushless structure, the vehicle alternating-current power generator in the present embodiment can produce the same advantageous effects as those of the third embodiment.

Even with the brushless structure, the basic configuration of the field core is identical to those in the fourth to tenth embodiments. Accordingly, the configurations in the fourth to tenth embodiments are also applicable to a vehicle alternating-current power generator with a brushless structure. In this case, even with the brushless structure, the same advantageous effects as those of the fourth to tenth embodiments can be obtained.

Other Embodiments

The technique of the present disclosure is not limited to the foregoing embodiments. The technique of the present disclosure can be modified in various manners without deviating from the gist of the present disclosure.

Figure 41:
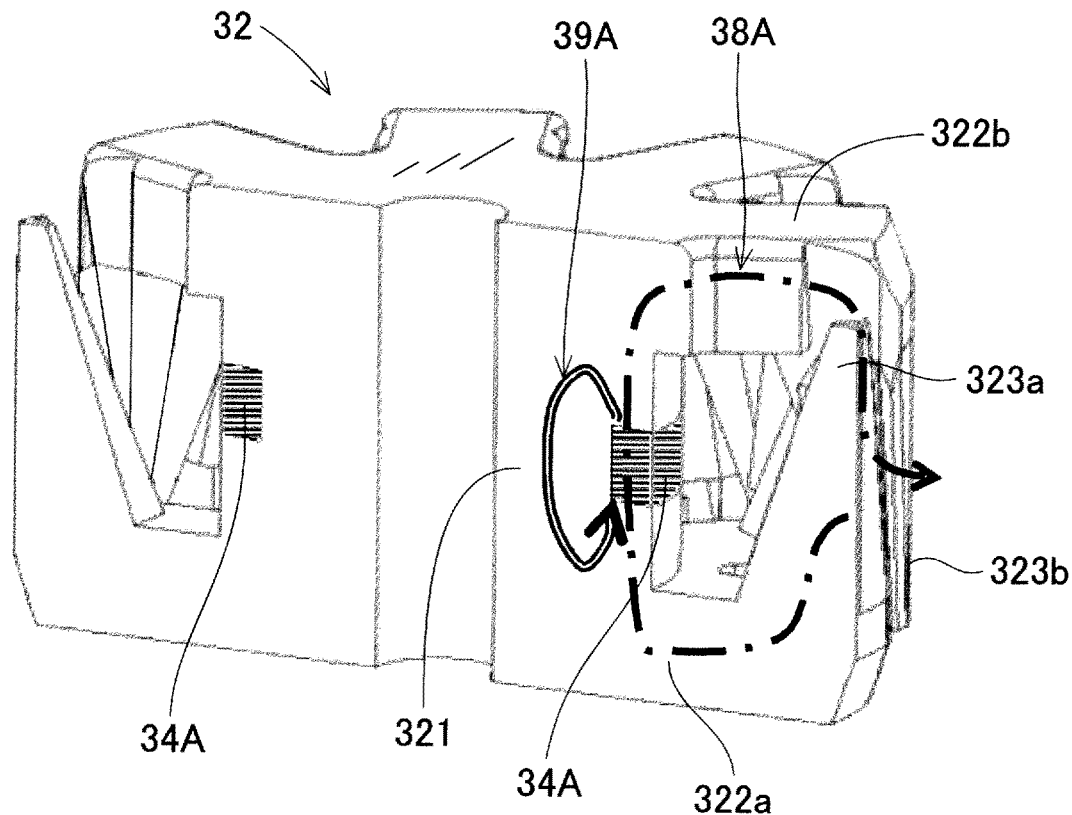
FIG. 41 is a diagram illustrating arrangement of permanent magnets according to a first modification example.

For example, in the foregoing embodiments, the d-axis magnetic circuit 36 or 56 and part of the first and second magnet magnetic circuits 38, 39, 58, or 59 are shared. However, the d-axis magnetic circuit and all the first and second magnet magnetic circuits may be shared by embedding or placing the permanent magnets 34 or 54 in the d-axis magnetic circuit 36 or 56. For example, in a first modification example illustrated in FIG. 41, cylindrical permanents magnet 34A with magnetic poles at both axial ends are coaxially attached to the outer periphery of the boss part 321 having the d-axis magnetic circuit 36. Accordingly, the d-axis magnetic circuit 36 (see FIG. 8) and all the first and second magnet magnetic circuits 38A and 39A can be shared. The total radial cross-sectional area of the portions of the boss part 321 having the permanent magnets 34A is designated as A and the number of pole pairs of the rotary electrical machine as P. In this case, the axially extending iron core cross-sectional area Ab of a pair of NS poles of the boss part 321 is expressed as A/P.

Besides, permanent magnets can be embedded in or placed on the disc parts 322*a* and 322*b* (see FIG. 41) of the field core 32 having the d-axis magnetic circuit 36. In this case, the cross-sectional areas of the disc parts 322*a* and 322*b* are the cross-sectional areas of the portions of the disc parts 322*a* and 322*b* with the permanent magnets (disc part iron core portions).

In the foregoing embodiments, the rotary electrical machine according to the present disclosure is applied to vehicle alternating-current power generators. However, the technique of the present disclosure is not limited to this. For example, the technique of the present disclosure is also applicable to electric motors as rotary electrical machines to be installed in vehicles and rotary electrical machines in which a power generator or an electric motor drive can be selectively used.

ASPECTS OF THE PRESENT DISCLOSURE

A first rotary electrical machine as an aspect of the technique of the present disclosure includes: an annular stator (20) formed by winding an armature winding (25) on a stator core (21); and a rotor (30) radially opposed to an inner peripheral side of the stator.

The rotor includes: a field core (32) having a cylindrical boss part (321, 321*a*, 321*b*) and a plurality of claw-shaped magnetic pole parts (323, 323*a*, 323*b*) that are arranged on an outer peripheral side of the boss part and have magnetic poles different in polarity alternating in a circumferential direction; a field winding (33) that is wound on the outer peripheral side of the boss part to generate a magnetomotive force by energization; and permanent magnets (34, 34A) that are arranged with an axis of easy magnetization oriented in the circumferential direction between the circumferentially adjacent claw-shaped magnetic pole parts and have magnetic poles formed to match the alternating polarities of the claw-shaped magnetic pole parts produced by the magnetomotive force of the field winding.

The first rotary electrical machine includes a d-axis magnetic circuit (36) in which a magnetic flux formed by the magnetomotive force of the field winding flows through the boss part, the pair of claw-shaped magnetic pole parts, and the stator core and a magnet magnetic circuit (38, 39) in which a magnetic flux formed by magnetic force of the permanent magnets flows. The a d-axis magnetic circuit and at least part of the magnet magnetic circuit share the magnetic circuit.

In the first rotary electrical machine, when an electrical load is connected to the rotor, the relationship between a permeance Prt of the d-axis magnetic circuit and a permeance Pst of a q-axis magnetic circuit (37) that is formed from current flowing in an armature winding and passes through a q axis shifted from the d axis at an electrical angle of 90° is set to satisfy Pst>Prt.

According to this configuration, in the first rotary electrical machine, the permanent magnets arranged between the circumferentially adjacent claw-shaped magnetic pole parts form the two magnet magnetic circuits, that is, the magnet magnetic circuit in which the magnetic flux interlinked with the stator flows and the magnet magnetic circuit in which the magnetic flux passes through the boss part and returns to the rotor. When an electrical load is connected to the rotor, that is, when the field current is distributed to the field winding, the d-axis magnetic circuit is formed in which the magnetic flux formed by the magnetomotive force of the field winding flows through the boss part and the pair of claw-shaped magnetic pole parts of the field core, and the stator core. At this time, the flowing direction of the magnet magnetic flux in, of the two magnet magnetic circuits, the magnet magnetic circuit in which the magnetic flux passes through the boss part and returns to the rotor is opposite to the flowing direction of the magnetic flux in the d-axis magnetic circuit. Accordingly, the magnetic flux of the magnet magnetic circuit is unlikely to flow due to the magnetic resistance being large. Therefore, in the first rotary electrical machine, the relationship between the permeance Prt of the d-axis magnetic circuit and the permeance Pst of the q-axis magnetic circuit is set to satisfy Pst>Prt. This increases the magnet magnetic flux in, of the two magnet magnetic circuits, the magnet magnetic circuit in which the magnetic flux interlinked with the stator flows. Accordingly, the power generation performance can be significantly improved by the efficient use of the magnet magnetic flux.

In the present disclosure, the state where the rotor is under an electrical load refers to the state in which the field current If as rated current is distributed to the field winding in a range of 4 to 20 A that is usual for performance of a vehicle brush. With an improved structure of the brush, the field current If at that time (for example, 30 [A] or the like) can be used. In a configuration without limitation on the field current If such as a brush-less configuration, the required relationship Pst>Prt can be established by the larger field current If. Even using a brush, the effect of satisfying the requirement 0.9<As/Ab<1.7 described later would be enormous in the sense of establishing the relationship Pst>Prt.

A secondary rotary electrical machine with a brushless structure as an aspect of the technique of the present disclosure includes: an annular stator (20) formed by winding an armature winding (25) on a stator core (21); and a rotor (50) radially opposed to an inner peripheral side of the stator; and a housing (10) that stores and supports the stator and the rotor.

The housing has a boss part (17) that is arranged on an inner peripheral side of the rotor and has a field winding (53) generating a magnetomotive force by energization and wound on the outer peripheral side.

The rotor includes: a field core (52) having a plurality of magnetic pole parts (52n, 52s) that is arranged on an outer peripheral side of the field winding and has magnetic poles different in polarity alternating in a circumferential direction; and permanent magnets (54) that are arranged with an axis of easy magnetization oriented in the circumferential direction between the circumferentially adjacent magnetic pole parts and have magnetic poles formed to match the alternating polarities of the magnetic pole parts produced by the magnetomotive force of the field winding.

The second rotary electrical machine includes a d-axis magnetic circuit (56) in which the magnetic flux formed by the magnetomotive force of the field winding flows through the boss part, the pair of magnetic pole parts, and the stator core and at least part of a magnet magnetic circuit (58, 59) formed by magnetic force of the permanent magnet. The d-axis magnetic circuit and at least part of the magnet magnetic circuit share the magnetic circuit.

In the second rotary electrical machine, under an electrical load on the rotor, the relationship between a permeance Prt of the d-axis magnetic circuit and a permeance Pst of a q-axis magnetic circuit (57) that is formed from current flowing in an armature winding and passes through a q axis shifted from the d axis at an electrical angle of 90° is set to satisfy Pst>Prt.

According to this configuration, in the second rotary electrical machine, the permanent magnets arranged between the circumferentially adjacent magnetic pole parts form the two magnet magnetic circuits, that is, the magnet magnetic circuit in which the magnetic flux interlinked with the stator flows and the magnet magnetic circuit in which the magnetic flux passes through the boss part and returns to the rotor. When an electrical load is connected to the rotor, that is, when the field current is distributed to the field winding, the d-axis magnetic circuit is formed in which the magnetic flux formed by the magnetomotive force of the field winding flows through the boss part and the pair of magnetic pole parts of the field core, and the stator core. At this time, the flowing direction of the magnet magnetic flux in, of the two magnet magnetic circuits, the magnet magnetic circuit in which the magnet magnetic flux passes though the boss part and returns to the rotor is opposite to the flowing direction of the magnetic flux in the d-axis magnetic circuit. Accordingly, the magnetic flux of the magnet magnetic circuit is unlikely to flow due to the magnetic resistance being large. Therefore, in the second rotary electrical machine, the relationship between the permeance Prt of the d-axis magnetic circuit and the permeance Pst of the q-axis magnetic circuit is set to satisfy Pst>Prt. This increases the magnet magnetic flux in, of the two magnet magnetic circuits, the magnet magnetic circuit in which the magnetic flux interlinked with the stator flows. Accordingly, the power generation performance can be significantly improved by the efficient use of the magnet magnetic flux.

In particular, the brushless rotary electrical machine is not subjected to current limitation due to a brush. Accordingly, it is possible to increase the value of the field current If that would be restricted due to a brush. This makes it possible to saturate the field circuit and use efficiently the magnet force even in the brushless rotary electrical machine. In addition, the independent electrical circuit distributes the field current to the field winding. Accordingly, with regard to centrifugal force as a weak point of the magnet-equipped Lundell rotor, the rear side of the magnetic pole parts is not subjected to the centrifugal force of the electrical circuit. This makes it possible to decrease stress resulting from centrifugal force.

In the present embodiment, the axially extending iron core cross-sectional area of a pair of NS poles of the boss part is designated as Ab and the magnetic flux density of the boss part with a magnetic field of 5000 [A/m] as B50. In addition, the residual magnetic flux density of the permanent magnet between the claw-shaped magnetic pole portions and between the magnetic pole portions is designated as Br and the cross-sectional area of the surface constituting the magnetic pole of the permanent magnet as Am. In the present embodiment, the foregoing elements are set to satisfy the relationship $2 \times Br$ [T]$\times Am$ [mm$^2$]<B50 [T]$\times Ab$ [mm$^2$]. According to this configuration, in the rotary electrical machine of the present embodiment, the magnetic force generated by the permanent magnet can be absorbed by the d-axis magnetic circuit. This makes it possible to decrease the back-electromotive force and suppress the power generated in a high-speed rotation state without power distribution.

In the first or second rotary electrical machine, the relationship between the permeance Prt of the d-axis magnetic circuit and the permeance Pst of the q-axis magnetic circuit is Pst:Prt=2n:1 (n is a real number of 1 or larger). According to this configuration, in the rotary electrical machine of the present disclosure, the operation mode of the Lundell rotor under an electrical load can be brought closer to that of an IPM rotor. In addition, the saliency ratio ρ as the ratio (Lq/Ld) of the q-axis inductance Lq to the d-axis inductance Ld can be set to 2 or more. Accordingly, the Lundell rotor can output the same degree of reluctance torque as that in an IPM rotor.

A third rotary electrical machine as an aspect of the technique of the present disclosure includes: an annular stator (20) formed by winding an armature winding (25) on a stator core (21); and a rotor (30) rotatably arranged and radially opposed to an inner peripheral side of the stator.

The rotor includes: a field core (32) having a cylindrical boss part (321, 321a, 321b) and a plurality of claw-shaped magnetic pole parts (323, 323a, 323b) that are arranged on an outer peripheral side of the boss part and have magnetic poles different in polarity alternating in a circumferential direction; a field winding (33) that is wound on the outer peripheral side of the boss part to generate a magnetomotive force by energization; and permanent magnets (34) that are arranged with an axis of easy magnetization oriented in the circumferential direction between the circumferentially adjacent claw-shaped magnetic pole parts and have magnetic poles formed to match the alternating polarities of the claw-shaped magnetic pole parts produced by the magnetomotive force of the field winding.

In the present disclosure, the surface area of the outer peripheral surface of the claw-shaped magnetic pole part is designated as As, and the axially extending iron core cross-sectional area of a pair of NS poles of the boss part as Ab. In this case, in the third rotary electrical machine, the relationship between the surface area As and the cross-sectional area Ab is set within the range of $0.9<As/Ab<1.7$.

According to this configuration, in the third rotary electrical machine, the relationship between the surface area As of the outer peripheral surface of the claw-shaped magnetic pole part and the axially extending iron core cross-sectional area Ab of a pair of NS poles of the boss part is set within the range of $0.9<As/Ab<1.7$. Accordingly, the magnet magnetic flux can be increased in, of the magnet magnetic circuits formed by the permanent magnets arranged between the circumferentially adjacent claw-shaped magnetic pole parts, the magnet magnetic circuit in which the magnet magnetic flux interlinked with the stator flows. This improves significantly the power generation performance by the efficient use of the magnet magnetic flux. The permanent magnets arranged between the claw-shaped magnetic pole parts are conventionally used for the purposes of rectification of magnetic flux and prevention of leakage of magnetic flux. In contrast, in the present disclosure, the permanent magnets arranged between the claw-shaped magnetic pole parts are used like permanent magnets in an IPM rotor. This achieves increase of magnetic flux rather than prevention of leakage of magnetic flux. That is, the permanent magnets can act as a source for torque increase or a source for power increase.

A fourth rotary electrical machine of a brushless structure as an aspect of the technique of the present disclosure includes: an annular stator (20) formed by winding an armature winding (25) around a stator core (21); a rotor (30) radially opposed to the inner peripheral side of the stator; and a housing (10) that stores the stator and the rotor therein and support the same.

The housing has a boss part (17) that is arranged on an inner peripheral side of the rotor and has a field winding (53) generating magnetomotive force by energization and wound on the outer peripheral side.

The rotor includes: a field core (52) having a plurality of magnetic pole parts (523h, 523i) that is arranged on the outer peripheral side of the field winding and has magnetic poles different in polarity alternating in a circumferential direction; and permanent magnets (54) that are arranged with an axis of easy magnetization oriented in the circumferential direction between the circumferentially adjacent magnetic pole parts and have magnetic poles formed to match the alternating polarities of the magnetic pole parts produced by the magnetomotive force of the field winding.

In the present disclosure, the surface area of the outer peripheral surface of the claw-shaped magnetic pole part is designated as As, and the axially extending iron core cross-sectional area of a pair of NS poles of the boss part is designated as Ab. In this case, in the third rotary electrical machine, the relationship between the surface area As and the cross-sectional area Ab is set within a range of $0.9<As/Ab<1.7$.

According to this configuration, in the fourth rotary electrical machine, the relationship between the surface area As of the outer peripheral surface of the magnetic pole part and the axially extending iron core cross-sectional area Ab of a pair of NS poles of the boss part is set within the range of $0.9<As/Ab<1.7$. Accordingly, the magnet magnetic flux can be increased in, of the magnet magnetic circuits formed by the permanent magnets arranged between the circumferentially adjacent magnetic pole parts, the magnet magnetic circuit in which the magnet magnetic flux interlinked with the stator flows. This improves significantly the power generation performance by the efficient use of the magnet magnetic flux. The permanent magnets arranged between the magnetic pole parts are conventionally used for the purposes of rectification of a magnetic flux and prevention of leakage of a magnetic flux. In contrast, in the present disclosure, the permanent magnets arranged between the magnetic pole parts are used like permanent magnets in an IPM rotor. This achieves increase of a magnetic flux rather than prevention of leakage of a magnetic flux. That is, the permanent magnets can act as a source for torque increase or a source for power increase.

In the third or fourth rotary electrical machine, the relationship between the boss part outer diameter Db and the rotor outer diameter Dr is set within the range of $0.46<Db/Dr<0.53$. According to this configuration, in the rotary electrical machine of the present embodiment, the boss part cross-sectional area falls within a range determined with maximum consideration given to counteraction of the magnet magnetic force against the magnetic force of the boss part. The magnetic force of the boss part enough to counteract the counteraction of the magnet magnetic force acts on the field core. At this time, with the root cross-sectional area of the claw-shaped magnetic pole portion, the total magnetic force of the boss part and the total magnetic force of the permanent magnets can be passed to the stator.

In the third or fourth rotary electrical machine, the residual magnetic flux density Br of the permanent magnet is set to 1 or more [T]. According to this configuration, in the rotary electrical machine of the present embodiment, the foregoing operations and advantageous effects can be further effectively obtained.

In the first or second rotary electrical machine, the parts having the d-axis magnetic circuit (36, 56) is formed from two kinds of materials different in the saturation flux density Bs. The claw-shaped magnetic pole parts or magnetic pole parts are formed from a material high in saturation flux density Bs, and the parts other than the claw-shaped magnetic pole parts or magnetic pole parts are formed from a material low in the saturation flux density Bs. According to this configuration, in the rotary electrical machine of the present embodiment, the boss part becomes more quickly saturated in magnetic flux and more likely to change to the behavior of magnetic flux characteristics of an IPM rotor than the claw-shaped magnetic pole parts or magnetic pole parts. This makes it possible to improve the power generation performance in a more reliable manner.

In the foregoing rotary electrical machine, the material low in the saturation flux density Bs is higher in magnetic permeability than the material high in the saturation flux density Bs. According to this configuration, in the rotary electrical machine of the present embodiment, the capability of absorbing the electromotive force can be enhanced at no load on the rotor.

In the third or fourth rotary electrical machine, the field core has the decreased area of the cross section orthogonal to the flowing direction of the magnetic flux. In the third or fourth rotary electrical machine, the relationship between the area A1 of the circle with a diameter equivalent to the outer diameter Dr of the rotor and the cross-sectional area A2 of the portion with the minimum area of the cross section orthogonal to the flowing direction of the magnetic flux is set within the range of 0.2116<A2/A1<0.2809. According to this configuration, in the rotary electrical machine of the present embodiment, the field core has the decreased area of the cross section orthogonal to the flowing direction of the magnetic flux. This changes the characteristics of the rotary electrical machine. That is, it is easy to form rotary electrical machines different in characteristics. Further, in the rotary electrical machine of the present embodiment, the relationship between the area A1 of the circle with a diameter equivalent to the outer diameter Dr of the rotor and the cross-sectional area A2 of the portion with the minimum area of the cross section orthogonal to the flowing direction of the magnetic flux is set within the range of 0.2116<A2/A1<0.2809. This makes it possible to ensure the same magnetic relationship and produce the same advantageous effects as those in the case of setting the relationship between the outer diameter Db of the boss part and the outer diameter Dr of the rotor in the range of 0.46<Db/Dr<0.53.

The reference signs parenthesized suffixed to the names of the members and portions described in the following aspects of the present disclosure and in the claims indicate the correspondences with the specific members and portions in the foregoing exemplary embodiments. Accordingly, these reference signs have no influence on the configurations described in the claims.

REFERENCE SIGNS LIST 1, 2 . . . Vehicle alternating-current power generator (rotary electrical machine)
10 . . . Housing
17 . . . Boss part
20 . . . Stator
21 . . . Stator core
25 . . . Armature winding
30 . . . Rotor
32 . . . Field core
321 . . . Boss part
321a . . . First boss part
321b . . . Second boss part
323 . . . Claw-shaped magnetic pole part (magnetic pole part)
323a . . . First claw-shaped magnetic pole parts (magnetic pole part)
323b . . . Second claw-shaped magnetic pole parts (magnetic pole part)
33 . . . Field winding
34, 34A . . . Permanent magnet
36 . . . d-axis magnetic circuit
37 . . . q-axis magnetic circuit
38 . . . First magnet magnetic circuit
39 . . . Second magnet magnetic circuit
50 . . . Rotor
52 . . . Field core
52n N pole (magnetic pole part)
52s S pole (magnetic pole part)
53 . . . Field winding
54 . . . Permanent magnet
56 . . . d-axis magnetic circuit
57 . . . q-axis magnetic circuit
58 . . . First magnet magnetic circuit
59 . . . Second magnet magnetic circuit

The invention claimed is:

1. A rotary electrical machine comprising:
an annular stator formed by winding an armature winding on a stator core; and
a rotor radially opposed to an inner peripheral side of the stator, the rotor including:
a field core having a cylindrical boss part and a plurality of claw-shaped magnetic pole parts that are arranged on an outer peripheral side of the boss part and have magnetic poles different in polarity alternating in a circumferential direction;
a field winding that is wound on the outer peripheral side of the boss part to generate a magnetomotive force by energization; and
a permanent magnet that is arranged with an axis of easy magnetization oriented in the circumferential direction between the circumferentially adjacent claw-shaped magnetic pole parts and has a magnetic pole formed to match the alternating polarities of the claw-shaped magnetic pole parts produced by the magnetomotive force of the field winding,
wherein in a d-axis magnetic circuit in which a magnetic flux formed by the magnetomotive force of the field winding flows through the boss part, the pair of claw-shaped magnetic pole parts, and the stator core and a magnet magnetic circuit in which a magnetic flux formed by magnetic force of the permanent magnet flows, the d-axis magnetic circuit and at least part of the magnet magnetic circuit share the magnetic circuit,
when an electrical load is connected to the rotor, a relationship between a permeance Prt of the d-axis magnetic circuit and a permeance Pst of a q-axis magnetic circuit that is formed from current flowing in the armature winding and passes through a q axis shifted from the d axis at an electrical angle of 90° is set to satisfy Pst>Prt, and
when an axially extending iron core cross-sectional area of a pair of NS poles of the boss part is designated as Ab and a magnetic flux density of the boss part with a magnetic field of 5000 [A/m] as B50, a residual magnetic flux density of the permanent magnet arranged between the claw-shaped magnetic pole parts as Br, and a cross-sectional area of a surface of the permanent magnet constituting the magnetic pole as Am, a relationship 2×Br×Am<B50×Ab is satisfied.

2. The rotary electrical machine with a brushless structure, comprising:
an annular stator formed by winding an armature winding on a stator core;
a rotor radially opposed to an inner peripheral side of the stator; and
a housing that stores and supports the stator and the rotor, the housing having a boss part that is arranged on an inner peripheral side of the rotor and has a field winding generating a magnetomotive force by energization and wound on the outer peripheral side,
wherein the rotor includes a field core having a plurality of magnetic pole parts that is arranged on an outer peripheral side of the field winding and has magnetic poles different in polarity alternating in a circumferential direction and a permanent magnet that is arranged with an axis of easy magnetization oriented in the circumferential direction between the circumferentially adjacent magnetic pole parts and has a magnetic pole formed to match the alternating polarities of the magnetic pole parts produced by the magnetomotive force of the field winding, and in a d-axis magnetic circuit in which the magnetic flux formed by the magnetomotive force of the field winding flows through the boss part, the pair of magnetic pole parts, and the stator core and a magnet magnetic circuit formed by magnetic force of the permanent magnet, the d-axis magnetic circuit and at least part of the magnet magnetic circuit share the magnetic circuit, and when an electrical load is connected to the rotor, the relationship between a permeance Prt of the d-axis magnetic circuit and a permeance Pst of a q-axis magnetic circuit that is formed from current flowing in the armature winding and passes through a q axis shifted from the d axis at an electrical angle of 90° is set to satisfy Pst>Prt.

3. The rotary electrical machine according to claim 2, wherein, an axially extending iron core cross-sectional area of a pair of NS poles of the boss part is designated as Ab, a magnetic flux density of the boss part with a magnetic field of 5000 [A/m] as B50, a residual magnetic flux density of the permanent magnet arranged between the magnetic pole parts as Br, and a cross-sectional area of surface of the permanent magnet constituting the magnetic pole as Am, a relationship 2×Br×Am<B50×Ab is satisfied.

4. The rotary electrical machine according to claim 1, wherein, a ratio of the permeance Prt of the d-axis magnetic circuit to the permeance Pst of the q-axis magnetic circuit is set to Pst:Prt=2n:1, n being a real number of 1 or larger.

5. The rotary electrical machine according to claim 1, wherein, parts with the d-axis magnetic circuit are formed from two kinds of materials different in saturation flux density Bs, and the claw-shaped magnetic pole parts are formed from a material high in the saturation flux density Bs, and the parts other than the claw-shaped magnetic pole parts are formed from a material low in the saturation flux density Bs.

6. The rotary electrical machine according to claim 2, wherein, parts with the d-axis magnetic circuit are formed from two kinds of materials different in saturation flux density Bs, and the magnetic pole parts are formed from a material high in saturation flux density Bs, and the parts other than the magnetic pole parts are formed from a material low in the saturation flux density Bs.

7. The rotary electrical machine according to claim 5, wherein, the material low in the saturation flux density Bs is higher in magnetic permeability than the material high in the saturation flux density Bs.

\* \* \* \* \*